United States Patent [19]
Trent et al.

[11] 3,786,234
[45] Jan. 15, 1974

[54] GAME CONTROL AND DATA HANDLING SYSTEM

[75] Inventors: Edward J. Trent, Reno, Nev.; Lavern H. Meyers, Newport Beach, Calif.; Frank L. Kagele, Reno, Nev.; Jerry T. Fridenberg, Westminster; Frederick J. Alberty, Hollywood, both of Calif.

[73] Assignee: Intercontinental Services, Inc., Sparkes, Nev.

[22] Filed: Nov. 16, 1971

[21] Appl. No.: 199,176

[52] U.S. Cl.... 235/61.7 R, 235/61.9 A, 273/138 A, 340/172.5
[51] Int. Cl......... G06k 3/02, A63f 7/00, G06f 3/06
[58] Field of Search .................. 235/61.6 R, 61.6 E, 235/61.7 R, 61.9 R; 340/172.5; 273/138 A; 101/93 C

[56] References Cited
UNITED STATES PATENTS
3,550,290   12/1970   Azure, Jr...................... 235/61.6 E
3,643,348    2/1972   Azure, Jr...................... 235/61.6 E

*Primary Examiner*—Daryl W. Cook
*Attorney*—Nathaniel A. Humphries

[57] ABSTRACT

A system is disclosed for expediting and monitoring customer transactions in the game of keno including a plurality of transaction terminals or stations each including scanner means for sensing marked number spots of a customer marked keno ticket, a manually operable keyboard for receiving entries of the price of a transaction and the nature of the transaction and a duplicate receipt ticket providing means including printing means controlled by the scanner and the keyboard for rapidly providing a duplicate ticket with brush mark replicas in the same number spots as those of the customer marked ticket and for also imprinting additional information such as the nature and price of the transaction. Another aspect of the invention resides in the provision of a control and data processing system interconnecting the plurality of terminal stations to a central control for controlling and monitoring all of the transaction terminals and storing all transactions of all transaction terminals. An additional feature resides in the provision of a back printer for imprinting the back of a customer marked ticket with all information, such as the amount of the transaction and the nature of the transaction, imprinted on the receipt ticket.

21 Claims, 42 Drawing Figures

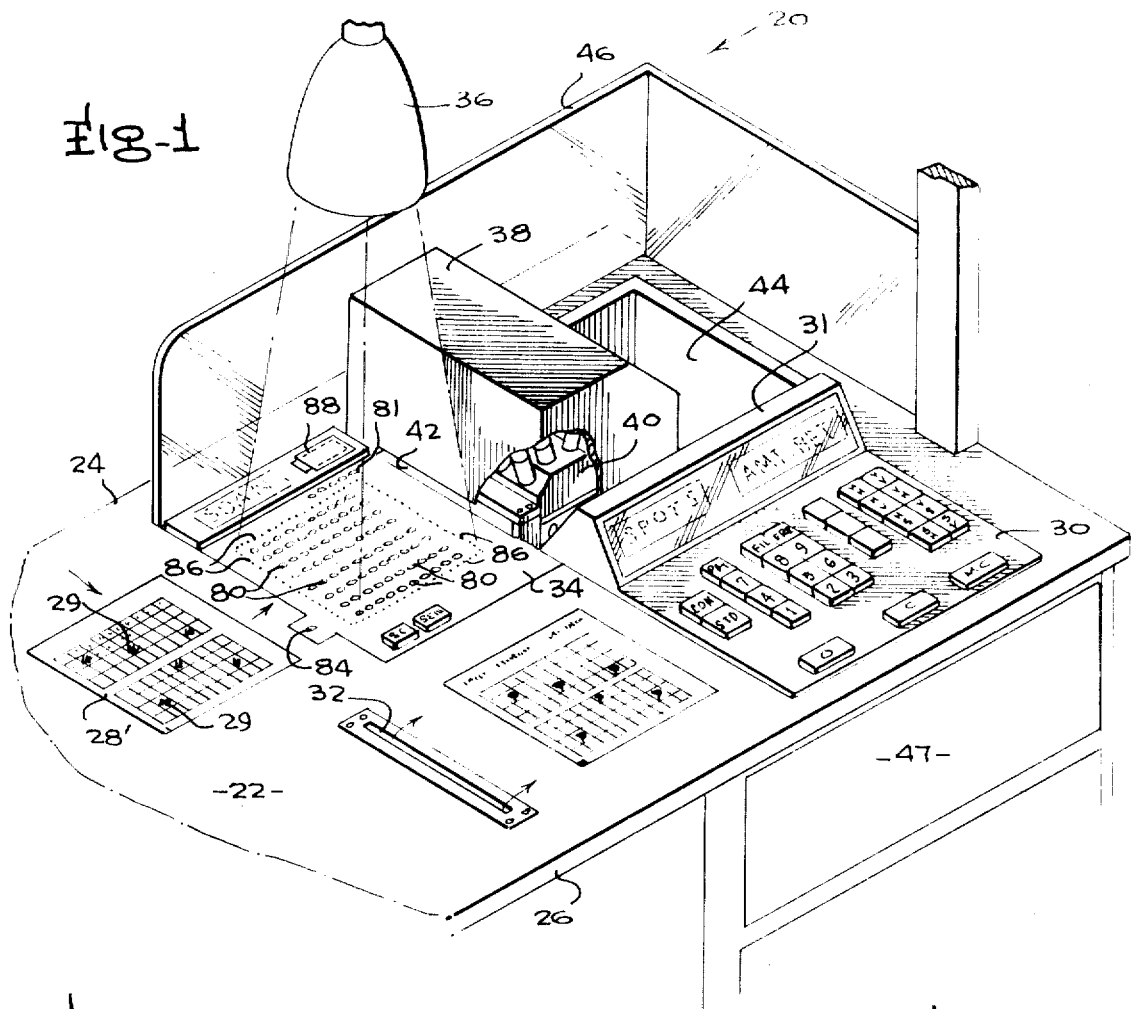
Fig-1
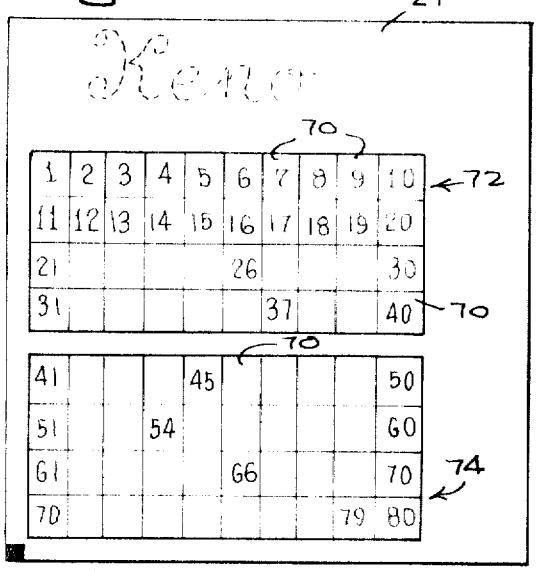
Fig-3-A
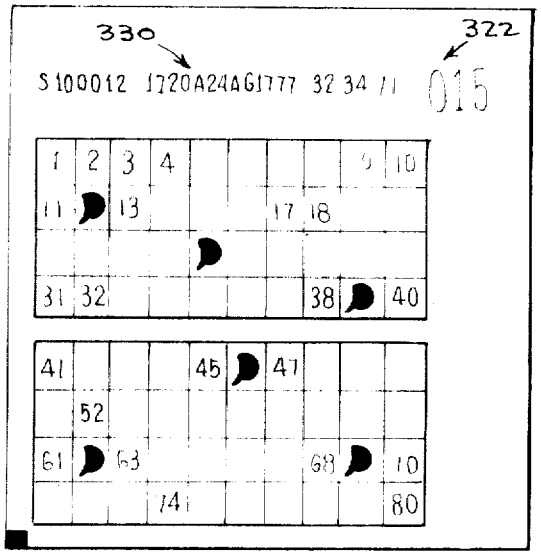
Fig-3-B

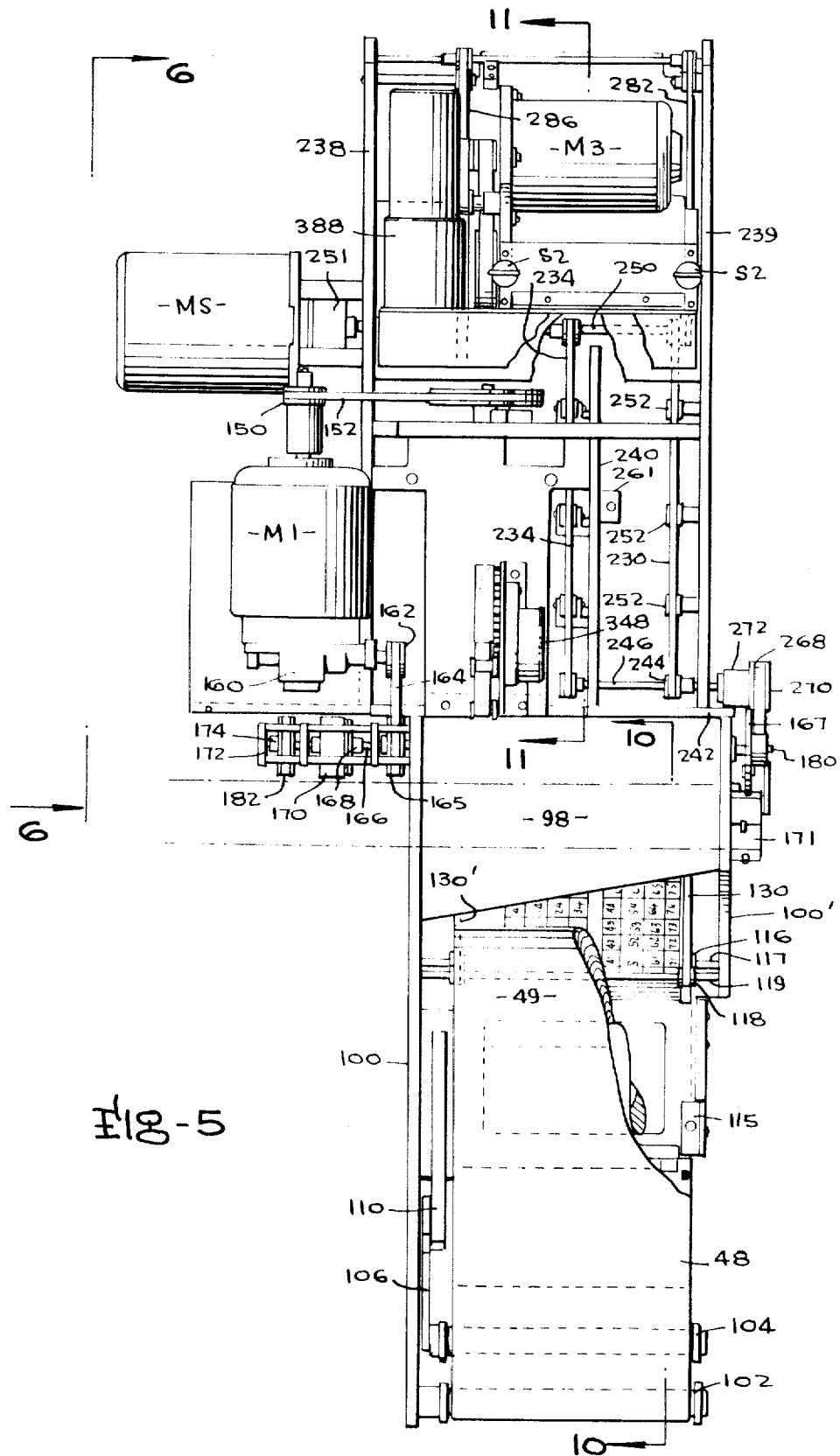

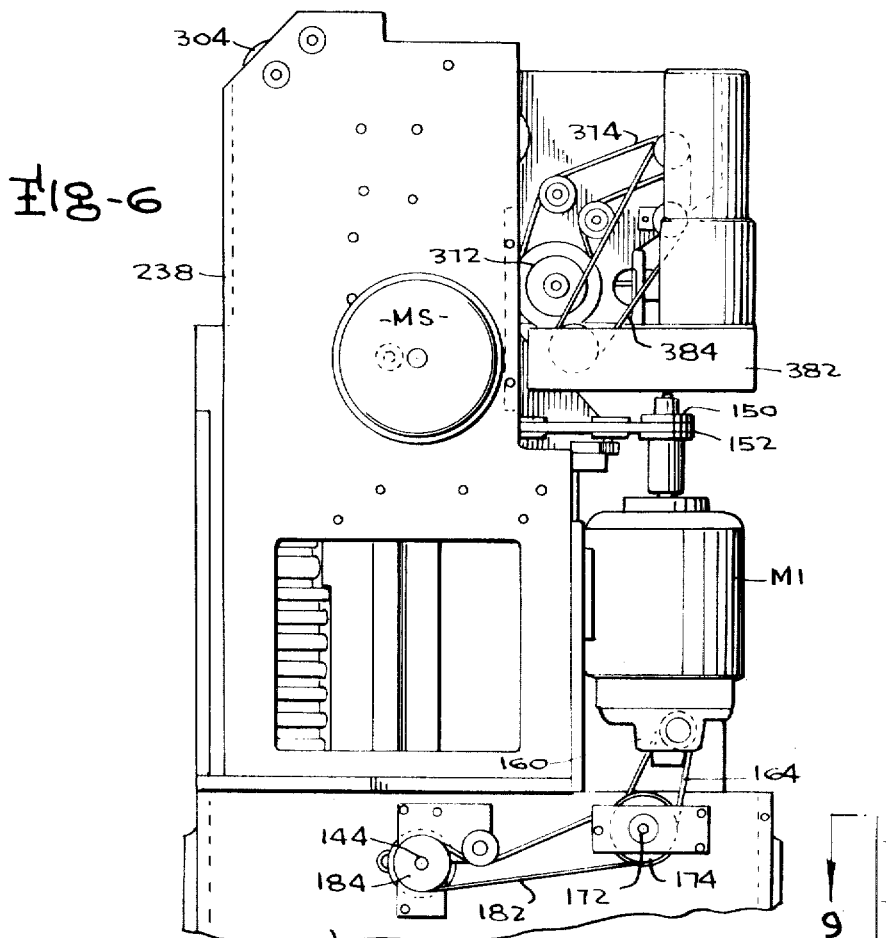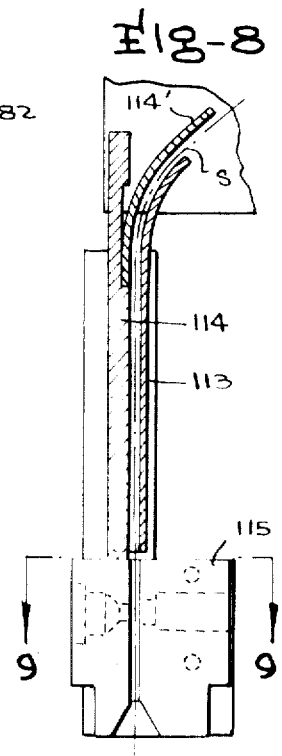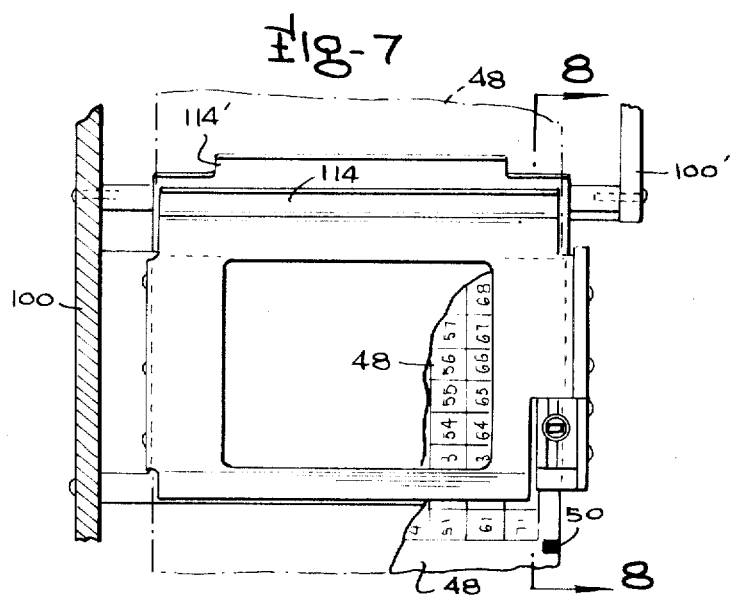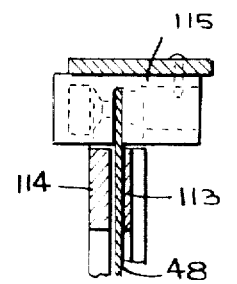

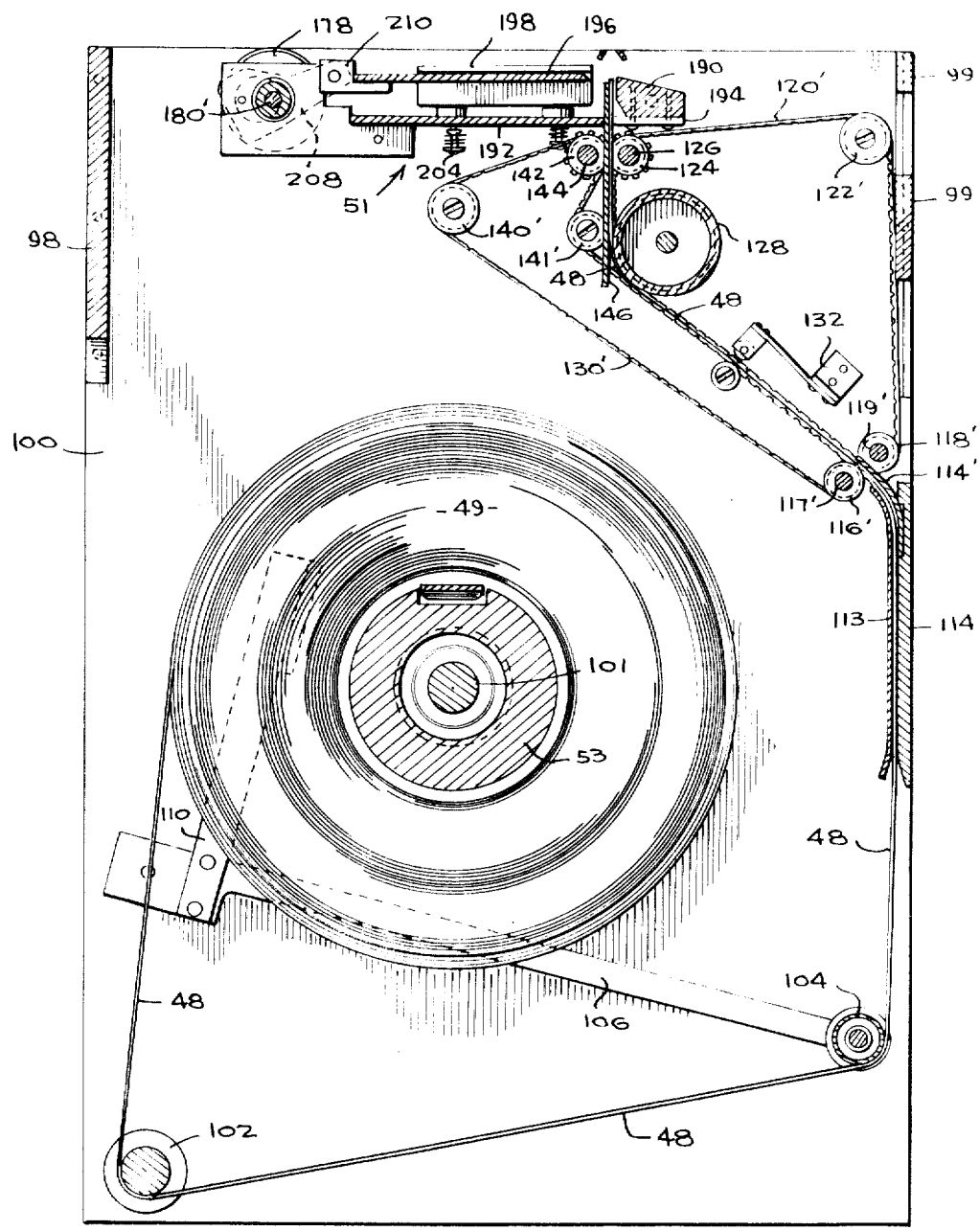

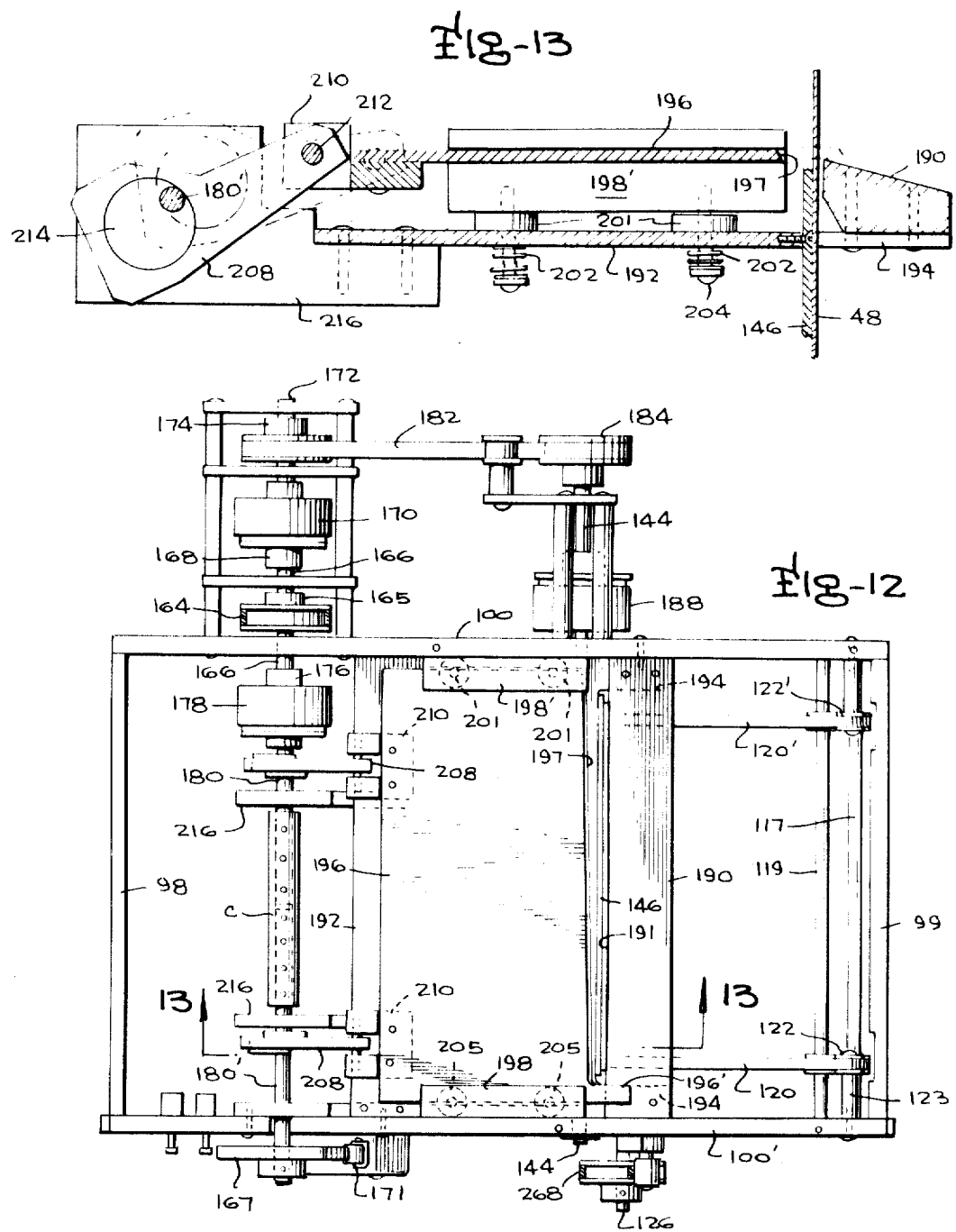

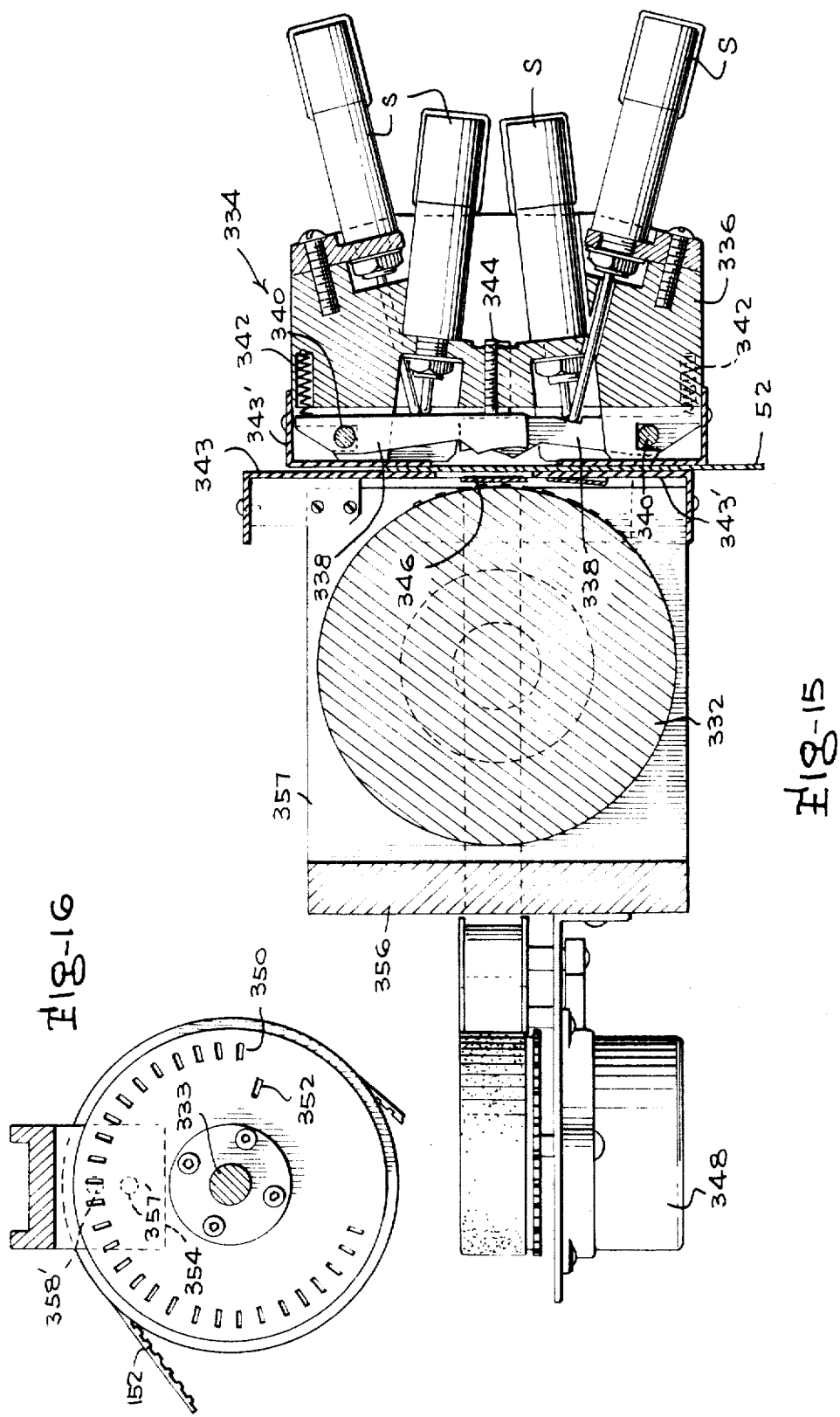

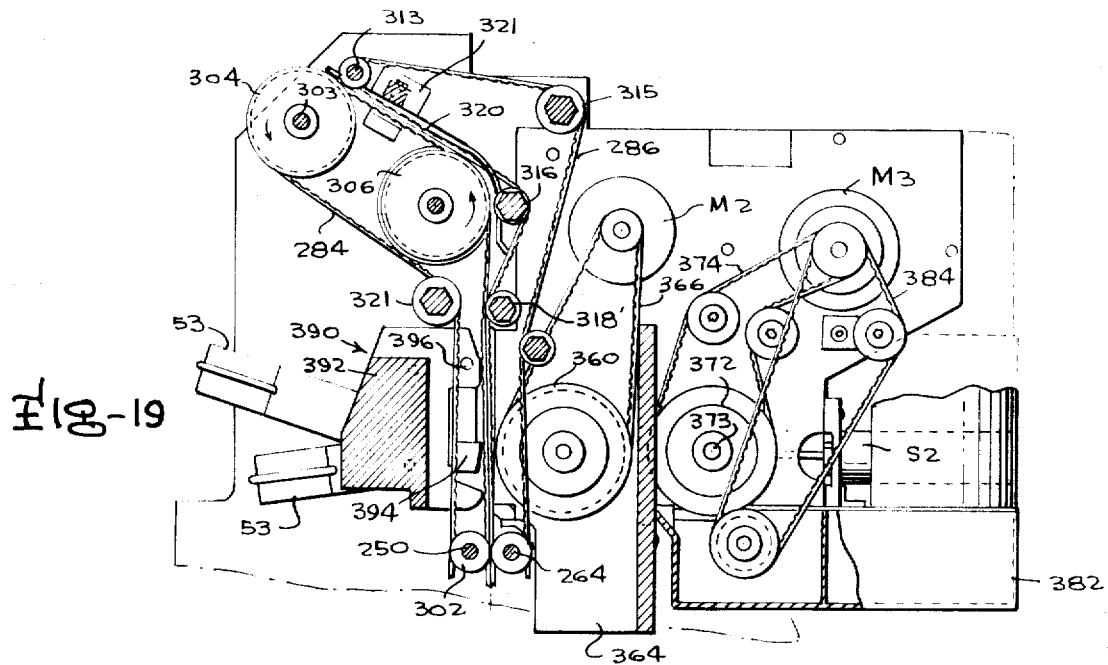
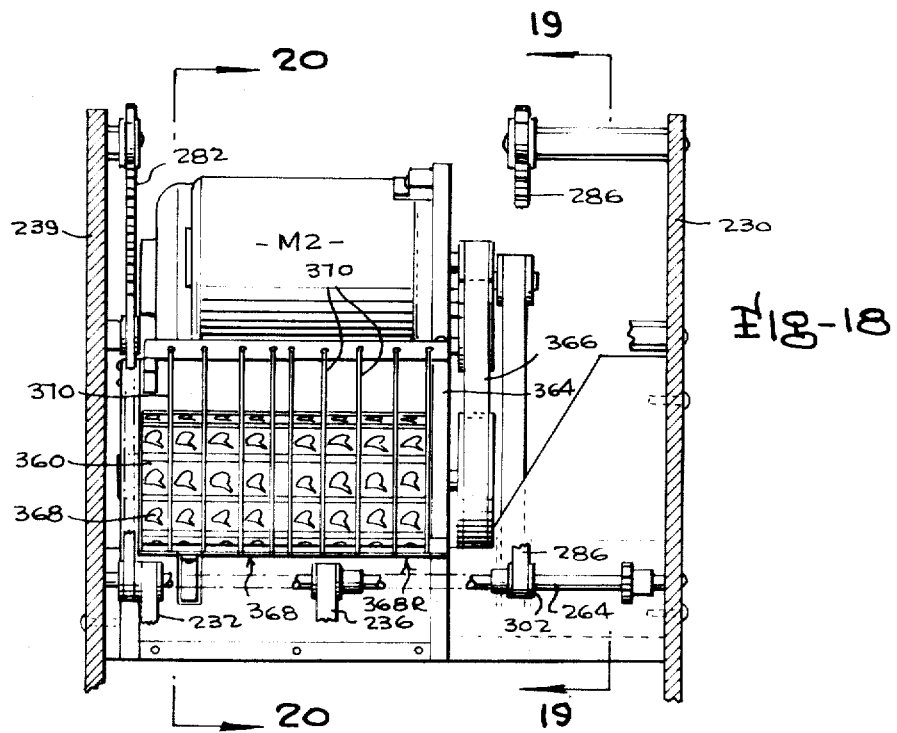

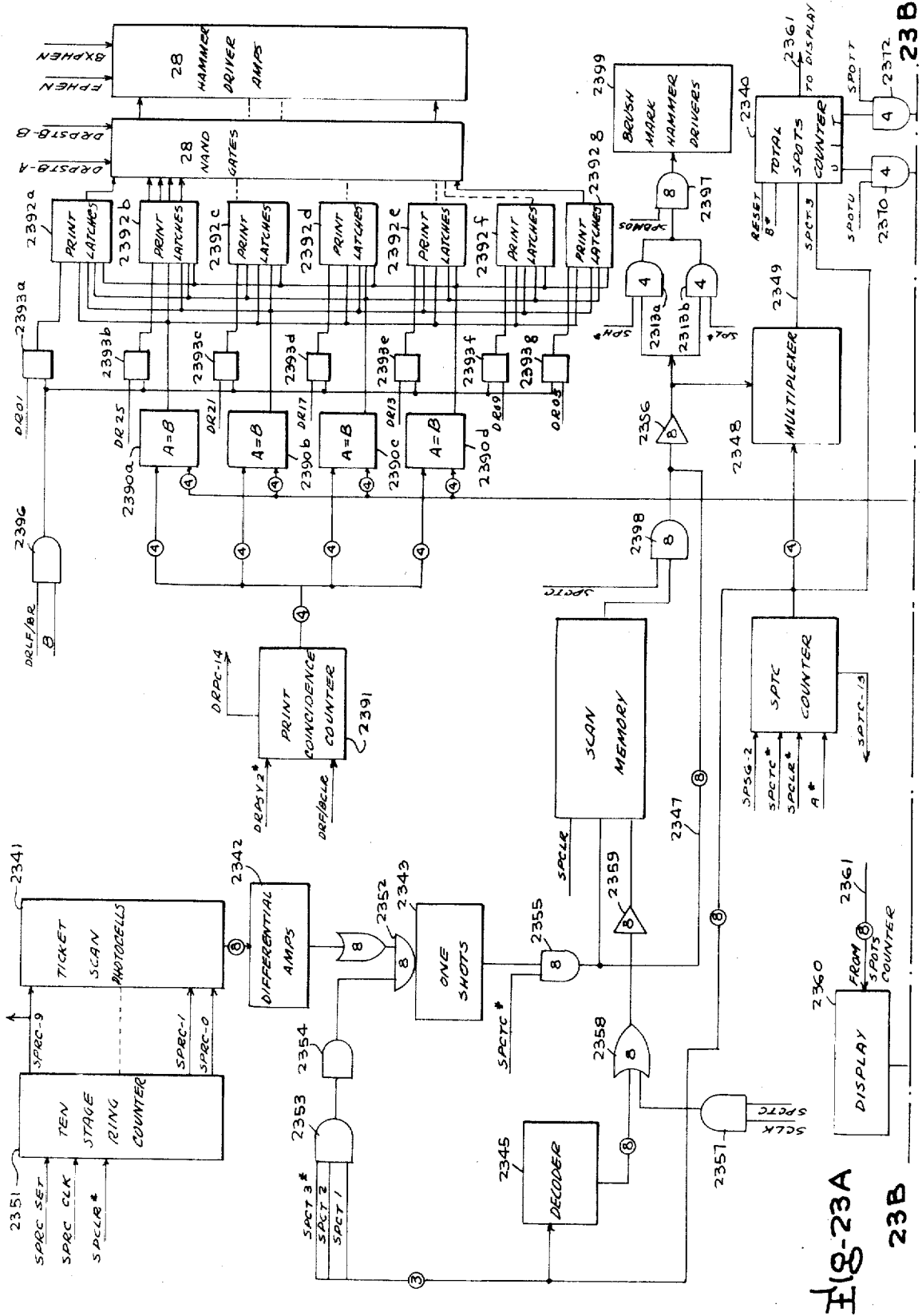

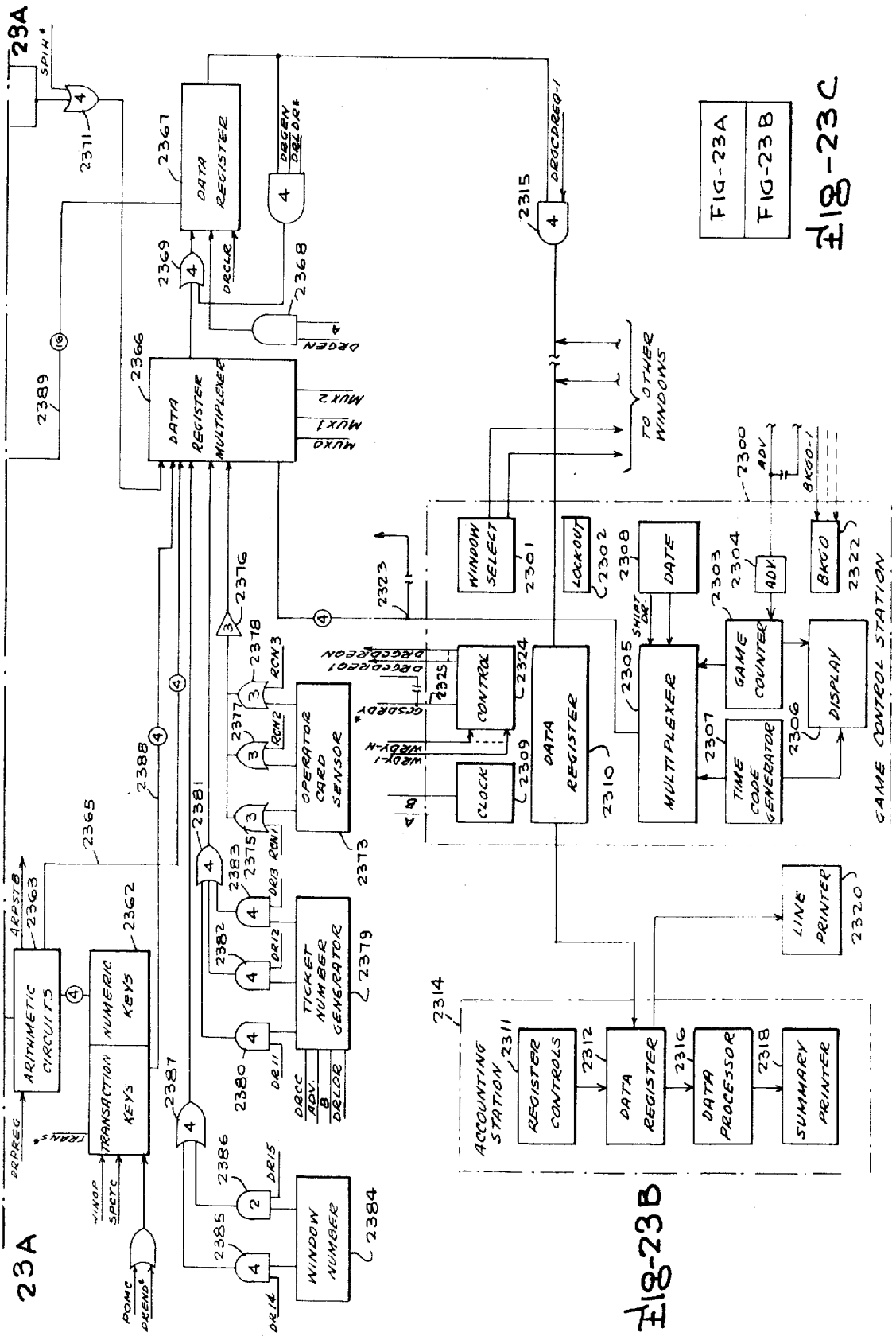

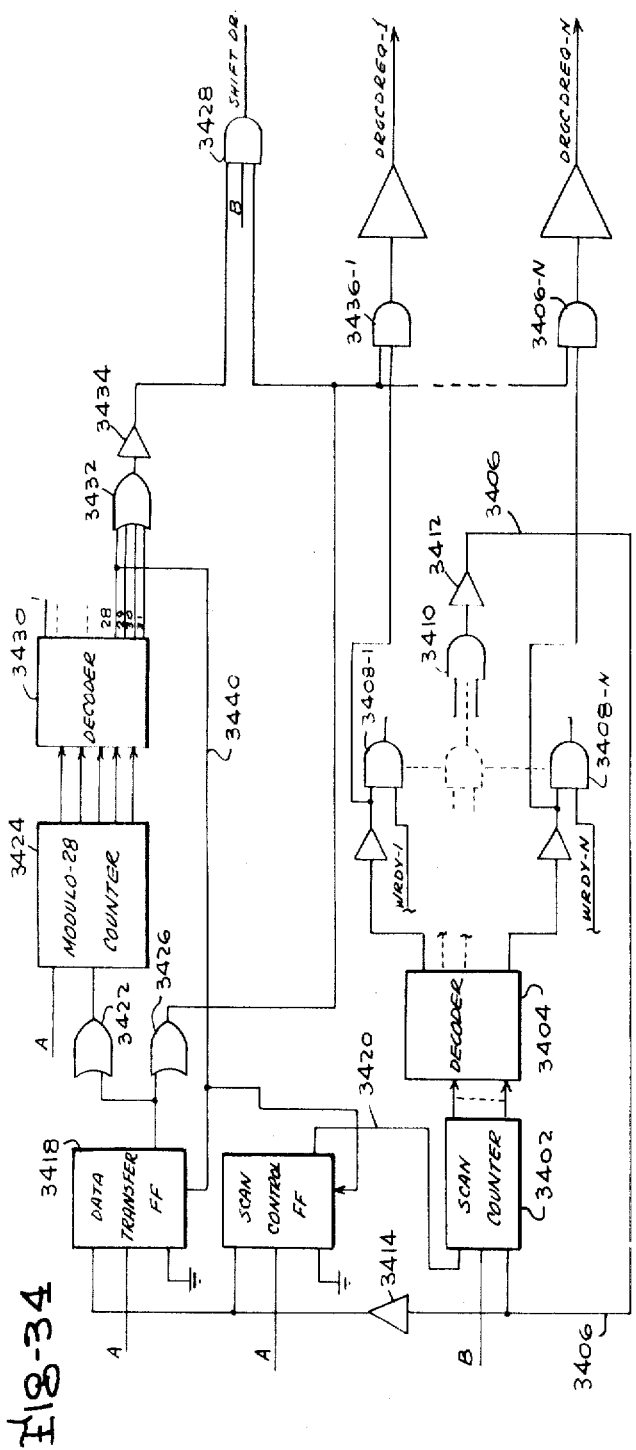
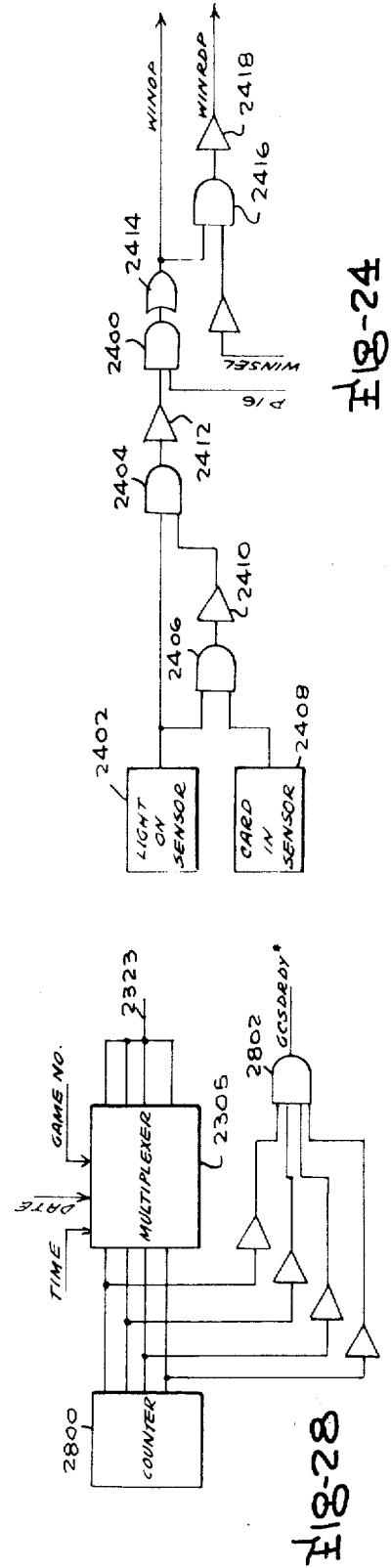

GAME CONTROL AND DATA HANDLING SYSTEM

This invention is in the field of information processing, storage, reproduction and handling and is specifically directed to a system for expediting the handling of customer transactions in the game of keno.

The subject invention does not in any manner change the nature or sequence of operations of the well-known game of keno. However, the invention does serve to automate, speed-up and simplify the various transactions inherent in the game and to provide data storage and monitoring for all transactions for accounting purposes.

By way of background, it is noted that the game of keno is played with a ticket having 80 number spaces or spots respectively numbered 1 through 80. The customer manually marks one or more selected spots on such a blank and presents the ticket to a keno writer or operator along with the amount of the transaction. The keno writer marks a duplicate ticket with brush marks in each of the number spots selected by the customer to provide a receipt ticket for the customer. In addition, the writer stamps the receipt ticket with the date and/or other information with a handstamp. The receipt ticket is returned to the customer and serves as a record of the transaction with the writer retaining the customer marked ticket. Following acceptance of all customer transactions, 20 of numbers 1 through 80 are randomly selected by the operator of the game. The usual process for selecting the numbers is through the use of a chamber containing 80 pingpong balls respectively numbered 1 through 80 in which chamber the balls are maintained in a tumultuous state by an air jet. Twenty balls are randomly removed from the chamber in succession to effect a random selection of the 20 numbers on the balls. Following selection of the 20 numbers, the operator of the game makes pay transactions to those customers who present receipt tickets indicating that they had selected spots in their specific transactions which would entitle them to payment. However, payment is predicated upon a comparison of the receipt ticket with the customer's originally marked ticket which constitutes the final record upon which payment is based.

The number of customers which can be accommodated in any particular game is largely dependent upon the speed and accuracy of the keno writers in reproducing and copying the customer's marked ticket to provide the customer receipt tickets. Unfortunately, the manual marking of the receipt ticket takes a substantial amount of time and errors in marking the tickets frequently occur. The subject invention completely overcomes these problems by totally eliminating the manual marking of the receipt ticket in providing a mechanism for mechanically producing the duplicate receipt ticket with great accuracy and speed following receipt of the customer marked ticket.

In addition, the present manner of receiving incoming transactions and making pay transactions does not enable the owner of the establishment to accurately monitor the transactions of the writers. This fact sometimes enables unscrupulous writers to defraud their employers of substantial amounts through various strategems which need not be publicized for obvious reasons. In any event, the subject invention includes data handling and storing systems for constantly monitoring the operation of all keno writers in a particular game and providing an output indicative of their cash position at any given amount. In addition, the overall game is constantly monitored so that an audit at any time is easily enabled.

Therefore, it is the primary object of this invention to provide a new and improved system for auditing and speeding up the game of keno. Obtainment of the object of this invention is enabled through the provision of a plurality of transaction terminals each of which is provided with an operator and which is under the control of a central supervisory station. Each transaction terminal includes a photoelectric scanning means capable of reading a customer marked ticket for ascertaining those selected spots on the customer marked ticket which have been marked and with a keyboard for receiving manual entries indicative of the amount of the particular transaction as well as the nature of the transaction. In addition, each transaction terminal also includes a duplicate ticket reproducing means for producing a receipt ticket for the customer.

Upon presentation of an incoming customer marked ticket to the operator of any particular transaction terminal, the operator positions the customer marked ticket upon the photoelectric scanning means which immediately scans the ticket to ascertain those number spots which have been marked by the customer. This information is retained in a memory storage and the operator manually enters the amount of the transaction and the nature of the transaction into the keyboard upon receipt of the transaction amount from the customer. Entry of all information into the keyboard initiates operation of a duplicate ticket providing means including a printing means which prints a line of accounting data on the face of a duplicate ticket with this data normally including, but not limited to, the number of the transaction terminal, the ticket serial number, the time, the date, the number of the operator at that particular transaction terminal, the number of spots marked by the customer, the dollar amount of the transaction, and the game number. This information is imprinted on the face of the receipt ticket by an on-the-fly printer and is simultaneously printed at a remote monitor station.

The spots on the duplicate ticket corresponding to those marked by the customer are then imprinted with replicas of a brush mark by means under the control of the memory from the photoelectric scanning means so that the duplicate ticket constitutes essentially a complete replica of the customer marked ticket and includes all information concerning the amount and nature of the transaction. The duplicate ticket is printed in less than 1½ seconds so that the operator is expedited considerably. The duplicate is given to the customer as a record of the transaction with the operator terminating the transaction by insertion of the customer marked ticket in a back printer which prints the same information on the back of the customer marked ticket as was printed on the face of the duplicate ticket by the selective printing means; the customer marked ticket is then ejected to a storage bin for retention until the next game is begun.

After the numbers have been drawn for the play of the particular game, customers having tickets entitling them to payment from the operator present such tickets to the operator and appropriate pay entries are made in the keyboard along with payment of the dollar amount due the customer. All pay entries, as well as transaction entries, are recorded at the monitoring station so that a constant monitoring of each transaction terminal is available.

In addition, the keyboard provides addition and subtraction functions for aiding the operator in making change. An error key is also provided for correcting any entry errors as may occur.

Eight special way keys are provided on the keyboard for insuring that all possible horizontal, vertical and spot combination ticket transactions can be handled by the system.

Another aspect of the invention resides in the provision of a game supervisor control station which includes a control panel for opening and closing each of the transaction terminals, advancing the game number, date and time changes and other information which must necessarily be simultaneously supplied to each of the transaction terminals.

Therefore, it will be seen that the subject invention enables a great speed-up of the play of the game of keno along with a constant auditing of all activities of the keno writers. These and other advantages of the subject invention will become apparent when the following written description of the preferred embodiment is read in conjunction with the appended drawings in which:

FIG. 1 is a perspective view of a single point of sale transaction terminal of the preferred embodiment of the invention;

FIG. 3A illustrates a blank keno ticket of the type marked by a customer prior to the play of the game;

FIG. 3B illustrates a duplicate keno receipt ticket prepared by the subject invention;

Figure 4:
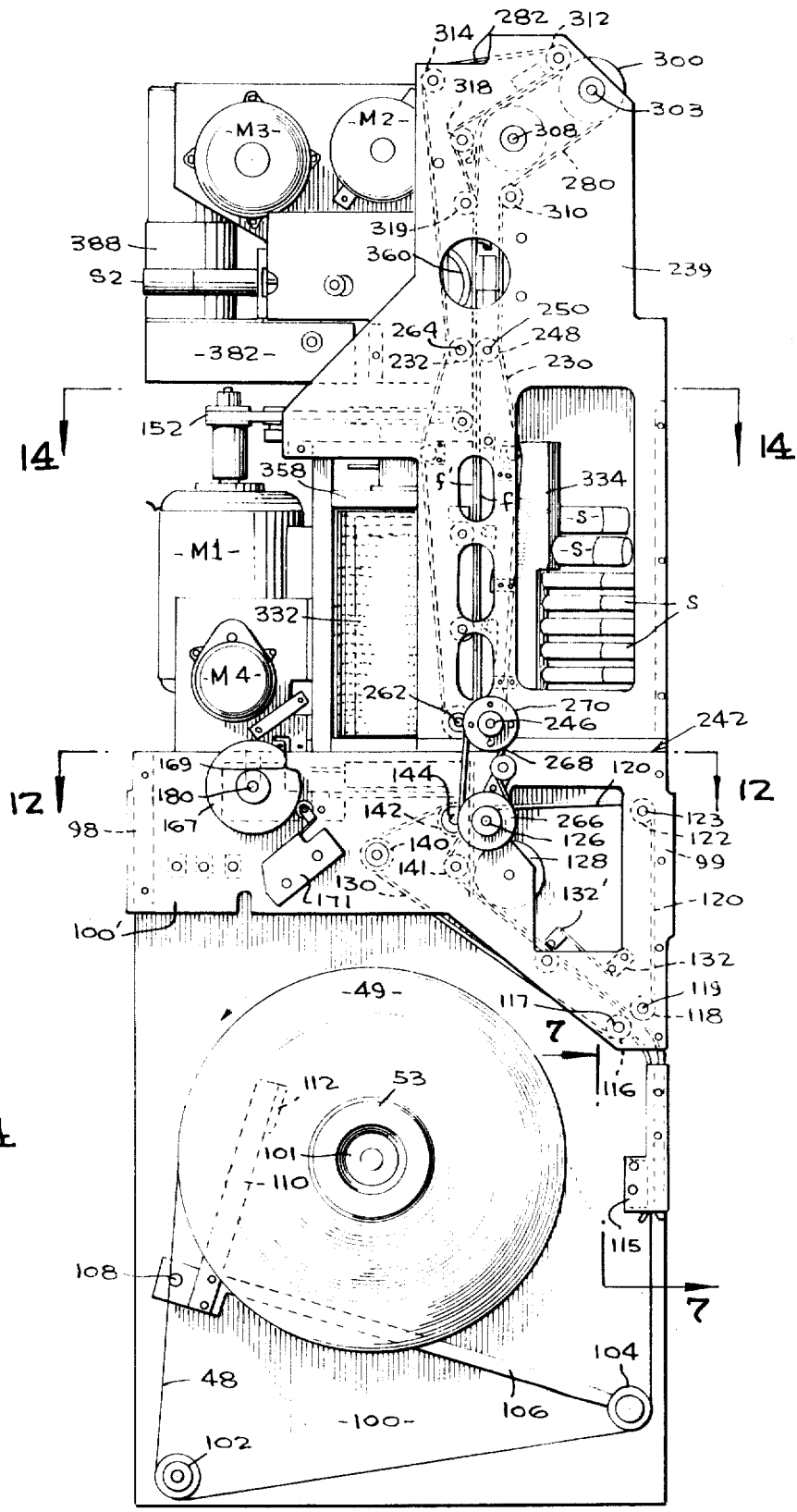
Figure 11:
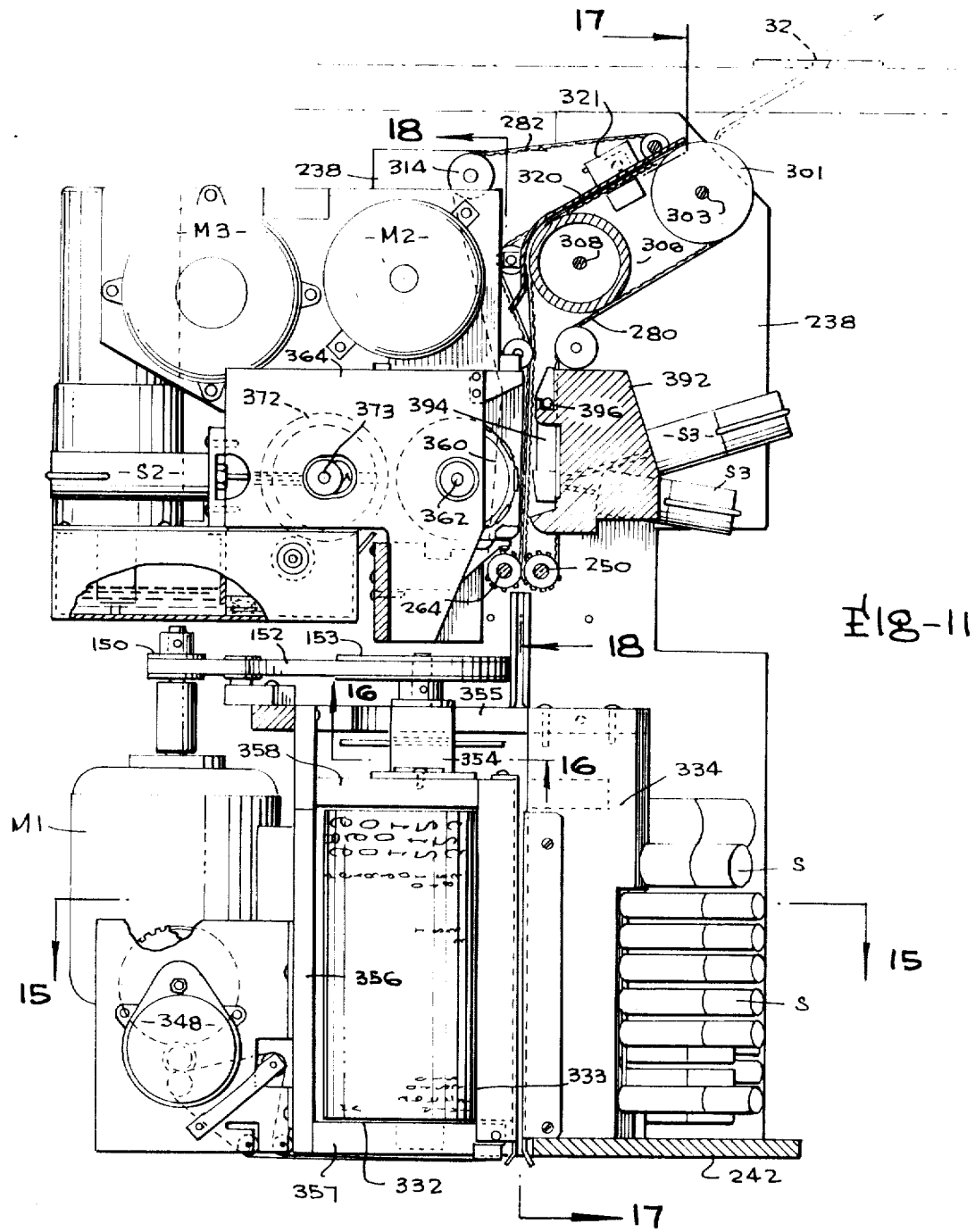
Figure 14:
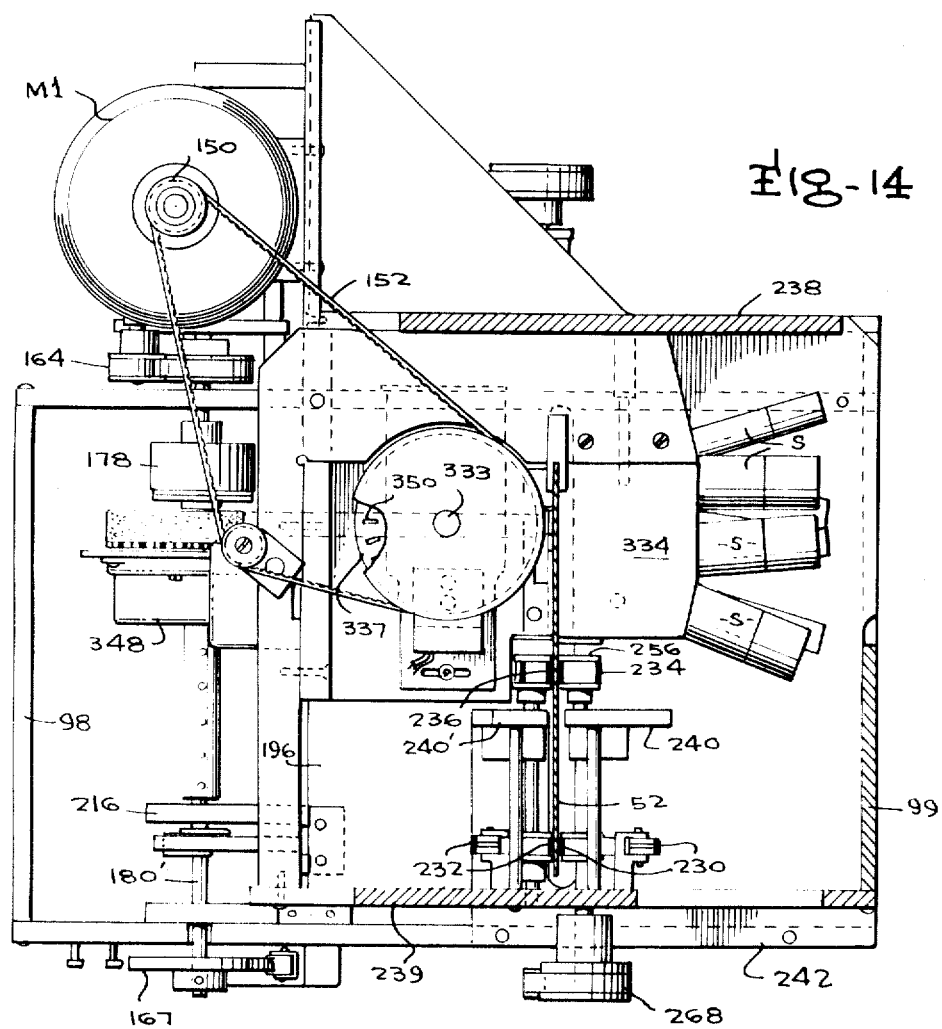
Figure 17:
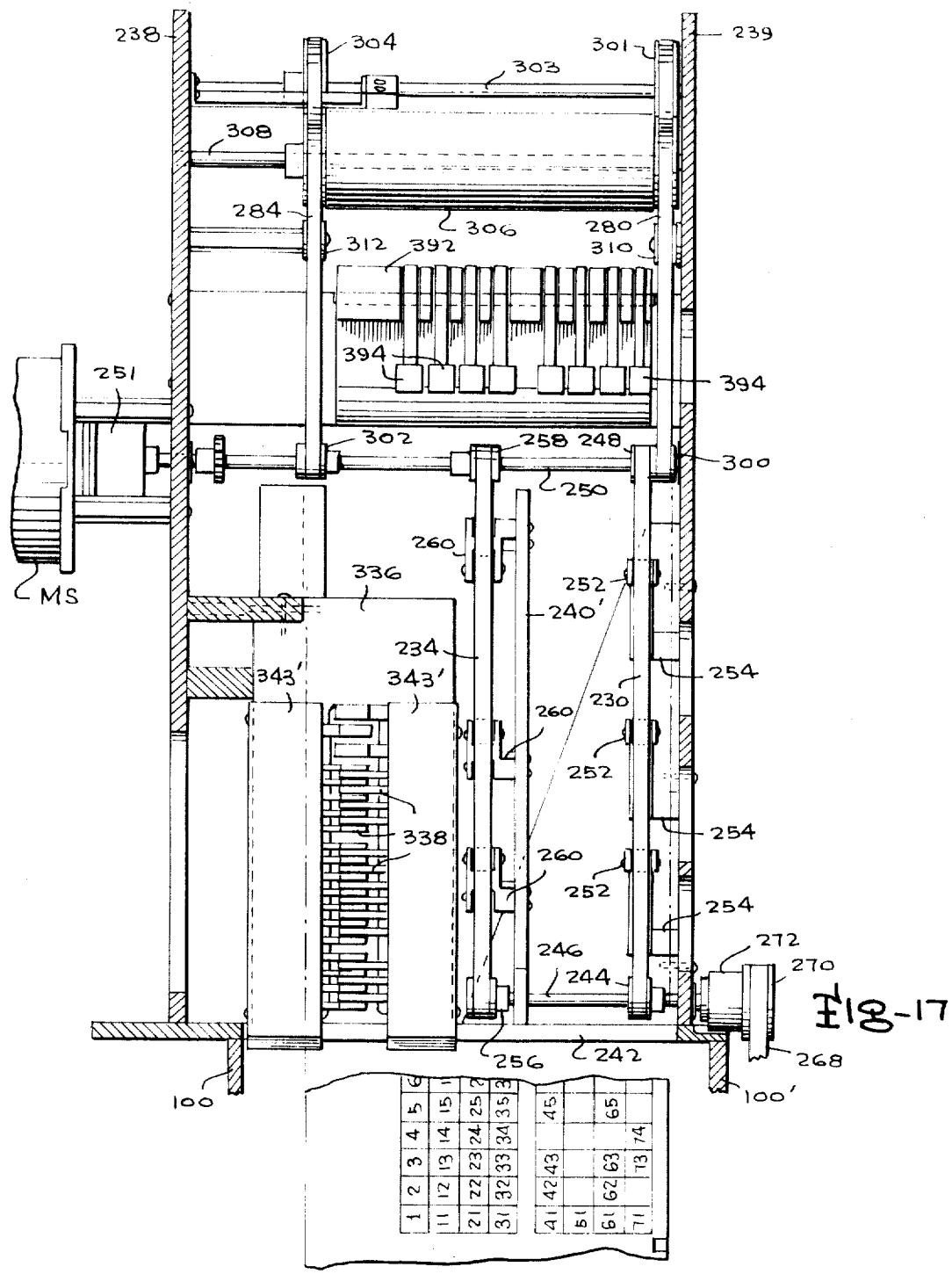
Figure 20:
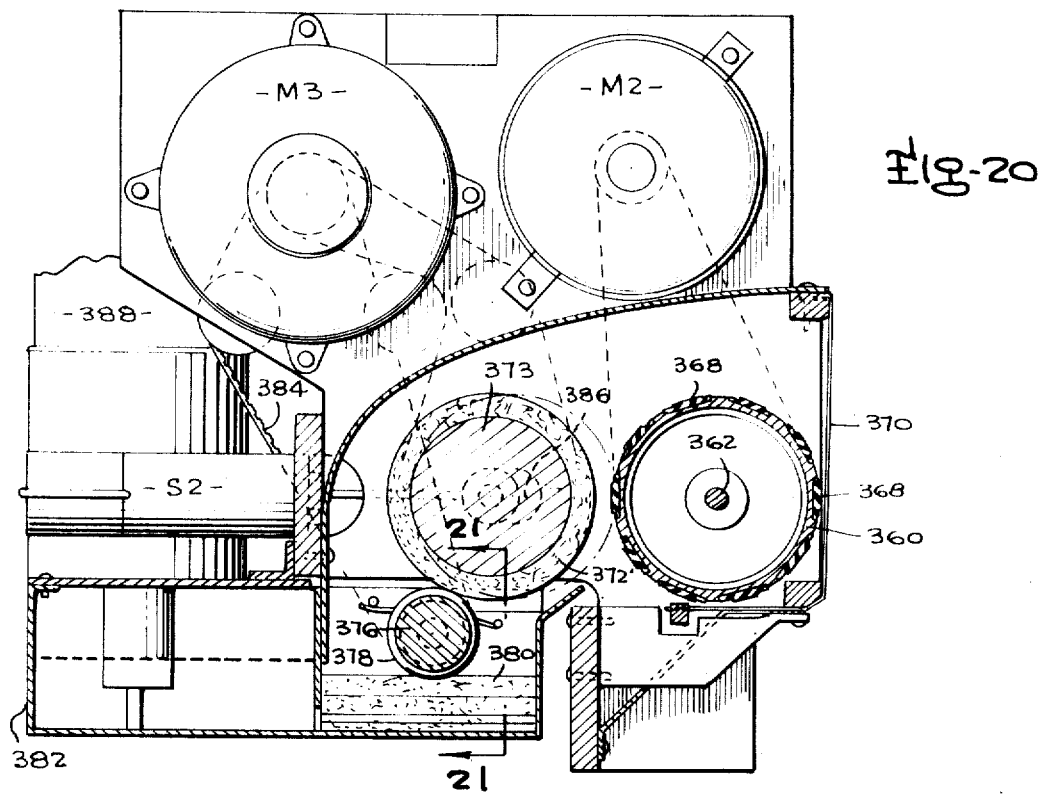
Figure 21:
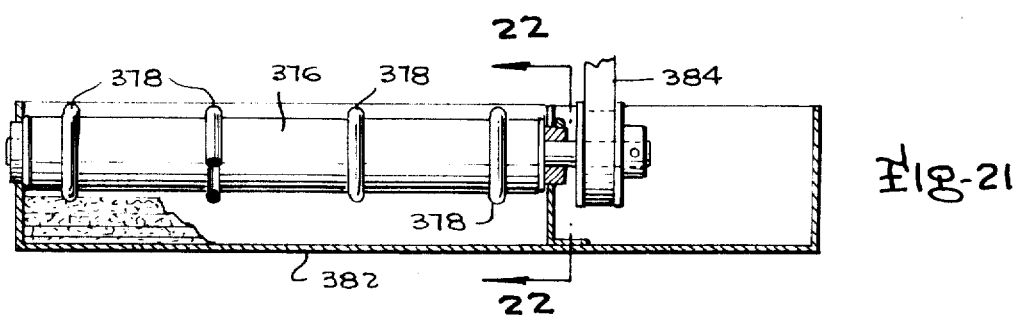
Figure 22:
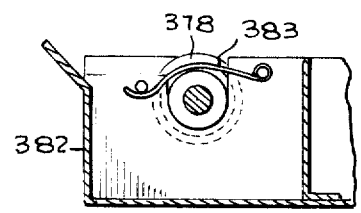
Figure 26:
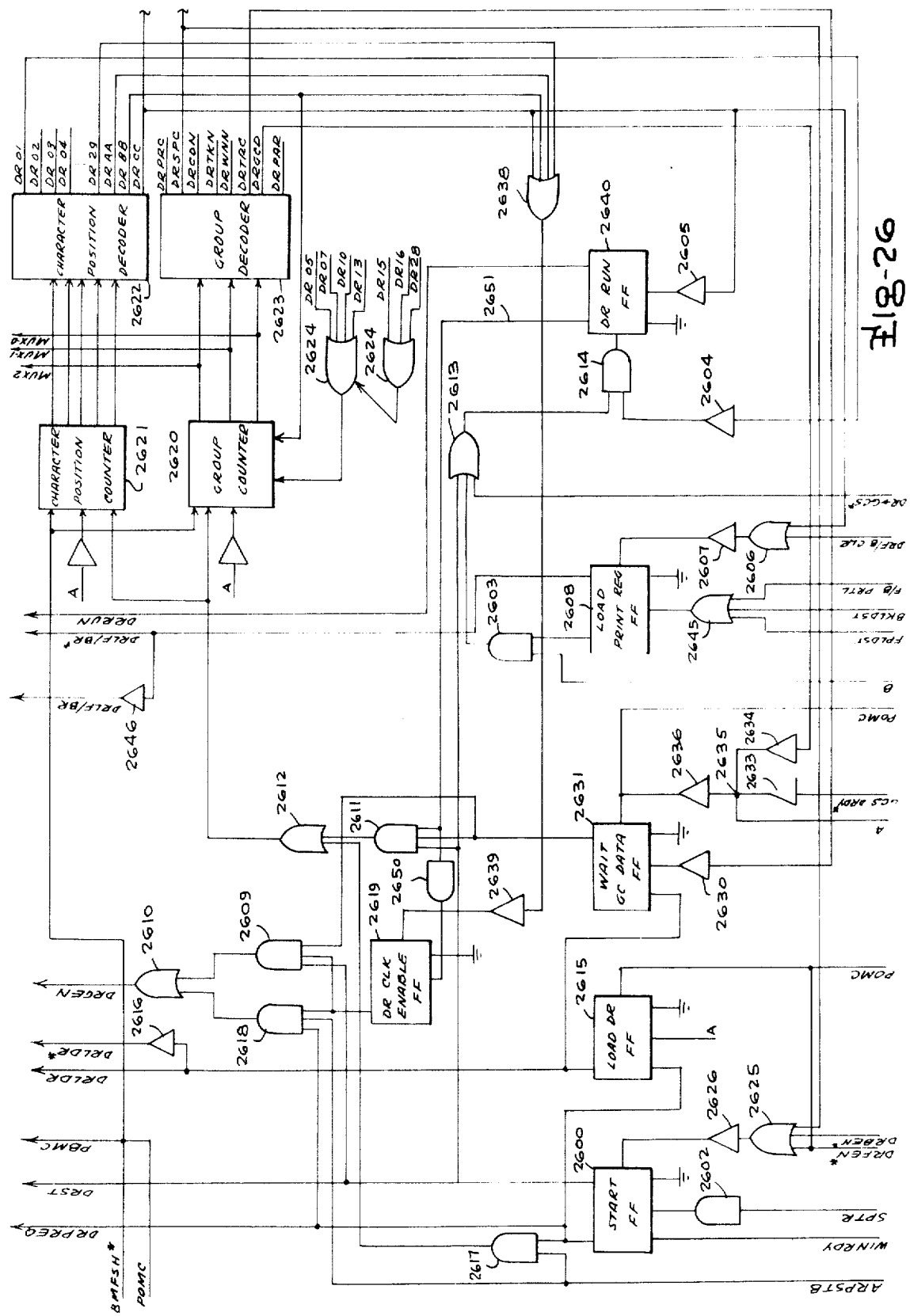
Figure 27:
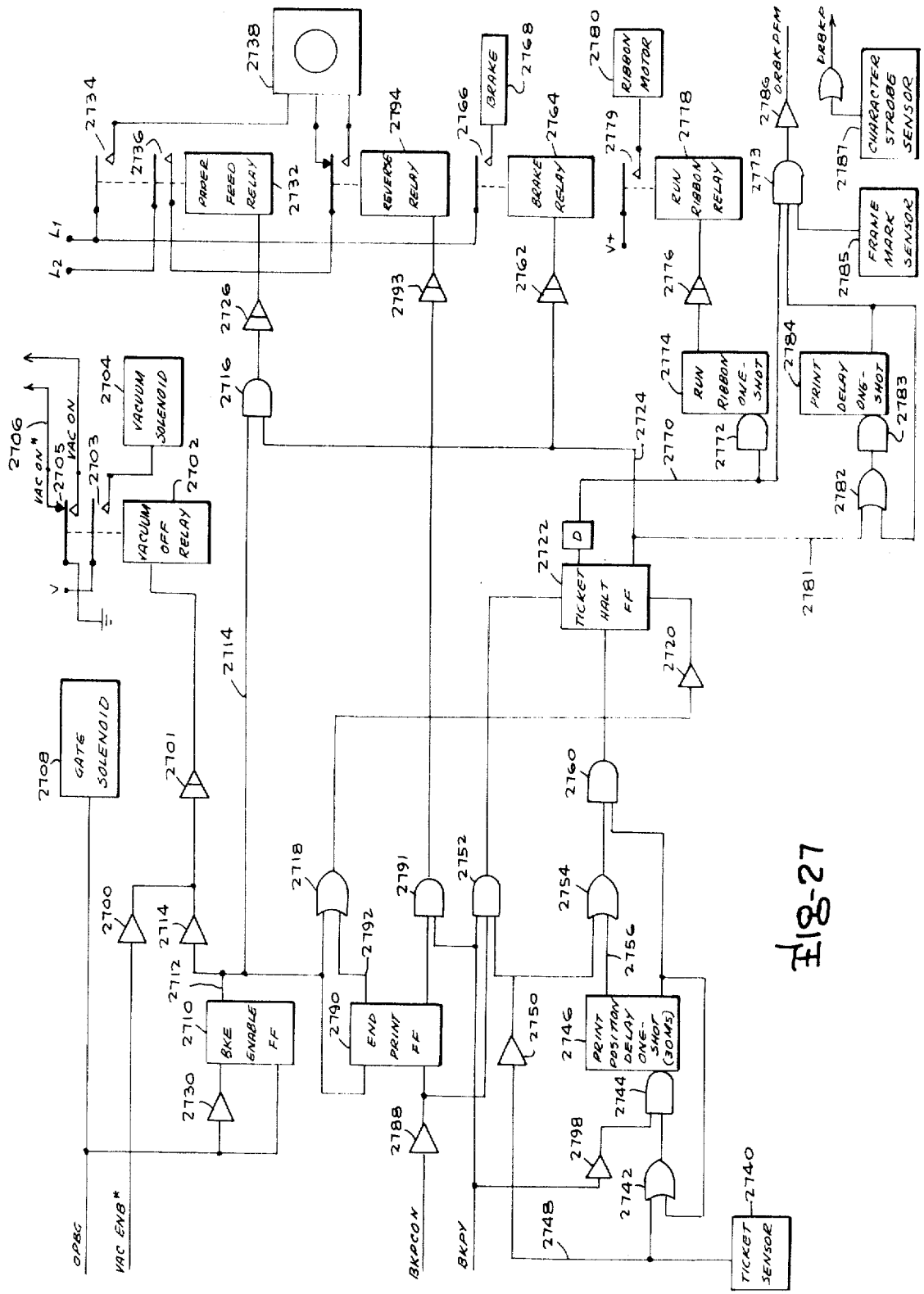
Figure 29:
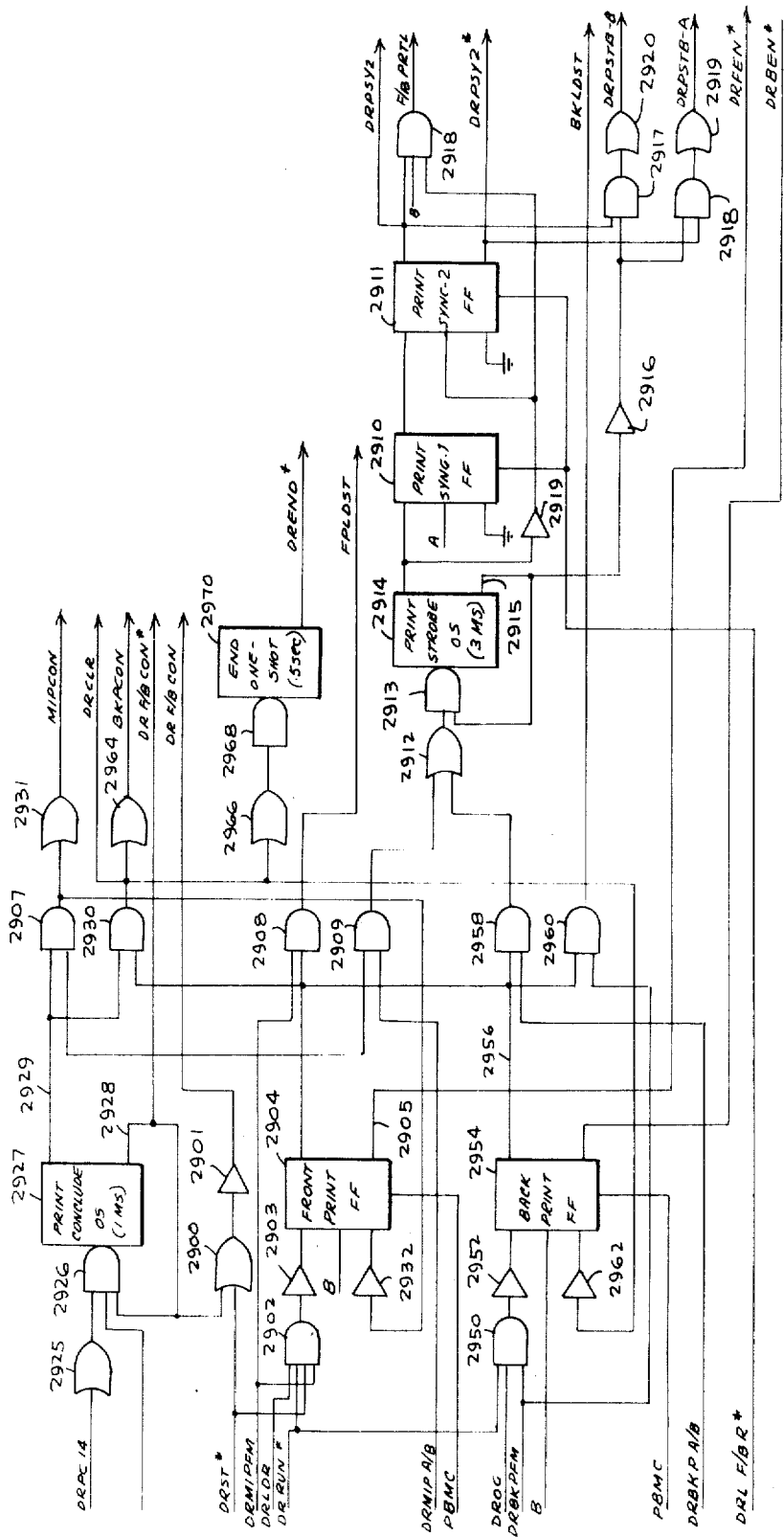
Figure 31:
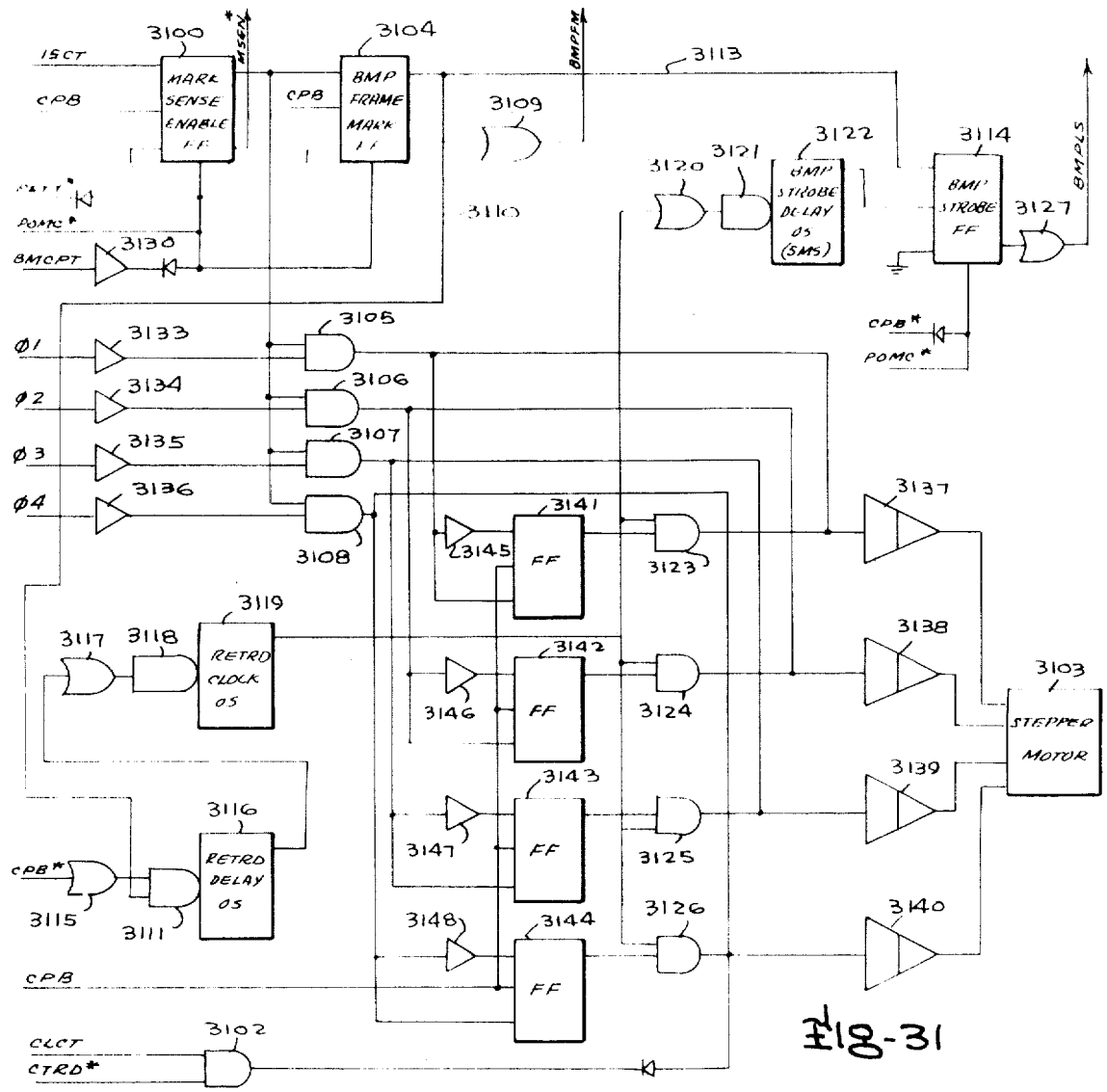
Figure 30:
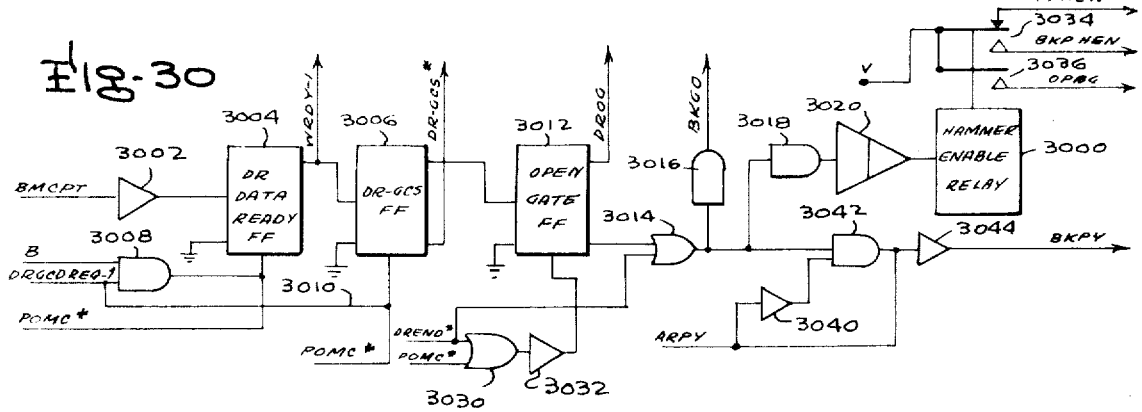
Figure 32:
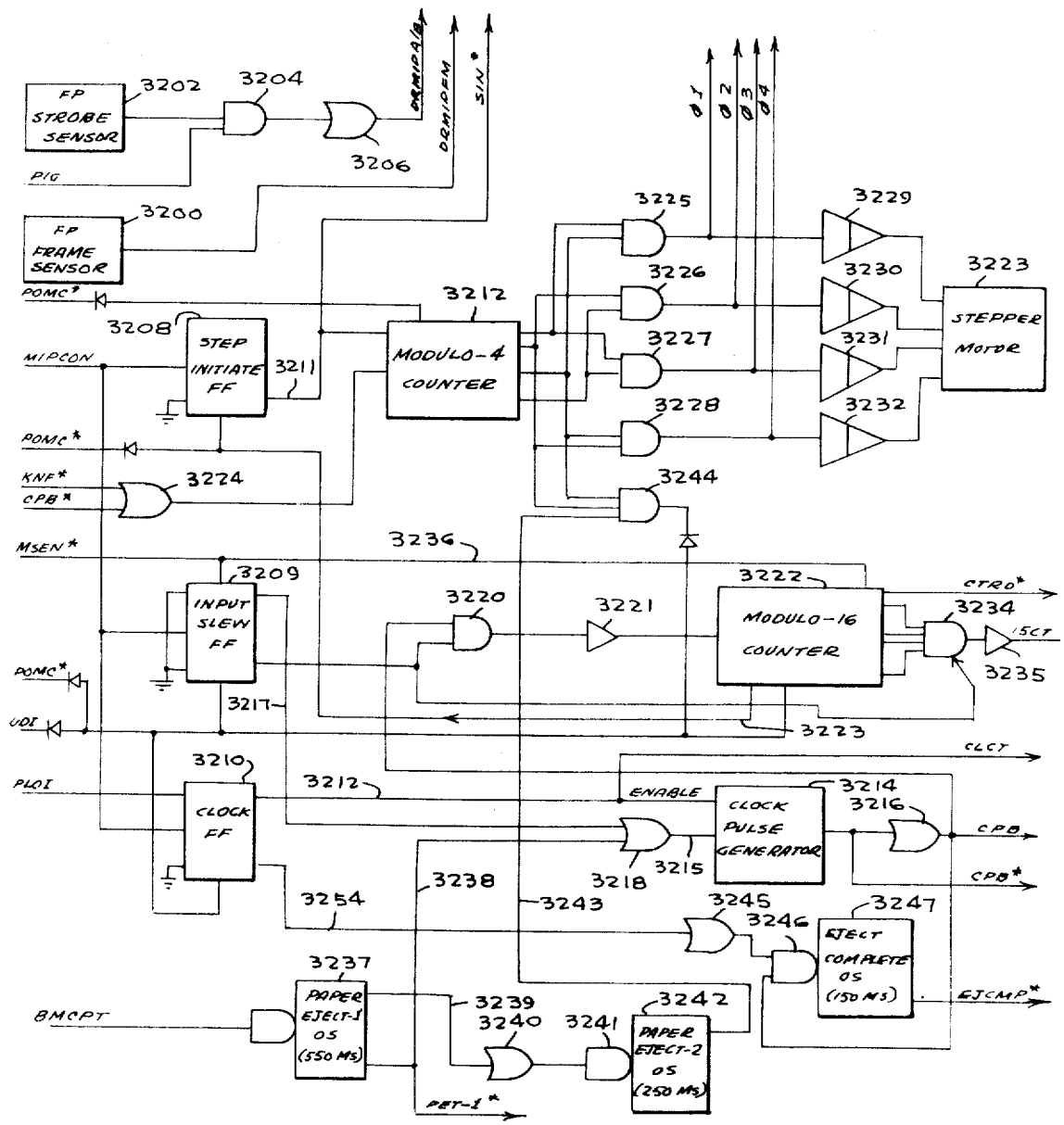
Figure 33:
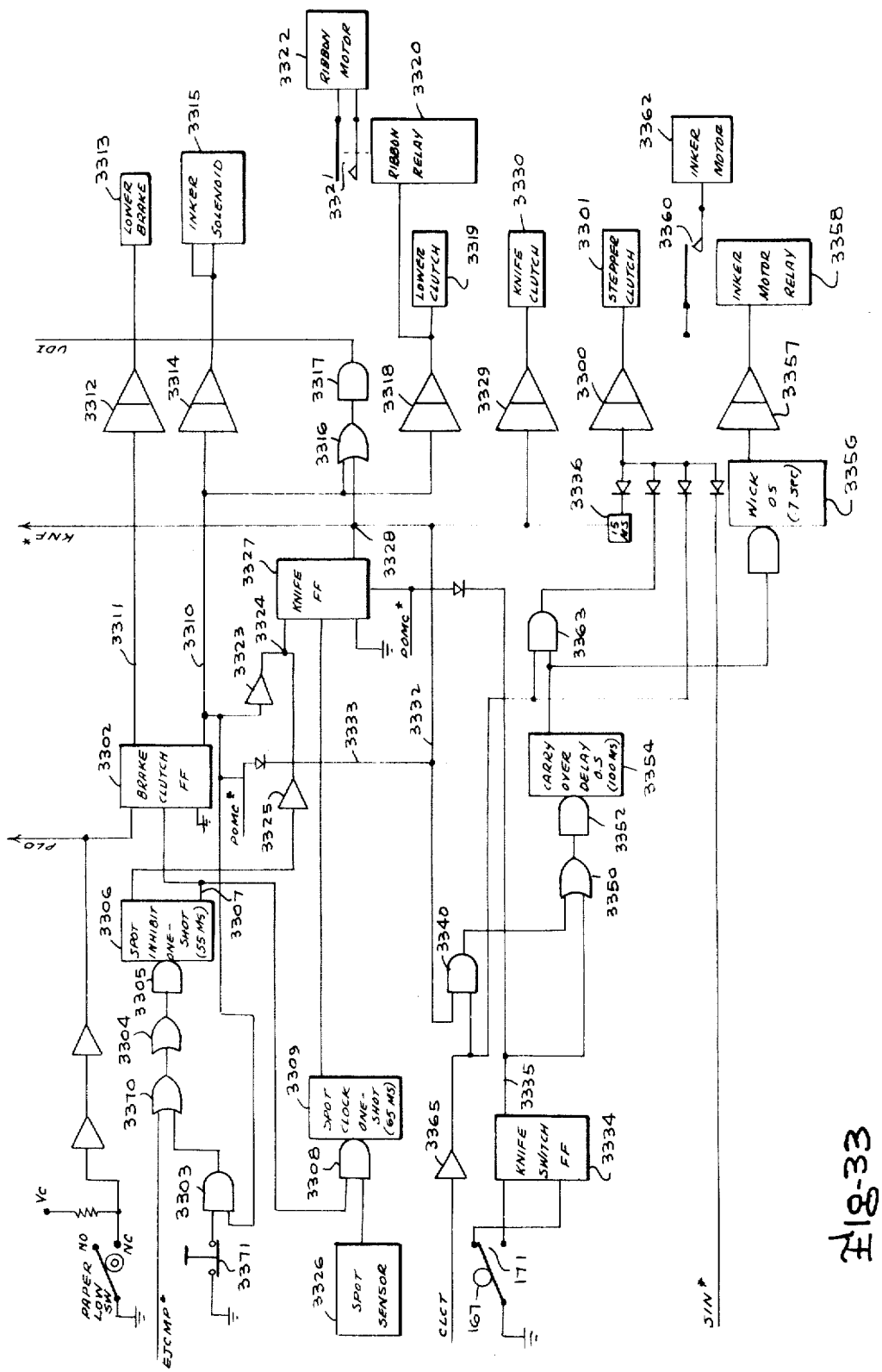

FIG. 4 comprises a rear elevational view of a duplicate ticket feeding and printing means of the preferred embodiment;

FIG. 5 is a side elevational view of the ticket feeding and printing means of FIG. 4;

FIG. 6 is a sectional view taken along lines 6—6 of FIG. 5;

FIG. 7 is a sectional view taken along lines 7—7 of FIG. 4;

FIG. 8 is a sectional view taken along lines 8—8 of FIG. 7;

FIG. 9 is a sectional view taken along lines 9—9 of FIG. 8;

FIG. 10 is a sectional view taken along lines 10—10 of FIG. 5;

FIG. 11 is a sectional view taken along lines 11—11 of FIG. 5;

FIG. 12 is a sectional view taken along lines 12—12 of FIG. 4;

FIG. 13 is a sectional view taken along lines 13—13 of FIG. 12;

FIG. 14 is a sectional view taken along lines 14—14 of FIG. 4;

FIG. 15 is a sectional view taken along lines 15—15 of FIG. 11;

FIG. 16 is a sectional view taken along lines 16—16 of FIG. 11;

FIG. 17 is a sectional view taken along lines 17—17 of FIG. 11;

FIG. 18 is a sectional view taken along lines 18—18 of FIG. 11;

FIG. 19 is a sectional view taken along lines 19—19 of FIG. 18;

FIG. 20 is a sectional view taken along lines 20—20 of FIG. 18;

FIG. 21 is a sectional view taken along lines 21—21 of FIG. 20;

FIG. 22 is a sectional view taken along lines 22—22 of FIG. 21;

FIGS. 23A and 23B, when arranged as shown in FIG. 23C comprise a block diagram showing the major information transfer paths in one window unit and from the window unit to a game control station;

FIG. 24 shows the circuits for generating the signals indicating that a window unit is ready for operation;

FIGS. 24A through 25F shows various control circuits for controlling a window unit;

FIG. 26 shows a timing control circuits employed primarily to control the shifting of data into the data register, recirculate data in the data register, and shift data from the data register to the game control station;

FIG. 27 shows the logic circuits for controlling ticket feed and ribbon feed operations in the back printer unit;

FIG. 28 shows the logic circuits for controlling the data multiplexer at the game control station;

FIG. 29 shows the logic circuits for controlling printing operations by both the front printer and the back printer;

FIG. 30 shows the window control station circuits for issuing a data transfer request to a game control station, and for receiving an acknowledge signal therefrom;

FIGS. 31 and 32 show the circuits for controlling the stepper motors for the upper front printer drive and the brush mark printer cylinder;

FIG. 33 shows the circuits for controlling the feed of the strip of tickets and the severing of one ticket at a time from the end of the strip; and, FIG. 34 shows the control circuits at the game control station for controlling the transfer of information from a window unit to a data register at the game control station.

Attention is initially invited to FIG. 1 of the drawings which illustrates a point of sale transaction terminal generally designated 20 and which includes a counter 22 having a customer side 24 and an operator side 26. An operator is positioned behind the counter 22 adjacent the operator's side 26 for receiving wagers and customer marked tickets 28' which have been marked on desired number spots in the usual manner.

In addition, the transaction terminal 20 also includes a manually settable keyboard 30 into which the operator enters the price of each transaction and the nature of the transaction.

An electronic visual display means 31 is provided forwardly of the keys of keyboard 30 for displaying the number of spots and the price of the transaction. A duplicate ticket ejecting slot 32 is also provided in counter 22 for providing a copy of the customer marked ticket as a receipt for the customer.

Counter 22 also includes an optical scanning means 34 above which is located a relatively high intensity source of illumination 36 which directs high intensity light downwardly onto the scanning means as shown.

A cover box 38 is located immediately adjacent the optical scanning means 34 and encloses a back printer 40 for receiving customer marked tickets 28' via a gate 42 immediately adjacent the photoelectric scanning means 34 for imprinting data on the customer marked tickets in a manner and for a purpose which will become apparent. In addition, the transaction terminal 20 also includes a recessed receptacle 44 for receiving the customer marked tickets 28' after they have been imprinted by the back-printer 40. A protective and/or ornamental facing 46 of plastic or glass is provided along the front and side periphery of the counter 22 as desired and a cash drawer 47 is provided beneath the counter.

Transaction terminal 20 is in the form of a cabinet structure of which the counter 22 is the top with internal components being mounted on the interior of the cabinet beneath the counter 22. These internal components include a web transporting and feeding means for feeding a strip of preprinted keno tickets 48 from a roll 49 (FIG. 4). The duplicate keno tickets printed on the web strip 48 are equidistantly spaced along the length of the strip as are feed control marks 50 (FIG. 2) provided for the purpose of controlling the feed of the web to a ticket severing means 51 for severing discrete duplicate ticket blanks 52 from the forward end of the web. Control marks 50 also serve to provide output control signals from the duplicate ticket blanks 52 during their movement through the system.

A selective printing means 60 is provided for operation under the control of signals from the keyboard 30 to receive each duplicate ticket blank 52 for imprinting the face of the ticket with data indicative of information entered in the keyboard as well as other identifying information.

Imprinted tickets from selective printing means 60 are fed to a selective duplicate spot printing means 62, which imprints duplicate spots in the number areas of the duplicate blank 52 in accordance with readout signals from the scanning means 34. Consequently, the spots printed by printing means 62 are printed on the same numbers (spots) of the duplicate blank 52 as the manually applied spots of the customer marked ticket 28'. A printed duplicate ticket 52' is ejected via slot 32 from the selective spot printing means 62 onto the top of counter 22 for return to the customer as a receipt for the transaction.

Turning now to the detailed specifics and nature and operation of the respective components, attention is invited to FIG. 3A which illustrates a typical blank keno ticket 27 which comprises eighty number spots 70 each having a number imprinted on its surface with the eighty spots being divided into an upper bank 72 and a lower bank 74 each containing forty number spots.

In playing the game, the customer places markings such as individual marks 29 (FIG. 1) in desired spots to blank out the numbers in the respective desired spots. Such markings 29 can be made with a crayon or the like; however, the usual procedure is to make such markings with a brush by the application of a brush mark usually referred to as Chinese brush mark due, no doubt, to the Chinese origins of the game. In any event, the individual spots 29 are indicative of the numbers which the customer has selected to play. It is also the usual procedure for the customer to write in the price of the transaction on the top portion of the ticket.

Scanning means 34 includes 80 individual photoelectric spot sensing members 80 which are positioned in two banks so that each of the individual photoelectric sensing means 80 is positioned beneath an individual number spot 70 of a customer marked ticket 28' when the ticket is positioned in proper alignment in the photoelectric scanning means. The presence of a customer applied mark 29 on the ticket 28' will serve to provide a signal from the individual photo sensitive means 80 located beneath the particular spot (number) to which the mark 29 was applied. Such signals are received and retained in a conventional memory storage means 82 from which they are extracted on a signal from the keyboard at a proper time for the control of the selective spot printing means 62.

In addition, the optical scanning means 34 also includes a cycle initiating photocell 84 which, when blocked by the movement of the operator's hand across its upper surface, provides a signal to start a scanning cycle for the photo sensitive elements 80 and to activate a vacuum supply to a plurality of apertures 86 extending about the periphery of the photo sensitive cells 80 for the purpose of retaining a customer marked ticket 28' in position on the scanning means 34. Also, the scanning means 34 includes an identification card receiving aperture in which the particular operator's identification card 88 containing coded entries indicative of the operator's identity is inserted. The operator's ID card consequently provides signals by photo sensitive readout means (not shown) beneath the card indicative of the presence of the card and the identity of the operator. However, other conventional mechanical card sensing means for providing such signals could be employed if desired. Five aligned photocells 81 sense the light intensity for compensating for variations in the source 36 and/or paper density.

The web feeding and duplicate ticket feeding and severing means will now be discussed with initial reference being made to FIGS. 4, 5 and 10. A lower front frame plate 100 is provided as part of the overall supporting frame for the strip feed and cutting components, which frame also includes a lower rear frame plate 100' connected to plate 100 by side plates 98 and 99. Frame plate 100 supports a cantilevered roll supporting shaft 101 upon which the roll of tickets 49 is supported for rotation by means of a hub sleeve 53.

The strip of preprinted tickets 48 is fed from roll 49 over a first idler guide roller 102 from which it extends to a floating idler guide roller 104 mounted on the end of an arm 106 pivotally connected at 108 to the frame plate 100. A braking arm 110 having a pad 112 on its extreme end extends perpendicularly from arm 106 closely adjacent the pivot 108 so that the pad 112 rests upon an end of the hub sleeve 53 supporting roll 49 to prevent over-running of the roll and to maintain the web strip 48 in tension in an obvious manner.

Web 48 extends from the floating idler roller 104 upwardly through a guide slot S defined by guide plate member 113, a frame block 114 and a curved discharge plate 114'. A photoelectric sensor 115 is positioned adjacent the lower edge of slot S for detecting the control marks 50 on strip 48.

Slot S serves to guide the web inwardly between the nip of a pair of feed belt guide rollers 116 and 118 over which cooperating tape transport belts 120, 130 extend. Rollers 116 and 118 are respectively mounted on shafts 117 and 119 extending inwardly from frame plate 101' and across to plane 100. Tape transport belt 120 extends about roller 118, an idler roller 122 mounted on a shaft 123, a drive roller 124 keyed to a shaft 126 extending across the width of the space between frame plates 100 and 100' and a large guide roller 128 as best illustrated in FIG. 10. In addition, another belt 120' is horizontally aligned with belt 120 on guide rollers 118', 122' etc. adjacent frame plate 100 and coaxial with rollers 118, 122, etc. Belts 120 and 120', respectively, engage the strip 48 along opposite edges thereof.

Similarly, feed belt 130 extends about roller 116, idler rollers 140 and 141 and a drive roller 142 keyed to a shaft 144. A belt 130' is aligned with belt 130 and includes supporting roller means (using primed designators corresponding to the corresponding elements of belt 130) provided adjacent frame plate 100 with belt 130' cooperating with belt 120' in the same manner as belts 120 and 130 cooperate as shown in FIG. 10.

The belts move in the direction of the arrows shown in FIG. 10 by virtue of a geared connection between shafts 126 and 144 so that the strip 48 is fed upwardly between the inwardly facing flights of the two respective cooperating belt pairs 120, 130 and 120', 130'. A belt tensioner 132 having a belt engaging arm 132' aids in maintaining proper belt tension. Strip 48 is fed upwardly and engages the right side of a vertical guide plate 146 as viewed in FIG. 10 which directs the strip upwardly through the ticket severing means 51 in an obvious manner.

Power for driving the tape transport belts 120 and 130 is provided by means of a main drive motor M1 (FIG. 5) which is continuously operated to provide an output drive from a step-down transmission 160 through a pulley 162 to a belt 164 and a pulley 165 keyed on a main output drive shaft 166 (FIG. 12). Shaft 166 is connected on one end to the input side 168 of a selectively operable strip drive electrical clutch 170 which is selectively actuable to provide an output drive to a shaft 172 on which a pulley 174 is keyed. The other end of shaft 166 is connected to the input side 176 of a shear drive electric clutch 178 having its output drive connected to a shear drive shaft for driving the ticket severing means in a manner to be discussed hereinafter.

A belt 182 extends from pulley 174 over an input paper drive pulley 184 (FIG. 12) which is keyed to the shaft 144 and connected to an electric brake means 188, the purpose of which will become apparent.

It is to be noted that shaft 144 supports driving pulleys 142 and 142' upon which aligned belts 130 and 130' are mounted and that shaft 144 is gearingly connected to shaft 126 on which belts 120 and 120' are driven in conjunction with belts 130 and 130' in the direction of the arrows shown in FIG. 10 for feeding the ticket strip 48 upwardly to the cutting means 51 at all times when clutch 170 is activated.

Cutting means 51 will now be discussed in detail with initial reference being made to FIGS. 10, 12 and 13. The cutting means includes a fixed blade member 190 extending across the width of the space between the vertical frame plate members 100 and 100'. Support for the fixed blade member 190 is provided by a horizontal support plate 192 extending between the frame components 100 and 100' and which is generally of rectangular configuration, but which includes protruding support tabs 194 adjacent the frame members 100 and 100'. The fixed blade member 190 is fixedly attached to the forward ends of tabs 194. Vertical guide plate 146 extends upwardly along one side of the support plate 192 between the innermost edges of the tabs 194 as best shown in FIGS. 12 and 13 with a clearance space extending between plate 146 and fixed plate 190 through which space the ticket strip is fed.

A movable shear blade 196 is mounted for reciprocation in inwardly facing slots of floating support blocks 198 and 198'. Both ends of block 198' are biased downwardly by spring means 202 extending between the horizontal support plate 192 and pin members 204 extending upwardly through the plate 192 into the base of each of the support blocks; however, only the right end of block 198 is biassed downwardly as viewed in FIG. 12 while the left end of block 198 is mounted for pivotal movement about a pivot P. Relatively short spacers 201 are provided beneath each end of block 198' while longer spacers 205 are provided beneath block 198. The movable shear blade 196 includes a forwardly extending positioning tab 196' resting upon the upper cutting edge of the fixed blade member 190; consequently, downward movement of the movable shear blade 196 is limited by the engagement of the elements comprising tab 196' and fixed blade 190 in an obvious manner.

Reciprocation of the movable shear blade 196 is effected by means of a pair of drive links 208 pivotally connected to brackets 210 affixed to the rear edge of the upper side of blade 196 by pivot pins 212 (FIG. 13). The other end of each of the drive links 208 is connected to an eccentric 214 keyed to a shaft formed of two elements 180, 180' connected by a sleeve coupling C with the elements 180, 180' extending through support plates 216 which provide rigid support adjacent the eccentric members 214 and which are fixed to the horizontal support plate 192. Therefore, rotation of shaft 180,180' (which can only occur upon actuation of the electro-magnetic clutch 178) serves to pivotally move the movable shear blade 196 forwardly to sever the strip 48 extending upwardly between the vertical guide plate 146 and the fixed blade member 190. It should be noted that the forward or cutting edge 197 of the blade is canted longitudinally with respect to the cutting edge 191 of the fixed blade 190 as shown in FIG. 12, so as to provide a scissor-like shearing action for cleanly shearing individual duplicate tickets 52 from the forward end of the strip 48.

Rotation of shaft 180' also results in rotation of a switch control cam 167 (FIG. 4) keyed to the shaft and having a peripheral dimple 169 into which a roller follower of a microswitch 171 drops to actuate the switch for a purpose to be discussed hereinafter.

Tickets 52 severed from the forward end of the strip 48 are fed upwardly to the selective printing means 60 by ticket infeed means comprising two pairs of cooperating feed belts with the first pair being belts 230 and 232 and the second pair being belts 234 and 236 (FIGS. 4,14). Belts 234 and 236 have inwardly facing adjacent flights engaging the duplicate ticket blanks 52 adjacent the middle portion of the ticket blanks and belts 230, 232 have inwardly facing adjacent flights f and f' respectively engaging the right edge of ticket blank 52 (as viewed in FIG. 2, for example) for feeding the blank ticket upwardly into the printing means 60 to position the ticket at rest in the printing means and to subsequently convey the ticket away from printing means 60 for subsequent movement to the spot printing means 62.

Support for the various feed belts for conveying the tickets 52 through the printing elements is provided by forward and rear frame plates 238 and 239, respectively, along with intermediate vertical support members 240 and 240' extending upwardly from a horizontal table plate 242 (FIGS. 11 and 17).

Belt 230 is mounted on a main drive pulley 244 (FIG. 17) keyed to a main input drive shaft 246 supported by the intermediate vertical support member 240 and the rear frame plate 239. The upper end of belt 230 rides in a pulley 248 mounted on a stepper drive shaft 250. Intermediate portions of the belt 230 are supported by means of idler pulleys 252 mounted inwardly on frame plate 239 by means of bracket members 254 as shown in FIG. 17. Similarly, the lower end of belt 234 rides in a pulley 256 keyed to shaft 246 with the upper end of belt 234 riding in a pulley 258 keyed to the stepper drive shaft 250. Intermediate idler pulley supporting bracket assemblies 260 extend from the intermediate vertical support member 240 to support the intermediate portions of belt 234 as shown in FIG. 17. A photoelectric ticket sensor 261 is also supported by support member 240 for sensing the presence of a ticket.

In like manner, belts 232 and 236 are supported on their lower ends by pulley members keyed to the shaft 262 (FIG. 4) in horizontal alignment with shaft 246. The upper end of belts 234 and 236 are supported by pulleys provided on a transversely extending shaft 264 which is gearingly connected to shaft 250 as shown in FIG. 11.

Power for driving the belts 230, 232, 234 and 236 is provided from the output drive pulley 266 mounted on the end of shaft 126 (FIGS. 4 & 12). A belt 268 extends about pulley 266 and rides in a pulley 270 on the input of a one-way drive clutch 272 having its output keyed to shaft 246 (FIGS. 5 & 17). Clutch 272 is capable of conveying clockwise rotation of pulley 270 to shaft 246 as viewed in FIG. 4. However, clockwise rotation of shaft 246 is not conveyed to pulley 270 and belt 268 by virtue of the clutch construction 272.

In any event, actuation of the motor M1 for driving the lower feed belts 120, 130, etc., will consequently result in a driving movement of the feed belts 230, 232, etc. via shaft 126, clutch 272, etc. However, the drive belts for transporting the severed ticket through the printing means are also capable of being driven in the same direction as they are driven by motor M1 by means of a stepper motor MS capable of providing discrete clockwise rotational increments of movement (as viewed in FIGS. 4 and 11) while lower belts 120, 120', 130 and 130' remain stationary. Increments of movement from stepper motor MS are applied to shaft 250 through a selectively operable electric stepper motor clutch 251 in response to individual input signals which motion is not conveyed through one-way clutch 272 to the lower belts 120, etc. Gear means on shafts 250 and 264 (FIG. 11) serves to drivingly connect these shafts so that increments of rotation of the shaft 250 caused by incremental movement of stepper motor MS is conveyed to shaft 264 to provide a consequent incremental driving movement of belts 230, 232, 234 and 236.

An output ticket transport means is provided for transporting tickets received from the upper ends of belts 230, 234, etc. and incrementally moving such tickets upwardly past the spot printing means 62 for subsequent discharge through the duplicate ticket ejecting slot 32 (FIG. 1). This transporting and conveying means includes a pair of cooperating belt members 280 and 282 (FIG. 11) mounted adjacent rear frame plate member 239 for engaging one edge of the ticket and a second pair of cooperating belt members 284 and 286 (FIG. 19) mounted adjacent frame plate 238 for engaging the other edge of the ticket.

The lower ends of belts 280 and 284, respectively, ride in pulleys 300 and 302 each keyed to stepper drive shaft 250 (FIG. 17). The upper end of belt 280 extends about a pulley 301 on a shaft 303 which also provides support for a pulley 304 supporting the upper end of belt 284. In addition, belts 280 and 284 extend about pulleys mounted adjacent each end of an elongated guide roller 306 mounted for rotation on a shaft 308 as shown in FIGS. 11 and 17. Additional support for belt 280 is provided by an idler 310 and similarly for belt 284 by means of an idler 312 (FIG. 4). The upper ends of belts 282 and 286 are supported by aligned idler members 312 and 313 along with aligned idlers 314 and 315 respectively. In addition, idlers 316 and 318 engage belt 286 and are in alignment with idlers 317 and 319 engaging belt 286 which is also engaged with an external idler 321. A deflector shield 320 (FIG. 19) serves to aid in deflecting the printed tickets being fed by the belts outwardly around the periphery of roll 306 for discharge by slot 32. A sensor 321, identical to sensor 115 and including a light source and photoelectric means, is mounted adjacent the rear side of shield 320 for detecting a ticket being ejected from slot 32 to provide an output signal indicative of the issuance of the duplicate ticket 64.

Selective printing means 60 is provided for the purpose of printing a line of information 330 across the top of the duplicate ticket blank 52 in the manner shown in FIG. 3B. The line of information 330 will always include the game number 322 which is usually printed in larger numbers at the end of the line as shown in FIG. 3B along with the price of the transaction, the number of spots marked by the customer, the number of the keno writer, the date, the time, the ticket serial number and the type of transaction or ticket played. Obviously, the nature of the manner in which such information is imprinted and the content of the imprinted information itself can be varied if desired.

The line of information 330 is printed on a stationary blank ticket 52 by an on-the-fly continuously rotating print cylinder 332 supported by a frame formed of support members 355, 356, 357 and 358 driven by the upper output drive consisting of pulley 150, belt 152 and pulley 153 from the main motor M1. Cylinder 332 is journaled for rotation about a vertical axis as shown in FIG. 11 and is positioned immediately adjacent the feed path of the blank ticket members 52. The surface of cylinder 332 is provided with a plurality of circumferential rings 333 of raised print characters some of which are limited solely to numbers while others of which include letters so that rotation of the cylinder 332 through a complete revolution will present every character of every ring 333 into position adjacent the ticket blank.

A hammer support assembly 334 is provided on the other side of the ticket feed path immediately adjacent the feed path for selective actuation in a well-known manner for imprinting the desired information from cylinder 332. Hammer assembly 334 comprises a machined block 336 (FIG. 15) supporting a plurality of pivotal hammers 338 each supported for pivotal movement about pivots 340 and also supporting a plurality of selectively operable solenoid members S. Each solenoid S is associated with a single pivotal hammer 338 with each hammer being aligned with a respective concentric ring 330 of type on cylinder 32 in vertical alignment therewith so that actuation of the particular solenoid of any particular hammer will pivot the hammer about its supporting pivot shaft 340 into its respective ring of type. In addition, spring means 342 are provided for each of the hammer members for normally returning the hammer members to a retracted position.

A strip of inked nylon ribbon 346 is fed vertically through the printing station immediately adjacent the surface of cylinder 332 and between a vertically extending pair of sheet shields 343 mounted on the cylinder support frame and a second pair of shields 343' mounted on hammer block 336 so that actuation of any particular hammer solenoid S will drive the ticket blank 52 and the inked ribbon into engagement with the raised type members on cylinder 332 between the inwardly facing edges of shields 343 to consequently imprint the ticket. Additionally, adjustable stop members 344 are provided for adjusting the rest position of each of the hammers 338 since the force of the different solenoids can vary slightly so as to vary the amount of time required for driving the hammer into printing contact with solenoid 332. However, by adjusting the stop members 344, the distance necessary for travel of each of the hammers can be varied to compensate for the variation in solenoid force. In other words, the adjustable members 344 would be adjusted to increase the necessary hammer distance of travel for a solenoid having more power than is normally the case while the distance would be decreased for a weaker solenoid so that the time required for actuation of each would be the same.

The ribbon feed means is a conventional construction; however, it will be noted for purposes of clarity that the feed means includes a motor 348 for driving the ribbon in the form of a loop engaging a marking media supply roll 349 driven by motor 348 so that fresh ribbon is always positioned in the printing station prior to the initiation of a printing operation.

Additionally, the cylinder 332 is provided with a timing disc 337 illustrated in FIG. 16 which is attached to the shaft 333' on which the cylinder 332 is mounted for rotation and which includes a plurality of circumferential apertures 350 along with an inner cycle control aperture 352. A photoelectric sensor 354 including a source of illumination and two photo-sensitive means 357' and 358' is mounted so that the source of illumination is on one side of the timing disc and the photo-sensitive means are positioned on the other side of the disc. Photo-sensitive means 358' is positioned beneath the circumferential ring of apertures while the photo-sensitive means 357' is positioned beneath the path of travel of the cycle control aperture 352.

Selective spot printing means 62 is mounted above the selective line printing means 60 and includes a spot print cylinder 360 supported on a shaft 362 extending horizontally in a housing 364 and drivingly connected to a printer stepper motor M2 by means of a belt 366. Cylinder 360 includes a plurality of individual identical print elements 368 in the form of a representation of a brush mark of the type previously manually applied to the receipt ticket by the keno writer. Individual print elements 368 are arranged in eight circular rings which extend about the periphery of the cylinder; individual print elements 368 are also aligned in axially parallel rows parallel to the axis of cylinder 360 as shown in FIG. 18 with the spacing of the elements being the same as the spacing of the number spots on the blank tickets 52. Each ring of individual printing elements 368 is for printing in a specific one of the horizontal columns of the ticket blank as viewed in FIG. 3B while each parallel row of print elements is aligned with a vertical column. For example, the rightmost ring 368R of FIG. 18 is positioned adjacent the upper horizontal line of spots comprising numbers 1 through 10, the concentric ring 368 adjacent ring 368R is positioned on the second horizontal line of spot places comprising numbers 11 through 20 etc. The ticket is stepped by increments into position adjacent the spot print cylinder with the vertical column consisting of numbers 10,20–70,80 being initially positioned for receiving brush mark imprints from a row of print elements if the output from the memory 84 indicates that any spots in that row were marked by the customer. The vertical column comprising spots 9,19,–69,79 is then positioned for brush mark impressions and the cylinder indexed to bring the next row of printing elements into printing position. Succeeding columns are similarly indexed and marked. Flexible wire guide members 370 extend between the paper and the spot print cylinder 360 for keeping the ticket out of contact with the cylinder in all areas other than those engaged by a hammer since all of the printing elements are coated with ink.

Ink is applied to the spot print cylinder 360 by means of a rotating applicator roller 372 mounted on a shaft 373 and having a soft absorbent outer surface 372'. Roller 372 is driven by a motor M3 by means of a belt 374 as shown in FIGS. 19 and 20. Ink is supplied to the transfer roller 372 by means of a transfer roll 376 held in position in vertical slots in a reservoir tray 382 by spring clips 383 (FIG. 22). Transfer roll 376 has a plurality of rubber or plastic rings 378 on its periphery for picking up ink from an absorbent pad 380 on the interior of ink reservoir 382 as clearly shown in FIGS. 20 and 21. Rings 378 engage the top of the absorbent pad 380 which is maintained in a moist condition by ink in reservoir 382.

Drive from motor M3 is conveyed to the transfer roll 376 by means of a belt 384. The roller 372 is reciprocated between the solid line position illustrated in FIG. 20 in which it receives ink from the rings 378 and the dashed line position in which ink on and in the absorbent cover 372' is applied to the horizontal axially parallel row of printing elements 368 facing roller 372. Reciprocating movement of roller 372 is provided by means of first and second solenoids S2 mounted to engage the bearings on each end of the shaft 373 with the bearings being mounted for horizontal movement in slots in the housing as shown in FIG. 11. Shaft 373 is biased to the left as viewed in FIGS. 11 and 20 by means of spring means 386 positioned to engage the bearings at each end of the shaft 373. The roller 372 is normally in the solid line position illustrated in FIG. 20 except during such times as when the solenoids S2 are actuated. Ink is maintained in reservoir 382 by means of a gravity feed from a bottle 388.

A hammer assembly 30 (FIG. 11) is provided adjacent the spot print cylinder 360 and includes a mounting block 392 in which eight pivotal individual hammer members 394 are mounted for pivotal movement about a shaft 396. A solenoid S3 is associated with each one of the hammer members so that actuation of any particular solenoid S3 will serve to actuate its associated hammer member to move the hammer against the back of the ticket so as to move the particular spot adjacent the hammer into printing engagement with the printing element facing the spot. A coil spring 398 is provided on the interior of block 392 with each of the hammer members for biassing the hammers toward the retracted position as shown in FIG. 11.

Back-printer 40 is essentially identical in construction to the selective printing means 60 and includes a driven print cylinder 332' and associated hammer assembly 334' along with a ticket transport comprising conventional selectively operable feed tapes (not shown) for moving the customer marked ticket 28' to printing position adjacent the cylinder 332' and for discharging same into the recessed receptacle 44. It should be noted that back gate 42 is normally closed but includes selectively operable solenoid means for opening the gate to permit insertion of the customer marked ticket 28'. Gate 42 serves as a guide for positioning the ticket on the scanning means when the gate is closed.

ELECTRICAL CONTROLS

For convenience in describing the electrical controls, reference will be made to a signal being positive or negative. However, it will be understood that in actual practice a preferred embodiment of the invention may employ transistorized logic circuits wherein the logical 1 state is manifested by a positive potential and the logical 0 state is represented by a ground level potential.

The circuits to be described employ logical NAND and NOR gates. The NAND gate produces a negative (i.e., ground level) output only when all inputs are either at a positive level or are open. The NOR gate produces a positive output only if one or more of its inputs is negative.

The circuits also include JK flip-flops (FF) having set or reset enabling inputs and a clock pulse input. A negative-going signal at the clock pulse input triggers a flip-flop to the set or reset state depending upon which of the enabling inputs is receiving a positive signal. Some of the flip-flops may include a further input. A negative signal applied to this input will immediately set the flip-flop to the appropriate state, without the need for a clocking pulse.

For further convenience, and to avoid frequent reference to Figure numbers, all elements of the circuits are assigned four-digit reference numerals. The first two reference numerals designate the figure on which the element will be found.

A feature of this invention is the provision of a game auditing and control system employing one or more transaction terminals or windows, each window including a ticket scanning and printing apparatus as described above. FIG. 23 is a block diagram of the electronic circuits for a sysem having one window. From the following description it will be obvious that additional windows may be added as desired.

All of the windows are connected to, and are controlled by, a game control station 2300 which may be remotely located with respect to any or all of the individual windows. The control panel at the game control station includes a plurality of windows select switches 2301. There is a window select switch for each window and a window is rendered inoperative unless its corresponding window select switch has been turned on.

Before beginning the drawing of numbers to determine the winners of a game, it is desirable to lock all windows so that no further tickets may be sold to customers. A lock-out switch 2302 located on the control panel of the game control station disables all of the window select switches 2301 and thereby disables all windows during the drawing of the numbers.

The game control station is the source of much of the data printed on each ticket. The game number is derived from a game counter 2303 which is a binary coded decimal counter having three denominational orders. During the interval between games the counter 2303 is enabled by the lock-out switch 2302 so that the count in the counter may be incremented by one prior to the sale of tickets for the next game. The count in the counter is incremented by operation of the advance pushbutton switch 2304 located on the control panel. Depression of the advance switch will increment the count in the counter only if the lock-out switch 2302 is on and all windows are locked out. However, depression of the advance switch will reset a ticket number counter at each window to a count of 1 so that for each game the tickets issued for each window will be serially numbered, beginning with 1. The count in the game counter is applied to a multiplexer 2305 and is also applied to a visual display means 2306 located on the control panel.

An electronic time code generator 2307 generates the time in hours and minutes and, since it is a 12 hour clock, generates a further character A or P indicating AM or PM. The time code generator may, for example, employ a one rpm motor driving a disc having one spot thereon. The spot may be photoelectrically sensed to derive pulses which drive counters to produce the time code. The output of the time code generator is applied to multiplexer 2305 and to the display means 2306.

The control panel of the game control station includes four thumb-wheel switches 2308 for generating four binary coded decimal characters representing the calendar date. Two characters represent the day, one character represents the month, and there is one character for the least significant digit of the year. The output from the data switches is also fed to the multiplexer 2305.

A clock or timing pulse generator 2309 is located at the game control station and provides A and B clock pulses for each of the windows as well as the game control station.

The game control station includes a data register 2310. This register is an open-ended shift register arranged to receive binary coded decimal information serially by character and parallel by bit. Each time a transaction takes place at any of the windows, all of the information printed on a ticket is transferred from a data register at the window to the data register at the game control station. The data is transferred through the data register 2310 to a further register 2312 located at a remote accounting station 2314. From the data register 2312 the data is entered into a data processor 2316 which is programmed to perform any desired accounting functions. A summary printer 2318 is provided at the accounting station for printing out results obtained by the data processor.

The transfer of data from the register 2312 to the data processor is under control of a line printer 2320. The line printer is located at the game control station and prints a line of data for each transaction occurring at each window. This enables the supervisory operator at the game control station to visually observe a line-by-line print out of all the information printed on each ticket at every window. Briefly, data in register 2312 is recirculated 14 times under control of the line printer. On one recirculation, the line printer prints all characters that are to be 0. On the next recirculation it prints 1's, and so on. On each recirculation two binary coded decimal characters are transferred from register 2312 to the data processor.

The game control station is provided with an indicator 2322 to signal the supervisory operator each time the back gate at any window is opened.

The multiplexer 2305 continuously presents on an output bus 2323 the information representing time, data, and game number. This information is applied to the bus 2323 serially by character and parallel by bit to all windows simultaneously. However, to provide synchronization between the window units and the game control station, the game control station is provided with control circuits 2324 which generate a control signal on lead 2325 at a specific time relative to the time data is read out of the multiplexer. This operation will be explained in greater detail when the data accumulation cycle of a window unit is discussed.

Since data may be ready for transfer from two or more windows at the same time, the control circuits 2324 also include means for controlling the input to data register 2310 so that it will accept data from only one window at a time.

Except for line printer 2320, accounting station circuits 2314 and game control station circuits 2300, all circuits shown in FIG. 23 represents the circuits for one window. As previously indicated, the system may employ any number of windows each of which may include circuits like those shown for one window. The circuits for the other windows all connect with the game control station in exactly the same manner as the circuits for the one window shown.

When the power switch is turned on at a particular window, circuits (not shown) generate a short pulse designated POMC (and its complement POMC*) which clears certain flip-flops (FF) and counters contained in the window circuits. However, before the window is operative, further conditions must be present. Circuits (not shown) sense the voltage level for the logic circuits and if this voltage level is within acceptable limits the circuits generate a continuous signal PIG. This signal is applied to one input of a NAND gate 2400. The high intensity lamp 36 (FIG. 1) must be on and the window operator's identification card 88 (FIG. 1) must be in position. A photocell sensor 2402 continuously senses light from lamp 36 and as long as the lamp is on the light sensor produces an output signal to condition one input of a NAND gate 2404 and one input of NAND gate 2406. A further photocell sensor 2408 normally receives light from the lamp 36 but this light is blocked when the operators identification card 88 is in proper position. When the card is in position the sensor 2408 produces an output signal to condition a second input of gate 2406. The resulting output signal from gate 2406 is inverted by amplifier 2410 and applied to the second input of NAND 2404. The output of this NAND is then inverted at 2412 and applied to NAND 2400 which is already conditioned by the signal PIG. The output of gate 2400 passes through a NOR gate 2414 and is applied to one input of a NAND gate 2416. The second input of NAND 2416 is conditioned if the window select switch for this window has been set by the supervisory operator at the game control station. The output of gate 2416 is inverted at 2418 to become the signal WINRDY. Therefore, as long as all operating conditions for the window are satisfied the signal WINRDY is produced. It is applied to the START FF 2600 but can have no effect on the START FF until the flip-flops receives A clocking pulse.

The output of NOR 2414 is a signal designated WINOP and this signal is also present as long as all operating conditions for the window are satisfied.

In the following detailed description of the circuits it is assumed that a standard transaction is taking place. That is, a customer has approached a window with a ticket that he has hand-marked, wishes to test his skill in picking the numbers that will be drawn during the next drawing, and believes the numbers 12, 25, 39, 46, 62, and 69, will be among the 20 numbers drawn during the next drawing. He presents his hand-marked ticket to the window oeprator with the money to cover the cost of the ticket. The window operator visually inspects the ticket and then places it in position aligned against the back gate and over the 80 photocells shown in FIG. 1. As the operator moves the ticket into position the photocell 84 (FIG. 1) senses the presence of his hand, and by a circuit not shown produces the signal HSN*. This signal is applied to FIG. 25A where it passes through inverter 2500 to enable the set input of a HAND SENSE FF 2502. At the next following A clock pulse the HAND SENSE FF is set. The HAND SENSE FF then produces a negative output to NOR 2504. The NOR circuit inverts the logic level of the signal and thus produces a positive output signal. The output of NOR 2504 passes through NOR 2505, and NAND 2506 to condition one input of NAND 2507, however, NAND 2507 is blocked at this time by a negative output signal applied to its second input from a one-shot multivibrator 2508. The output of NAND 2507 is applied to NOR 2509 which is also receiving the positive output from NOR 2504. NOR 2509 produces a negative output signal which blocks AND gate 2510 at the input of one-shot multivibrator 2508.

The vacuum source should be disabled so that no vacuum is applied to the apertures 86 during the time a ticket is being placed in position over the scanning photocells. The vacuum source is normally on but is disabled when the photocell 84 (FIG. 1) senses the presence of the operator's hand. When the operator's hand is sensed by the photocell the signal HSN* goes negative in FIG. 25B and blocks one input of NAND 2511. The resulting positive output of NAND 2511 is the signal VACENB* which is applied through an amplifier 2700 and a double inverter driver 2701 to energize the VACUUM OFF relay 2702. As the VACUUM OFF relay is energized it closes one set of normally open contacts 2703 thereby completing a circuit from a voltage source V to a vacuum solenoid 2704. The vacuum solenoid operates to shut off the vacuum applied to the apertures 86 of FIG. 1.

When the VACUUM OFF relay is energized it opens a set of normally closed contacts 2705 thus allowing the lead 2706 to float with no voltage applied thereto. The signal on lead 2706 is the VACON* signal which is applied to the VACUUM PRESENT FF 2512 in FIG. 25A. The signal resets the FF so that a negative signal is applied over lead 2514 to block AND gate 2510.

Nothing further happens until the operator removes his hand so that the light source may again illuminate the hand sense photocell 84. At this time the signal HSN* becomes positive and resets HAND SENSE FF 2502. The positive output of the FF passes through NOR 2504 and NOR 2509 to condition one input of AND gate 2510.

Figure 25A:
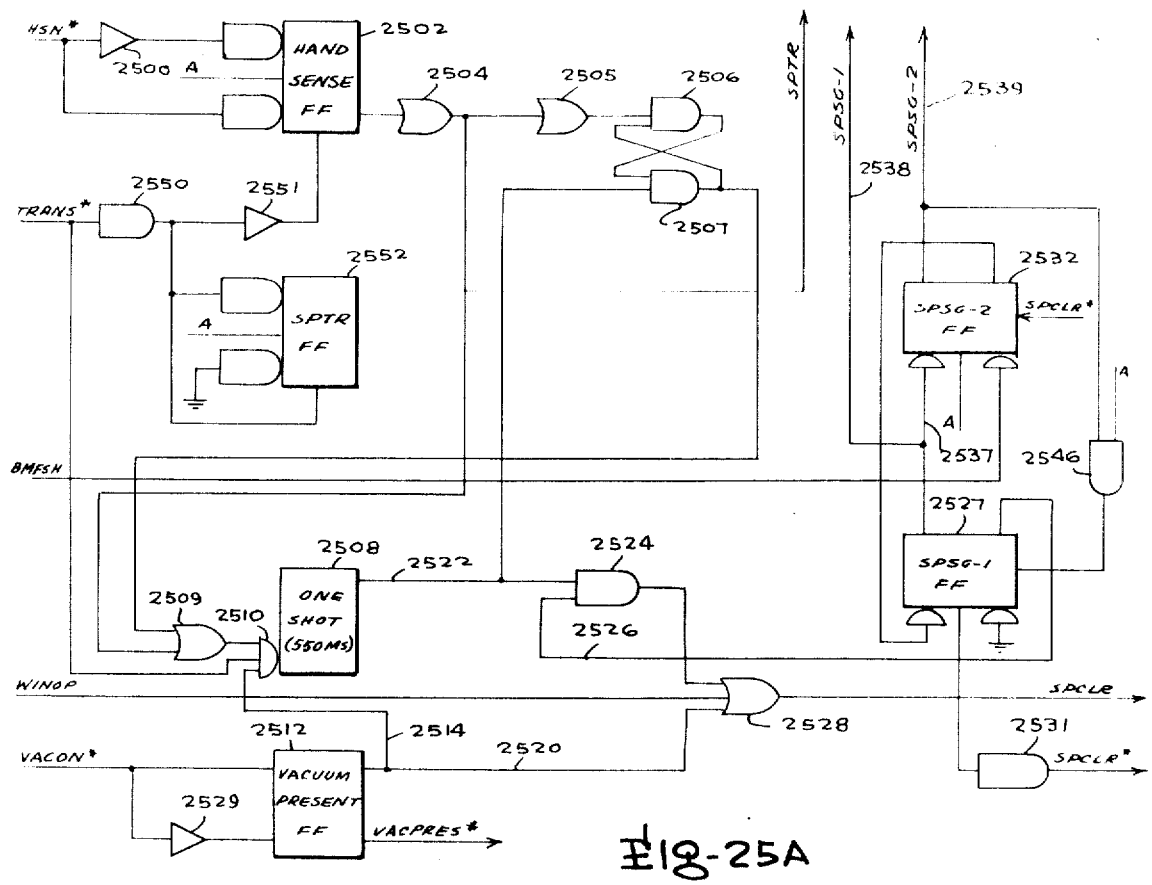
Figure 25C:
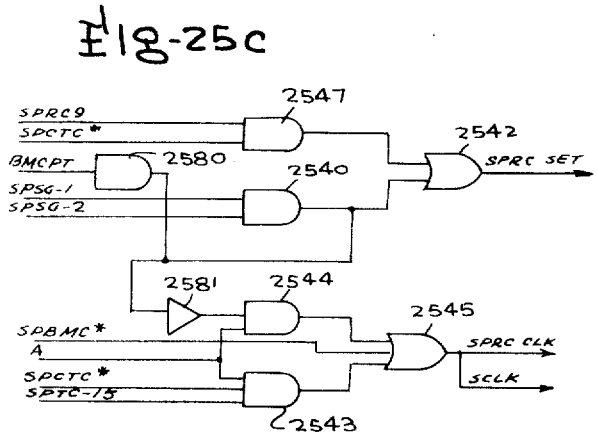
Figure 25B:
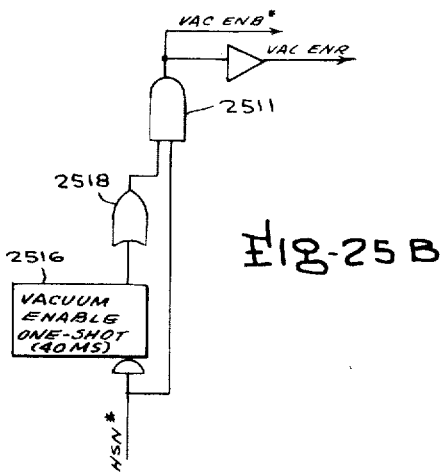

The signal HSN* in FIG. 25B becomes positive when the hand sense photocell is uncovered and conditions one input of NAND gate 2511. The signal HSN* is also applied to the VACUUM ENABLE one-shot 2516 so that 40 milliseconds after the operator's hand is removed the output of the one-shot drops goes negative. The output of the one-shot is inverted by NOR 2518 and conditions the spcond input-of NAND 2511. The NAND gate produces the negative signal VACENB* that is applied to FIG. 27 where it passes through amplifier 2700 and driver amplifier 2701 to release the VACUUM OFF RELAY 2702. As the VACUUM OFF relay is released the contacts 2703 open and the vacuum solenoid 2704 is released thereby permitting vacuum to be applied to the apertures 86.

When the VACUUM OFF relay is released the contacts 2705 close thereby driving the signal VACON* negative. The signal VACON* passes into FIG. 25A where it resets the VACUUM PRESENT FF 2512 thereby applying a positive signal to the leads 2514 and 2520.

At this time all inputs to AND 2510 are positive thereby pulsing the input of the one-shot multivibrator 2508. The one-shot responds by producing a positive pulse of 550 milliseconds duration on lead 2522. The purpose of the one-shot is to allow sufficient time for the operator's hand to completely clear the area where scanning of the ticket is to take place. During the interval that the one-shot is producing the positive output signal it conditions one input of a NAND gate 2524. The NAND gate is further conditioned by a positive signal on lead 2526 derived from the SPSG-1 FF 2527. Therefore, during the 550 millisecond interval NAND 2524 produces a negative output signal that is inverted at NOR 2528 to become the signal SPCLR.

Figure 25D:
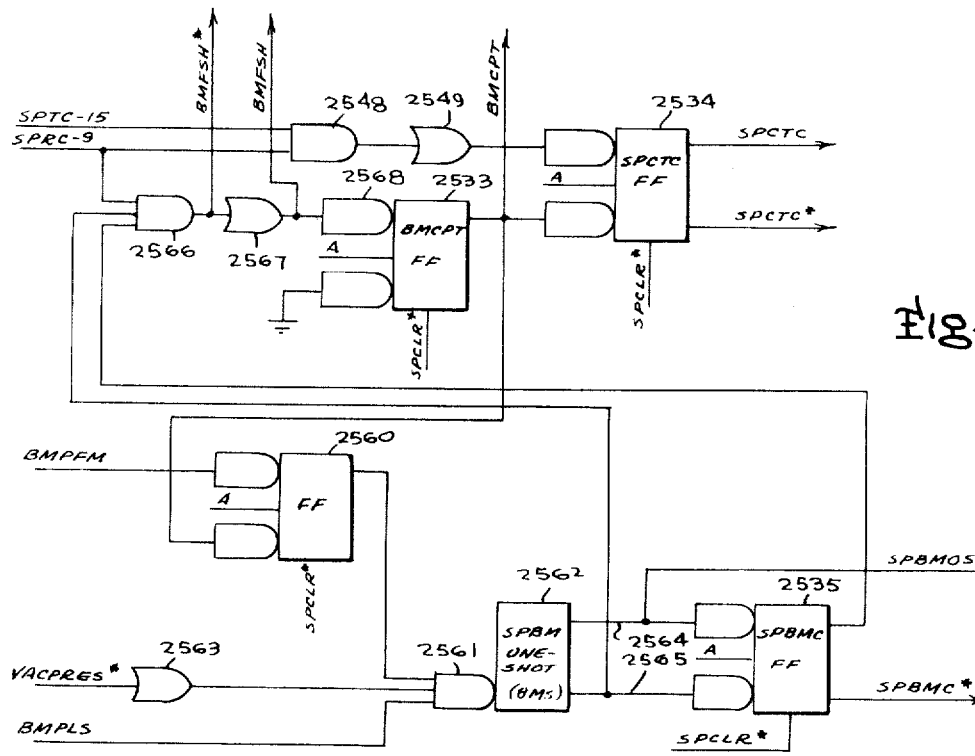
Figure 25E:
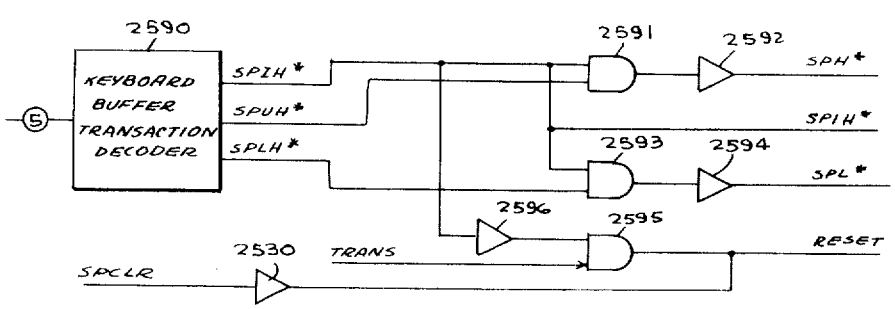

The signal SPCLR is applied to an inverter 2530 in FIG. 25E and the output of this inverter is the negative signal designated RESET. This reset signal is applied to the total spots counter 2340 to reset the counter to a 0 count. The signal SPCLR is also applied to the scan memory to reset the memory shift registers.

The output of NOR 2528 is inverted at NAND 2531 to become the negative signal SPCLR*. This signal is applied to a ten stage ring counter 2351 to reset the ring counter. It is also applied to FF 2532 in FIG. 25A, FFs 2533, 2534, 2560, and 2535 in FIG. 25D, and FF 2536 in FIG. 25F, to clear each of these FF. The SPCLR* signal is also applied to the SPTC counter 2344 to reset the counter.

At the end of the 550 millisecond interval, the device is ready to scan the ticket, store in memory a representation of each mark made by the customer on the ticket, and count the number of marks made on the ticket. Briefly referring to FIG. 23A, these operations involve stepping the 10 stage ring counter 2351 to selectively energize the ticket scan photocells 2341, eight photocells being conditioned for each step of the counter. The outputs from the photocells are fed through eight differential amplifiers 2342 to drive eight one-shot multivibrators 2343. An SPTC counter 2344 is a modulo 16 counter that advances ring counter 2351 one step each time the counter 2344 completes a cycle. The output of the SPTC counter drives a decoder 2345 which supplies eight shift pulses to a scan memory 2346 on each cycle of the SPTC counter. The scan memory comprises eight shift registers each capable of storing 10 binary bits of information. Each shift register receives one shift pulse from decoder 2345 for each cycle of the SPTC counter. The shift pulses shift the mark data from one-shots 2343 into the scan memory.

The outputs of one-shots 2343 are also fed around the scan memory by way of a buss 2347 to a multiplexer 2348. The multiplexer is also controlled by the SPTC counter and the multiplexer has a single output line 2349 on which a pulse appears for each spot on the ticket scanned by the photocells. These pulses are fed to the total spots counter 2340 which accumulates a count of the number of spots on the ticket. The circuits for carrying out these operations will now be described in detail.

At the end of the 550 millisecond time out period the output of one-shot 2508 (FIG. 25A) goes negative so that all inputs to NOR 2528 are positive. The output of NOR 2528 sets the SPSG-1 FF 2527. The output of the SPSG-1 FF is applied over lead 2537 to the SPSG-2 FF and at the next following A clock pulse the SPSG-2 FF is set. The SPSG-1 and SPSG-2 signals on leads 2538 and 2539 are both positive at this time and condition both inputs of NAND 2540 in FIG. 25C. The output of NAND 2540 is inverted at NOR 2542 to become the signal SPRC SET. This signal is applied to the ten stage ring counter 2351 and conditions the counter so that it will be set to its first position upon occurrence of an SPRC CLK pulse. This latter pulse is generated in FIG. 25C. The output of NAND 2540 is also applied through inverter 2581 to NAND 2544. This NAND also receives the clock pulse A. At the end of the A clock pulse, as it goes negative, the output of NAND 2344 goes positive. The output of NAND 2343 is positive at this time as is the signal SPBMC*. With all inputs positive, NOR 2545 produces the negative-going signal SPRC CLK to set the first stage of the ring counter 2351. At this point it might be noted that the ring counter comprises ten JK flip-flops in which the set or reset signals applied to the flip-flops are enabled only as the signal applied to the clock input goes from positive to negative.

At the time the SPSG-2 FF was set it conditioned one input of NAND 2546 (FIG. 25A). The next A clock pulse passes through 2546 to reset the SPSG-1 FF. Also, the signal SPSG-2 on lead 2539 is applied to the SPTC counter 2344. This signal enables the counter to receive A* clock pulses. The signal SPCTC* applied to the SPTC counter is positive and conditions the counter to count in response to the A* clock pulses.

At the time the 10 stage ring counter 2351 is set to its first state it produces the signal SPRC-0 which conditions eight of the scanning photocells. Each photocell produces an output signal if it senses a mark on the customer's ticket and these signals drive the eight differential amplifiers 2342. The outputs from the differential amplifiers are applied to eight one-shot multivibrators 2343 through eight AND gates 2352. However, these AND gates are not conditioned until the SPTC counter 2344 has reached a predetermined count. Once the counter was enabled it began advancing its count by one for each A* clock pulse. When it reaches a count of six all inputs to a NAND gate 2353 are conditioned and the NAND gate produces an output signal that is inverted by NAND 2354 before it is applied to all eight of the AND gates 2352. All inputs to the NAND gate 2353 are positive while the SPTC counter contains a count of six or seven. During this interval the outputs from the differential amplifiers 2342 are gated into the one-shots 2343. The signal SPCTC* is positive during the mark counting operation so the outputs from the one-shots pass through eight NAND gates 2355, over buss 2347, through inverters 2356 to the multiplexer 2348.

The multiplexer is not enabled until the SPTC counter reaches a count of eight. Upon reaching a count of eight the SPTC counter begins switching the multiplexer to sample the eight input lines to the multiplexer. This sampling continues for eight counts of the SPTC counter. During this interval up to eight pulses may be applied by the multiplexer to the total spots counter 2340 depending upon the number of marks sensed in the first row on the ticket. Each of these pulses enables the clock pulse input of the counter so that the counter may be incremented upon occurrence of the next B* clock pulse. It should be noted that the total spots counter is enabled by the SPCT-3 pulse which occurs only during the interval the SPTC counter 2344 contains a count of between eight and fifteen.

As the SPTC counter 2344 drives the multiplexer 2348 to sample the output signals from the one-shots, it also drives the decoder 2345 to shift the outputs of the one-shots into the scan memory 2346. The signal SPCTC is negative at this time so NAND gate 2357 produces a positive output signal to the eight NOR gates 2358. When the SPTC counter contains a count of eight it conditions the decoder 2345 and the decoder produces an output signal on one of the eight output lines, this signal passing through one of the eight NOR gates 2358 and one of the eight amplifiers 2359 to shift the output of one of the one-shots 2343 into one of the shift registers in the scan memory 2346. When the SPTC counter is incremented to nine the decoder 2345 produces an output signal on a second of the eight output lines to NOR circuits 2358 and this signal shifts the output of a second of the one-shots 2343 into a second of the shift registers in the scan memory. This continues until the SPTC counter reaches a count of 15 at which time the outputs from all of the one-shots have been gated into the scan memory.

At this point in time only one row of eight of the photocells has been energized to count the number of marks in the row and store an indication of the marks in the scan memory. Ten cycles like that described above are required in order to scan the 10 rows of marks on the customer's ticket, count all of these marks in the total spots counter 2340, and store an indication of each mark in the scan memory 2346. At the end of the first cycle when the SPTC counter 2344 reaches a count of 15 it produces the signal SPTC-15 which conditions one input of NAND 2543 in FIG. 25C. The signal SPCTC* is positive at this time. As the A clock pulse goes negative NAND 2543 produces an output signal that passes through NOR 2545 to become the SPRC CLK pulse. This pulse shifts the 10 stage ring counter 2351 so that the ring counter now produces the signal SPRC-1. This signal conditions a second row of eight photocells 2341. The SPTC counter 2344 goes through another cycle while counter 2340 counts the spots marked in this row, and an indication of the marks entered into the scan memory 2346. Eight further cycles are carried out in order to scan all ten rows of marks. At the conclusion of the tenth cycle the total spots counter 2340 contains a count of the total number of marks or spots made by the customer on the ticket, and the scan memory 2346 contains an indication of the location of each mark. The count in the counter 2340 is visually displayed by a display means 2360 conveniently positioned for viewing by the window operator.

At the end of the tenth scanning cycle, when the SPTC counter 2344 reaches a count of fifteen, the ten stage ring counter 2351 is set so that it again produces the signal SPRC-0. In FIG. 25C, the SPRC-9 signal is positive because the last stage of the ring counter 2351 is active. The signal SPCTC* is also positive so NAND 2547 produces a negative output signal that is inverted by NOR 2542 to become the SPRC SET signal which conditions the input of the first stage of the ring counter 2351. At the end of A clock time NAND 2543 produces a positive-going output signal that is inverted at NOR 2545 to become the SPRC CLK signal which gates the SPRC SET signal into the first stage of the ring counter.

At the same time, the SPCTC FF 2534 in FIG. 25D is set. The signals SPTC-15 and SPRC-9 are both positive so NAND 2548 produces a negative output signal that is inverted at NOR 2549 before being applied to the FF 2534. Upon occurrence of the next A clock pulse the SPCTC FF is set so that the signal SPCTC rises to the positive level while the signal SPCTC* drops to the negative level. When SPCTC* becomes negative it blocks the eight NAND gates 2355 (FIG. 23A) thereby preventing data from the ticket scan photocells from passing into the scan memory or the total spots counter. The signal SPCTC is applied to one input of NAND gate 2357 for for a purpose which will become evident subsequently. When the signal SPCTC* becomes negative it disables the SPTC counter 2344 and prevents further counting action by this counter. At this point all operation of the window unit ceases while the window operator keys into the keyboard 2362 up to five digits representing the price the customer is paying for his ticket. Numeric information from the keyboard is in binary coded decimal format and is keyed one digit at a time into a twenty bit recirculating register (not shown) in the arithmetic circuits 2363.

At the time SPCTC FF 2534 was set it began producing an enabling signal SPCTC for enabling an output from the transaction keys. After the window operator has keyed in the numeric information he depresses one of the transaction keys to set a flip-flop (not shown) in the keyboard. The flip-flop produces the negative signal TRANS*. This signal is applied to FIG. 25A where it passes through NAND 2550 and inverter 2551 to inhibit the HAND SENSE FF 2502. It is also applied AND gate 2510 so as to prevent one-shot multivibrator 2508 from being triggered if anything should inadvertently cover the hand sense photocell adjacent the scanning area. The signal TRANS* also passes through NAND 2550 to set the SPTR FF 2552.

The SPTR FF produces a positive output signal designated SPTR which is applied to FIG. 26 where it is inverted by NAND 2602 before being applied to the clocking input of START FF 2600. As previously explained, the signal WINRDY is positive as long as the window is operative. Therefore, upon occurrence of the SPTR signal FF 2600 is set. When the FF is set it initiates a sequence of operations for collecting from various locations data relating to price, spot count, operator identification number, ticket number, window number, transaction code, game number, time, and date. The data is entered into a 28 position binary coded decimal shift register 2367 capable of storing 28 binary coded decimal characters. When the START FF is set it produces a negative signal DRST* which is applied to FIG. 29 to block NAND 2902. The signal DRST* also passes through NOR 2900 and inverter 2901 to become the signal DRF/B CLR. This signal is applied to FIG. 26 where it passes through NOR 2606 and inverter 2607 to reset the LOAD PRINT REGISTER FF 2608. It is also applied to FIG. 23A where it resets a print coincidence counter 2391.

In FIG. 26 the signal DRST* blocks NAND 2609 thereby applying a positive signal to one input of NOR 2610. The signal DRST* is also applied to one input of NAND 2611 so that the NAND gate produces a positive output signal to NOR 2612.

The signal DRST* passes through NOR 2613 to condition one input of NAND 2614. At this time the character position decoder is in its initial state, producing a negative signal DR01 which is inverted at 2604 to condition the second input of NAND 2614. The NAND gate produces a negative signal to set the DR RUN FF 2640. When FF 2640 is set, the positive-going signal on lead 2651 is inverted by NAND 2650 to trigger the DR CLK ENABLE FF 2619 to its set state. The output of FF 2619 conditions one input of each of the NAND gates 2609 and 2618.

When the START FF 2600 is set, it enables the input of the LOAD DR FF 2615. On the next following A clock pulse FF 2615 is set. When the FF 2615 is set it produces the positive signal DRLDR which passes into FIG. 29 where it conditions one input of NAND 2902. However, the NAND 2902 is blocked at this time by the signal DRST*.

The signal DRLDR is applied to the enabling input of a counter in ticket number generator 2379. It is also inverted at 2616 and applied as the signal DRLDR* to four NAND gates 2364 in FIG. 23 to prevent recirculation of data during the shifting operation which follows.

When the START FF 2600 is set it produces the signal DRPREQ which conditions one input of NAND gate 2617. The signal DRPREQ is also applied to the arithmetic circuits (FIG. 23) where it starts a timing generator. This timing generator (not shown) shifts a 20 bit entry register containing the price information four bit positions so that the four binary coded bits representing the low order digit of the price are positioned for exit from the entry register over the bus 2365 (FIG. 23B) to the data register multiplexer 2366. When the low order digit of the price is ready for transmission to the data register multiplexer the arithmetic circuits produce the positive signal ARPSTB which is applied to FIG. 26 where it passes through NAND gate 2618 (now conditioned) and NOR 2610 to become the signal DRGEN. Any time the DRGEN signal is positive, it conditions a NAND gate 2368 which then passes A clock pulses to data register 2367 to shift data in the register.

The signal ARPSTB is also applied to NAND 2617 which is already conditioned by the output of the START FF 2600 so NAND 2617 produces a negative output signal that passes through NOR 2612 to enable the transfer input of a group counter 2620 and to enable the clock pulse input of a character position counter 2621.

To digress for a moment the character position counter 2612 is a modulo 32 counter which keeps track of data as it is shifted through the data register 2367 (FIG. 23B). Output signals from the counter are applied to a character position decoder 2622 which produces timing signals on 32 distinct output lines. These signals are used primarily for controlling the time at which data from certain sources is gated to the data register multiplexer for entry into the data register.

The group counter 2620 is a modulo-eight counter employed to generate control signals having various durations corresponding to the intervals that particular information such as price or spot count is available for entry into, or exit from, the data register. For example, the group counter drives the group decoder 2623 to produce the signal DRPRC during the time the character position decoder is producing the sinals DR01 through DR05, these time periods being reserved for price information. Upon occurrence of the DR05 signal NOR circuit 2624 produces an output signal that is clocked into the group counter at the end of A clock time to advance the group counter to its next position. During the next two data character positions, 6 and 7, the group decoder generates the signal DRSPC during the interval the spot count is being entered into the data register. During character position 7 time the NOR gate 2624 produces another signal so that the group counter is advanced to the next position upon termination of the next A clock pulse. From this brief description it is believed evident as to how the group decoder produces the eight signals at its output.

Three signals, MUX0, MUX1, and MUX2 are derived directly from the output of the group counter and these signals are applied to the data register multiplexer 2366 to control gating of only a single four bit character at a time from any of the input buses through the multiplexer to the data register.

The character position counter is in its reset state so that character decoder 2622 is producing the signal DR01 at the tie the START FF is set. The group counter is also in its reset state at this time so that the group decoder 2623 produces the signal DRPRC. These conditions still exist at the time the first ARPSTB pulse is received from the arithmetic circuits 2363.

The ARPSTB pulse causes NAND 2368 to be conditioned as described above, so that at A clock pulse time the low order digit of the price data is entered into data register 2367. At the same time, the ARPSTB signal enables both the group and character counters so that when the A clock pulse goes negative the character counter is incremented and the character position decoder 2622 produces the signal DR02. The negative-going A clock pulse does not advance the group counter 2620 because the counter is not receiving an enabling input from NOR circuits 2624 at this time.

The timing generator in the arithmetic circuit shifts the entry register so that the second four bit character is ready for transfer over the buss 2365 to the data register multiplexer. When the data is ready for transfer the timing pulse generator produces another signal ARPSTB which passes through NAND 2618 and NOR 2610 to the NAND 2368 in FIG. 23B. The group counter has not changed its position so that the signals applied to the data register multiplexer still condition the multiplexer so that the data on buss 2365 is gated through the multiplexer and the four NAND gates 2369 to the data register. At A clock time NAND 2368 passes a clocking signal which shifts the second character of price information into the first position of the data register and shifts the character previously stored in the first position into the second position.

The second ARPSTB pulse also passes through NAND 2617 and NOR 2612 to the clock pulse enable input of the character position counter and the transfer enable input of the group counter 2620. The character counter is incremented at the end of the next A clock pulse but the group counter is not incremented because neither of the NOR gates 2624 is receiving a negative input signal on at least one input from the character position decoder.

Three more cycles like the two described above take place to enter the remaining three characters of price information into the data register. The fifth ARSTB pulse conditions the counters 2620 and 2621 so that at the end of the A clock pulse for position six, both counters are incremented. Decoder 2622 produces the signal DR06 while decoder 2623 produces the signal DRPRC.

The signal DRSPC is applied through NOR 2625 and inverter 2626 to reset the START FF 2600. The DRPREQ output from the flip-flop blocks NAND 2617 and NAND 2618 and terminates the request signal to the arithmetic circuits. NAND 2618 applies a positive signal to NOR 2610. DRST* becomes positive and so all inputs of NAND 2609 are positive and it produces a negative output signal that acts through NOR 2610 to enable NAND 2638. This enables NAND 2368 to apply a shift pulse to the data register each digit time until it is completely loaded with data. DRST* also enables NAND 2611 so that it produces a negative signal which acts through NOR 2612 to enable counters 2620 and 2621 to respond to A pulses for the same digit time.

Figure 25F:
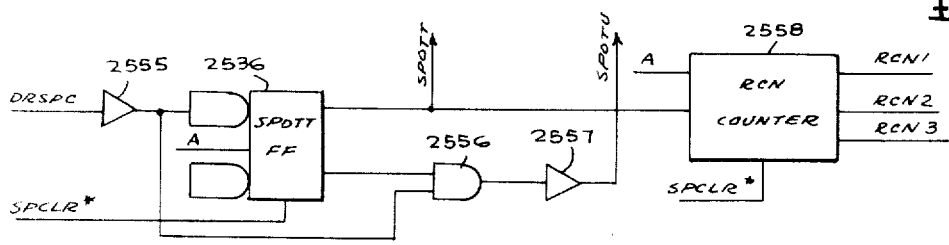

The signal DRSPC from the group decoder 2623 is also applied to FIG. 25F where it passes through an inverter 2355 to the input of the SPOTT FF 2536. The output of inverter 2555 is also applied to one input of NAND 2556 which has its other input conditioned at this time by the output of the SPOTT FF. The gate 2556 produces a negative output signal that is inverted at 2557 to become the signal SPOTU. This signal is applied to four NAND gates 2370 in FIG. 23A thereby conditioning these gates to pass the four bits representing the units digit of the total spot count to four NOR gates 2371 in FIG. 23B. The signal SPIH* is positive at this time so the signals pass through NOR gates 2371 and the data register multiplexer 2366 to the data register 2367. Upon occurrence of the A clock pulse at digit time six the units digit of the spot count is entered into the data register. At the trailing edge of the same A clock pulse, SPOTT FF in FIG. 25F is set thereby blocking NAND gate 2556 and producing the positive signal SPOTT. The SPOTT signal is applied to four NAND gates 2372 which receive the four bits representing the tens digit of the total spot count. The four bits representing the tens digit of the total spot count are gated through the four NANDS 2372, the four NOR gates 2371, the data register multiplexer 2366, and NOR gates 2369 to the data register 2367. Upon occurrence of the A clock pulse for digit time seven, the four signals representing the tens digit of the total spot count are gated into the data register. At the end of the A clock pulse for digit time seven, the SPOTT FF in FIG. 25F is reset. At the same time, an A clock pulse sets a three position shift register counter 2558 which is enabled at this time by the output from the SPOTT FF.

In FIG. 26 the A clock pulse for digit seven time advances the character position counter 2621 to position 8 and, because NOR circuit 2624 is receiving the signal DR07, the A clock pulse advances the group counter 2620 so that the group decoder 2623 produces the signal DRCDN.

When the group counter 2620 is advanced the signal DRSPC from the decoder 2623 becomes positive. In FIG. 25F the signal is inverted at 2555 and blocks gate 2556 so that the signal SPOTU cannot be produced to gate information out of the units position of the total spots counter.

During character position times 8, 9 and 10 three digits representing the window operator's identification number are entered into the data register. This identification number comprises three octal digits recorded on the operator's identification card 88 (FIG. 1) in such a manner that they can be optically sensed by nine photocells disposed beneath the card 88. The nine photocells are represented in FIG. 23B by the designation 2373.

Since the RCN counter 2558 was set to produce the output signal RCN1 at the end of the A clock pulse for character time 7, it applies the positive signal RCN1 to three NOR gates 2375 so that three octal bits representing the low order digit of the operator's identification number are passed through NOR gates 2375 three inverters 2376, and the data register multiplexer 2366, to the input of the data register. At A clock pulse time for digit time 8, the signals representing the units position of the operator's identification number are entered into the data register. At the end of the A clock pulse the RCN counter (FIG. 25F) is shifted so that it produces the positive output signal RCN2. This signal is applied to three NOR circuits 2377. During digit time nine the signals representing the tens digit are gated through the three NOR gates 2377, the inverters 2376, and the multiplexer 2366 to the data register.

The A clock pulse for digit time 9 gates the signals representing the tens order of the operator's identification number into the data register. At the same time, in FIG. 25F an A clock pulse again increments the RCN counter so that it now produces the positive signal RCN3. This conditions three NOR gates 2378 so that during the time for character position 10 the signals representing the hundreds order of the operator's identification number are gated through NOR gates 2378, inverters 2376, and the data register multiplexer to the data register. Upon occurrence of the A clock pulse for digit time 10 the signals are entered into the data register. In FIG. 25F, termination of the A clock pulse again advances the RCN counter 2558 and since it is an open ended shift register counter this pulse clears the counter.

The window unit operates during character position times 10, 11 and 12 to enter a three digit ticket number into the data register. The ticket number generator 2379 is shown in block form in FIG. 23B. The ticket number generator comprises a binary coded decimal counter capable of counting up to 999. The counter is reset to a count of one by a game advance signal which is derived from the advance pushbutton 2304 on the console of the game control station. The counter is incremented by one by a B clock pulse during character position time 32 (DRCC) when the signal DRL DR is positive each time the window unit carries out a data accumulation cycle in preparation for issuing a duplicate ticket.

At the end of the A clock pulse for character position 10, the character position counter 2621 is advanced so that the character position decoder 2622 produces the signal DR11. At the same time, since the signal DR10 is applied through NOR gate 2624 to group counter 2620 this counter is advanced so that the group decoder 2623 begins producing the signal DRTKN. The signal DR11 is applied to four NAND gates 2380 which continuously receive the four bits representing the units order of the ticket number. These bits are gated through NAND gates 2380, four NOR gates 2381 and the data register multiplexer 2366 to the data register 2367. Upon occurrence of the A clock pulse for character time 11 these bits of data are shifted into the data register. At the same time, an A clock pulse advances the character position counter 2621 so that it produces the signal DR12.

The signal DR12 is applied to four NAND gates 2382 which also receive the four bits of data from the tens positions of the ticket number counter. This data is gated through NAND gates 2382, NOR gates 2381, and the data register multiplexer, to the data register, and at A time for character position 12 this data is gated into the data register. At the same time, an A clock pulse advances the character position counter so that the character position decoder 2622 produces the output signal DR13.

The signal DR13 is applied to four NAND gates 2383 which receive the four signals representing the hundreds order of the ticket number. These signals are gated through NAND 2383, NOR 2381, and the data register multiplexer to the data register. The A clock pulse for character position 13 gates these signals into the data register. At the same time, the A clock pulse advances the character position counter 2621 so that the character position decoder 2622 produces the output signal DR14. Also, since NOR 2624 is receiving the signal DR13 at the time the A clock pulse terminates, the group counter 2620 is advanced so that the group decoder 2623 produces the signal DRWNN.

During character position times 14 and 15, two binary coded decimal digits representing the window number are entered into the data register. These characters are generated by a prewired window number matrix 2384. The window number matrix continuously supplies signals representing the low order digit of the window number to four NAND gates 2385. Since an exemplary embodiment of the invention has less than one hundred windows in a system, the window number matrix produces only two output signals representing the tens digit of the window number. These signals are applied to two NAND gates 2386.

When the character position decoder 2622 is set to produce the signal DR14, this signal conditions the AND gates 2385 and the signals representing the units digit of the window number are gated through NANDs 2385, four NOR gates 2387, and the data register multiplexer 2366 to the data register 2367. The A clock pulse for character position 14 gates these signals into the data register. At the same time, the character position counter 2621 is advanced by the A clock pulse so that the character position decoder 2622 produces the signal DR15.

The signal DR15 conditions the two NAND gates 2386 so as to gate the two signals representing the tens order of the window number through NANDS 2386, NOR gates 2387, and the data register multiplexer, to the data register. The A clock pulse for character position 15 gates the signals representing the tens order of the window number into the data register. At the same time, character position counter 2621 is advanced so that character position decoder 2622 produces the signal DR16. Also, since NOR 2624 is receiving the signal DR15 as the A clock pulse terminates the group counter 2620 is also incremented so that the group decoder 2623 produces the signal DRTRC.

During character position time 16 a binary coded decimal character representing the type of transaction is entered into the data register. At the time the window operator depressed one of the transaction keys, a four bit code representing the type of transaction involved was entered into a buffer register in the keyboard. This code is continually applied by the buffer register to the data register multiplexer 2366 over the bus 2388. During character time 16, the output signals MUX0, MUX1, and MUX2 derived directly from the output of the group counter 2620 condition the data register multiplexer 2366 so that the transaction code is applied to the input of the data register 2367. When the A clock pulse for character position 16 occurs, the transaction code is gated into the data register from the multiplexer. At the same time, the character position counter 2621 is incremented at the end of A pulse time so that the character position decoder 2622 produces the signal DR17. Also, since NOR 2624 is receiving the signal DR16 at the time the A clock pulse terminates, the group counter 2620 is incremented so that the group decoder 2623 produces the signal DRGCD.

During character position times 17 through 28 data representing the time, date, and game number are transferred from the game control station 2300 to the window unit for storage in the data register at the window unit. Referring for the moment to FIG. 28, the multiplexer 2305, which is the same multiplexer as shown in the game control station of FIG. 23B, continuously receives signals representing all digits of the data representing time, date and game number. A modulo-16 counter 2800 is continuously driven by B clock pulses and output signals from the counter control the multiplexer 2305. The counter controls the multiplexer so that only the four bits representing one character are gated onto the bus 2323 for application to the data register multiplexers at all of he window units. When the counter 2800 contains a count of one it gates the low order position of the time data onto the bus 2323 with higher orders of time being gated onto the bus as the counter is incremented to counts 2, 3, 4 and 5. When the counter reaches a count of 6 it gates the low order of the date data onto the bus 2323 with the higher orders of the date data being gated onto the bus as the counter is incremented to counts of 7, 8 and 9. When the counter 2800 reaches a count of 10 it gates the low order of the game number onto the bus 2323 with the higher orders of the game number being gated onto the bus as the counter is incremented to counts of 11 and 12. Nothing further happens until the counter reaches a count of 15 at which time the four outputs from the counter condition a NAND gate 2802 so that it produces the signal GSCDRDY*. This signal is a synchronizing signal applied to all of the window units once for each cycle of the counter 2800. The purpose of the signal is to tell the window units that the low order position of the time data will become available on the next clock pulse with the remaining characters of data becoming available at succeeding clock pulse times.

Since the counter 2800 operates continuously, and since a particular window unit may be put into operation to issue a ticket at any time, it is necessary for each window unit to wait so that the window unit may be synchronized with the data supplied from the game control station. This will insure that the time data from the game control station is entered into positions 17 through 21 of the data register, the date information from the game control station is entered into positions 22 through 25 of the data register, and the game number information from the game control station is entered into positions 26 through 28 of the data register.

Referring now to FIG. 26, the end of the A clock pulse for character position 16, the character position counter was incremented so that the character position decoder produced the signal DR17. At the same time, the group counter 2620 was incremented so that group decoder 2623 terminated the signal DRTRC and began producing the signal DRGCD. The signal DRTRC is inverted at 2630 and applid as a clock pulse to the wait GAME CONTROL DATA FF 2631. The set terminal of this FF has been conditioned since the time the LOAD DATA REGISTER FF 2615 was set. Therefore, when the signal DRTRC terminates it drives the clock pulse input of FF 2631 negative and the FF is set. The signal on the lead 2632 drops to a negative value thereby blocking gates 2609 and 2611.

When the gate 2609 is disabled it provides a positive output signal to one input of NOR 2610. The START FF 2600 is producing a negative output signal to block gate 2618 so the second input of NOR 2610 is positive. The NOR gate produces the negative output signal DRGEN which is applied to the NAND 2368 in FIG. 23B. This blocks NAND 2368 so that no further clock pulses can be applied to the data register to cause shifting of the data therein.

When the NAND gate 2611 is disabled it supplies a positive input to NOR 2612. This gate is already receiving a positive input from NAND 2617 so NOR 2612 produces a negative output signal which disables the character position counter 2612 and the group counter 2620. Thus, the character position counter, the group counter, and the data register remain inactive while the window unit waits for a signal from the game control station indicating that the units position of the time data is ready to appear on the transfer bus 2323.

While the window unit waits, B clock pulses continue to cycle the counter 2800 until the counter eventually reaches a count of 15 at which time NAND 2802 is conditioned and produces the negative output signal GCSDRDY*. This signal is applied to FIG. 26 where it is inverted by inverter 2633. The group decoder 2623 is still producing the negative signal DRGCD and this signal is applied to inverter 2634. Therefore, at the next following A clock pulse the junction 2635 rises to a positive level. An inverter 2636 inverts this signal level and applies a negative signal to the reset input of the WAIT GAME CONTROL DATA FF 2631. The output line 2632 from the FF rises to a positive level thereby again conditioning NAND gates 2609 and 2611.

NAND gate 2609 produces an output signal that passes through NOR 2610 to become the positive signal DRGEN. This signal is applied to FIG. 23B where it conditions NAND 2368 so that clock pulses may again be applied to shift the data register 2367.

NAND gate 2611 produces a negative output signal that is inverted at NOR 2612 and conditions both the character position counter 2621 and the group counter 2620.

The data register 2367 is now conditioned to shift one position in response to each A clock pulse and the character position counter is conditioned to be incremented by one for each A clock pulse. During the next twelve cycles the counter 2800 is advanced by B clock pulses to condition the multiplexer and gate the four bits generating one data character onto the bus 2323. Each character is shifted into the data register by an A clock pulse and each time the data register is shifted the character position counter 2621 is incremented.

As the twelfth character of data is entered into the shift register from the game control station, the trailing edge of an A clock pulse advances the character position counter 2621 so that character position decoder 2622 produces the signal DR29. At the same time, because NOR gate 2624 is receiving the signal DR28 the A clock pulse advances group counter 2620 so that the group decoder 2623 now produces a signal DRPAR.

The signal DR29 from the character position decoder passes through NOR 2638 and inverter 2639 to reset the DR CLOCK ENABLE FF 2619. The output from this FF blocks both gates 2609 and 2618 so that NOR gate 2610 produces the negative signal DRGEN. This signal is applied to FIG. 23B where it blocks NAND 2368 to prevent shift pulses from being applied to the data register.

At the end of the A clock pulse for character position 29 the clock pulse advances the character position counter 2621 and the character position decoder 2622 produces the signal DRAA. This signal is applied to the group counter 2620 and resets the group counter. The signal DRAA also passes through NOR 2638 and inverter 2639 to again reset the DR CLOCK ENABLE FF 2619.

At the end of the A clock pulse for data position 30, the character position counter 2621 is again incremented and the character position decoder 2622 produces the output signal DRBB which passes through NOR 2638 and inverter 2639 to apply another reset signal to the DR CLOCK ENABLE FF 2619.

At the end of the A clock pulse time for character position 31 the character position counter 2621 is again incremented and the character position decoder 2622 produces the signal DRCC. The DRCC signal is applied to the ticket number generator 2379 so that upon occurrence of a B clock pulse the count in the counter is incremented by one. The DRCC signal is also applied through NOR 2638 and inverter 2639 to the reset input of the DR CLOCK ENABLE FF 2619. As the signal DRCC goes negative it passes through NOR 2606 and inverter 2607 to reset the LOAD PRINT REGISTER FF 2608.

As the A clock pulse goes negative during character position 32, the character position counter 2621 is incremented and the character position decoder stops producing the negative signal DRCC. At this time, the inverter 2605 applies a negative signal to the DR RUN FF to reset the FF.

At this time the device is ready to print on the face of a duplicate ticket the information contained in data register 2367. Referring to FIG. 23, the left most character positions 25, 26, 27 and 28 of data register 2367 are connected by way of a bus 2389 to four comparator circuits 2390. Briefly speaking, digit positions 25 through 28 are first compared with a binary coded decimal 0 indication from counter 2391 and if any of the four digits is a zero the corresponding comparator will produce an output pulse to one print latch in each of the seven groups of print latches 2392. At DR01 time an output signal from NAND gate 2393a enables any of the four print latches in group 2392a to be set if the print latches are also receiving an output signal from one of the comparators. The data register is recirculated end-around so that characters 1 through 4 are in positions 25 through 28 of the register and thus are applied to the comparators 2390. These four characters are compared with a binary coded decimal 0 ouput from the print coincidence counter 2391 and if any of these characters is a binary zero it will set one of the print latches in group 2392g at the time a DR05 pulse is applied to NAND gate 2393g. The data register is then shifted four more places and the next four characters compared to a zero, and so on, until all twenty-eight characters in data register 2367 have been compared to binary zero. Each of the 28 print latches has an output connected to an individual one of 28 NAND gates generally designated 2394. As is evident from FIG. 11, alternate rows of characters around the periphery of the print drum are staggered. Hence there must be two distinct printing times for each character. Strobe A and strobe B pulses are each applied to one-half of the NAND gates 2394 and if any latch is set a corresponding one of 28 hammer driver amplifiers 2395 is energized.

The data register is then recirculated and each character position is compared for coincidence with a binary coded decimal 1 output from the counter 2391. All the positions of the data register that contain ones thereby causes ones to be printed. The characters in the data register are then recirculated 12 more times for comparison with the output of the print coincidence counter 2391, the print coincidence counter being increased by one before each recirculation. Fourteen recirculations are required because there are fourteen different characters, numerals and letters, on the print drum. The manner in which the above operations are accomplished will now be described.

In FIG. 26, the DR RUN FF 2640 and the START FF 2600 are both in the reset state and produce the positive signals DRRUN* and DRST*, respectively. The LOAD DR FF 2615 is in the set state so the signal DRLDR is also positive. These three signals are applied to a NAND gate 2902 in FIG. 29. In FIG. 32, the front printer frame sensor 3200 produces the positive output signal DRMIPFM the next time a frame mark 352 (FIG. 16) is sensed. As previously described, the disc bearing the frame mark is continuously rotated in synchronism with the print drum 332 shown in FIG. 2. When the frame mark is sensed the signal DRMIPFM conditions NAND 2902 and it produces an output signal that is inverted at 2903 to condition the set input of the FRONT PRINT FF 2904. The FF is set at the end of the next B clock pulse as the clock pulse goes negative. The output lead 2905 becomes negative and the signal DRFEN* is applied to FIG. 26 where it resets the LOAD DR FF 2615 and applies a reset signal to the START FF 2600 through NOR 2625 and inverter 2626. When the FF 2904 is set its output lead 2906 becomes positive and conditions one input of NAND gates 2907, 2908 and 2909.

The signal DRMIPFM derived from the frame mark further conditions NAND 2908 and the gate produces a negative output signal. As the print drum 332 and the disc containing the frame mark are rotated, the frame mark sensor 3200 no longer senses the presence of a mark so the signal DRMIPFM goes negative. At this time the signal FPLDST at the output of NAND 2908 goes positive. The signal is applied to FIG. 26 where it is inverted by NOR 2645 and triggers the LOAD PRINT REGISTER FF 2608 to its set state. The signal DRLF/BR* at the output of this FF goes negative and is applied to FIG. 29 whee it resets PRINT SYNC FF's 2910 and 2911. In FIG. 26, the signal is inverted at 2646 to become the signal DRLF/BR. This signal is applied to FIG. 23A where it conditions NAND 2396 to pass B clock pulses.

Up until this time the data register 2367 has not been shifted since the last character was loaded therein from the game control station during the data accumulation period. Therefore, signals representing the three digits of the game number in register positions 28 through 26, and signals representing the high order of the date in register position 25 are being applied to the four comparators 2390. The print coincidence counter is outputting a code representing 0, this counter having been reset when the START FF 2600 was set at the beginning of the data accumulation period, the signal DRST* in FIG. 29 causing the negative-going signal DRF/B CLR. Assume for purposes of illustration that the high order digit of the date and the tens order digit of the game number are both 0. In this case comparators 2390b and 2390d each produce an output signal to the print latches. The output signal from comparator 2390b enables one print latch of the four print latches in each of the groups of print latches 2392a through 2392g. The output signal from comparator 2390d enables another print latch in each of the groups of print latches. These are enabling signals only and the print latches enabled can only be set by an output signal from the gating circuits 2393.

The character position decoder 2622 is still stopped in a position to produce the negative signal DR01 so at B time when the output of NAND 2396 goes negative gating circuit 2393a provides a gating signal to the four print latches in group 2392a. Since two of these latches are receiving signals from comparators 2390b and 2390d, only these two print latches are set. These two latches then produce output signals to two of the 28 NAND gates 2394.

At the time a B clock pulse passes through NAND 2396 and gating circuit 2393a, to strobe print latches 2392a, shifting of the data register 2367 is enabled. In FIG. 26, the B clock pulse enables NAND 2603 which is already receiving a positive signal from the LOAD PRINT REG FF. NAND 2603 produces an outout signal that passes through NOR 2613 and NAND 2614 to set the DR RUN FF. The output 2651 from this flip-flop sets the DR CLK ENABLE FF and conditions NAND 2611. The other inputs of NAND 2611 are positive so the gate produces an output signal that passes through NOR 2612 to enable the character position counter 2621 and the group counter 2620.

The output from the DR ENABLE FF passes through NAND 2609 and NOR 2610 to become the signal DRGEN. This signal is applied to NAND 2368 so that clock pulses may pass through the gate and shift the contents of data register 2367. The signal DRGEN is also applied to four NAND gates 2364 in the recirculation path of the data register. These NAND gates are further conditioned by the signal DRLDR* derived from the LOAD DR FF 2615 so that data may be recirculated through the data register during the print operation.

Once the DR RUN FF 2640 is set, each succeeding A pulse shifts the data in the data register and increments the count in the character position counter 2621. After four shifts, four new characters, i.e., characters 1-4 of the price information, are located in data register positions 25-28 and these characters are presented to comparators 2390 for comparison with a zero from print coincidence counter 2391. A clock pulse advances the character position counter by one for each shift so after the four shifts it contains a count of five. At this time the decoder produces the signal DR05 so upon occurrence of a B clock pulse it passes through NAND 2396 and gating circuit 2393g to set one or more of print latches 2392g if one or more of the characters is zero.

The data register is then shifted four more places and another comparison takes place, the B clock pulse this time passing through gating circuit 2393f to set print latches in group 2392f.

From the above description it should be obvious that the comparison for zero coincidence takes seven comparison operations with the latches in a different group being strobed each time. After each comparison the data register is shifted four positions so at the conclusion of the seventh operation all digits have been recirculated back to their original position in the data register. One print latch has been set for each character that is a zero and each of these print latches enbles one input of one of the twenty-eight NAND gates 2394.

After 28 character position shifts, an A clock pulse advances character position counter 2621 and decoder 2622 produces an output DR29 to reset the DR CLK ENABLE FF 2619. This stops shifting of the data register until after the mechanical print operation takes place. However, the DR RUN FF 2640 remains on so NAND 2611 still applies an enabling signal to the character position counter 2621. This allows the counter to continue responding to A clock pulses in order to generate housekeeping signal. At times DRAA, DRBB, and DRCC, reset pulses are applied to the DR CLOCK ENABLE FF 2619. At time DRAA, the group counter 2620 is reset, and at time DRCC both the DR RUN FF 2640 and the LOAD PRINT REG FF 2608 are reset. When the FF 2608 is reset, the signal DRLF/BR* goes positive thereby terminating the reset signal applied to the PRINT SYNC-1 and PRINT SYNC-2 flip-flops in FIG. 29.

To summarize conditions at this time the character position counter is stopped and decoder 2622 is producing the signal DR01. The data register is stopped.

There is a print latch 2392 set for each zero to be printed and each print latch that is set is spplying an enabling circuit to an input of one of the 28 NAND gates 2394.

Before the enabled NAND gates 2394 can produce output signals to drive the 28 hammer driver amplifiers, the NAND gates must receive a strobing pulse. This strobing is initiated by the FP strobe sensor 3202 sensing the first aperture 350 (FIG. 16) following the frame mark aperture. The strobe sensor 3202 produces an output signal that is applied to NAND 3204, this NAND being further conditioned by the signal PIG as long as power is good in the window unit. The output of NAND 3204 is inverted at 3206 and applied as the signal DRMIPA/B to FIG. 29 where it passes through NAND 2909, NOR 2912 and NAND 2913 to trigger the print strobe one-shot multivibrator 2914. When the multivibrator is triggered it produces a negative output signal on lead 2915 to block NAND 2913. The signal on lead 2915 is inverted at 2916 to condition one input of NAND gates 2917 and 2918. Since the PRINT SYNC-2 FF 2911 is in its reset state at this time, NAND 2918 produces an output signal that is inverted at 2919 to become the positive strobe signal DRPSTB-A. The signal strobes one-half of the 28 NAND gates 2934 and if any of these NAND gates is receiving a signal from a print latch the NAND gate will produce an output signal to energize one of the 28 hammer driver solenoids 2395 and print a zero character.

The first A clock pulse following triggering of the multivibrator 2914 sets the print SYNC-1 FF 2910. This enables the input to the PRINT SYNC-2 FF 2911. However, FF 2911 is not set at this time because it receives no triggering signal. When the strobe mark sensor 3202 senses the second strobe mark 350 it again triggers the print strobe one-shot 2914 which has returned to its original state by the time the second strobe mark is sensed. The FF 2911 receives a negative going signal from inverter 2919 at its clocking input so the FF is set. The positive output signal from the PRINT SYNC-2 FF passes through NAND 2917 and NOR 2920 to become the strobe signal DRPSTB-B. This strobe signal is applied to the other half of the twenty-eignt NAND gates 2394 and if any of these gates is further conditioned by an output from one of the print latches it conditions one of the 28 hammer driver amplifiers 2395 to cause a zero character to be printed.

At this point it should be noted that hammer driver amplifiers 2395 are employed not only to drive the hammer solenoids for printing on the front of the duplicate ticket, but they are also subsequently used for causing information to be printed on the back of the original ticket marked by the customer. This latter operation is subsequently described in detail. However, for the present it is sufficient to note that when the hammer driver amplifiers 2395 are to drive the front printer solenoids, the signal FPHEN is positive, and if the hammer driver amplifiers are to drive the back printer solenoids the signal BKPHEN is positive. These signals are derived from FIG. 30 and one or the other of the signals is always present depending upon whether or not the hammer enable relay 3000 is energized or deenergized.

The setting of the PRINT SYNC-2 FF 2911 signals the end of the printing operation for "zero" characters. As the PRINT SYNC-2 FF is set its output signal DRPSY2* goes negative. The output of the PRINT SYNC-2 FF 2911 conditions one input of NAND 2978 and when the print strobe one-shot 2914 returns to its initial state a second input of the NAND is conditioned. At the next following A clock pulse the output of NAND 2978 goes negative and at the end of the clock pulse it again goes positive. This positive going signal F/BPRTL is applied through NOR 2645 to again set the LOAD PRINT REGISTER FF 2608.

When the PRINT LOAD REGISTER FF is reset, its output signal DRLF/BR* goes negative and in FIG. 29 this signal resets the PRINT SYNC-1 FF and the PRINT SYNC-2 FF. AS the PRINT SYNC-2 FF is reset it produces the positive-going signal DRPSY2*. This signal is applied to FIG. 23A to advance the print coincidence counter 2391 to a count of one.

The setting of the LOAD PRINT REGISTER FF 2608 also conditions NAND 2603 so at the next following B clock pulse the negative output of NAND 2603 is inverted by NOR 2613 to enable NAND 2614. NAND 2614 is further conditioned at this time by the inverted signal DR01 from the character position decoder 2622. The output of NAND 2614 sets the DR RUN FF 2640 and the output of the DR RUN FF acting through inverter 2650 sets the DR CLOCK ENABLE FF 2619. As before, the output signal from the DR CLOCK ENABLE FF passes through NAND 2609 and NOR 2610, to NAND 2368 thereby enabling clock pulses to be applied to the data register. The output of NOR 2610 also conditions the four NAND gates 2364 which are further conditioned at this time by the signal DRLDR* so that the data may be shifted end-around through the register.

The output from the RUN FF also conditions NAND 2611 again so a signal is applied through NOR 2612 to enable the character position counter 2621 and the group counter 2620. The apparatus is now in condition to begin a cycle to compare each character with a "one" output from the print coincidence counter 2391, and print a one for each comparison.

During the next 28 clock pulse periods the data is recirculated in the data register 2367 with the data in register positions 25 through 28 being applied to the comparators 2390 for comparison, after every fourth shift, with a one generated by the print coincidence counter 2391. The print latches are selectively set in the same manner that a coincidence between zeros caused them to be set during the previous data register recirculation cycle. Since the comparison operation and the data recirculation take place at electronic rates, all of the print latches that should be set will be set before the FP strobe sensor 3202 senses the third aperture 350 (FIG. 16) in the timing disc. When the third aperture is sensed the FP frame sensor 3200 again produces the signal DRMIPA/B which passes through NAND 2909, NOR 2912 and NAND 2913 to trigger the print strobe one-shot 2914. Triggering of the print strobe one-shot causes the strobe signal DRPSTB-A. This strobe signal again conditions one-half of NAND gates 2394 to energize the hammer driver amplifiers 2395 to print ones on the duplicate ticket. When the fourth aperture is sensed, the signal DRMIPA/B again triggers the print strobe one-shot 2914, this time causing the PRINT SYNC-2 FF 2911 to be set so that the strobe signal DRPSTB-B to be produced.

At character times 29 through 32 the DR CLOCK ENABLE FF is reset and at character time 30 the group counter 2620 is re-set.

At character time 32 the DRCC signal from the character position decoder 2622 again resets the DR RUN FF 2640 and the LOAD PRINT REGISTER FF 2608. The NAND gate 2918 produces the signal F/B PRTL to set the LOAD PRINT REGISTER FF 2608 and initiate a third cycle. The signal DRPSY2* produced as the print SYNC-2 FF 2911 is reset again increments the count in the print coincidence counter so that the device is ready to compare all characters in the data register with the digit two.

Since each row extending around the periphery of the print drum contains 14 characters, 14 cycles like that described above are carried out with the print coincidence counter 2391 being incremented by one for each cycle. When the signal DRPSY2* increments the print coincidence counter 2391 to a count of 14 it signals an end to the print operation. Counter 2391 produces the signal DRPC-14 which is inverted by NOR 2925 to condition one input of NAND 2926. This NAND is further conditioned by the positive output from the PRINT CONCLUDE one-shot 2927. Therefore, at the end of the first A clock pulse following incrementing of the print coincidence counter 2391 to a count of 14, the PRINT CONCLUDE one-shot is triggered. The negative going signal on output lead 2928 passes through NOR 2900, and inverter 2901 to become the signal DRF/B CLR. This signal is applied to FIG. 23a where it resets the print coincidence counter 2391. It is also applied to FIG. 26 where it passes through NOR 2606 and inverter 2607 to reset the LOAD PRINT REGISTER FF 2608.

The signal on lead 2928 also blocks NAND 2926, terminating the input to one-shot 2927. The positive output signal on lead 2929 conditions one input of each of the NAND gates 2907 and 2930. Since the FRONT PRINT FF 2904 is still set at this time NAND 2907 produces a negative output signal that is inverted by NOR 2931 to become the signal MIPCON. The output of NAND 2907 is also applied through an inverter 2932 to the FRONT PRINT FF 2904. The next following B clock pulse resets the FF 2904.

When FF 2904 is reset, the signal DRFEN* goes positive. In FIG. 26, this drives the reset input of the LOAD DR FF 2615 and the START FF 2600 positive.

Once the data has been printed on the front of the duplicate ticket the ticket is moved to the printing station 62 (FIG. 2) so that brush marks may be imprinted thereon.

The signal MIPCON lasts for 1 millisecond and terminates when the PRINT CONCLUDE one-shot 2927 returns to its normal state. The signal is applied to the clocking input of a STEP INITIATE FF 3208, an INPUT SLEW FF 3209, and a CLOCK FF 3210. The STEP INITIATE FF produces a signal on lead 3211 to disable a modulo-4 counter 3212. The signal on lead 3211 is designated SIN* and it is applied to FIG. 33 where it acts through a driver amplifier 3300 to energize the coil of a stepper clutch 3301. This clutch corresponds to the clutch 251 shown in FIG. 5, and enables the motor 3223 to drive the ticket feed mechanism.

The CLOCK FF 3210 produces a positive output signal on lead 3213 to enable a clock pulse generator 3214. This clock pulse generator produces 25 microsecond pulses as long as it is enabled. The clock pulse generator includes a controllable oscillator that produces the clock pulses at a slow rate unless input lead 3215 is positive in which case it produces clock pulses at a fast rate. The output of the clock pulse generator is a clock pulse CPB* and this signal is inverted by NOR 3216 to provide the clock pulses CPB.

The signal CLCT from the CLOCK FF is applied to a NAND 3102. The NAND 3102 is further conditioned at this time by a signal CTRD* from the reset output side of a flip-flop in the last stage of modulo-16 counter 3222. The output from NAND 3102 drives the stepper motor 3103 to a predetermined initial state of phase 4, defined below.

Since the INPUT SLEW FF is reset the lead 3217 is negative, and NOR 3218 applies a signal to the clock pulse generator 3214 to generate clock pulses at the fast rate. CPB clock pulses are applied over a lead 3219 to one input of a NAND 3220. This NAND is further conditioned by a positive output from the reset side of the INPUT SLEW FF, so upon occurrence of each CPB pulse NAND 3220 produces an ouptut signal that is inverted at 3221 and applied to a modulo-16 counter 3222. This counter counts and controls the number of clock pulses applied to a stepper motor 3223. Although it is a modulo-16 counter and produces an output signal to stop the stepper motor after it has counted 15 CPB clock pulses, only 14 clock pulses are required to step the motor sufficiently to present the first brush mark printing line at the brush mark printing station. The first two clock pulses counted by the modulo-16 counter do not energize the stepper motor. An output lead 3233 from the second stage of the counter goes negative as the counter counts the second clock pulse. This signal is applied to the STEP INITIATE FF to reset it. With the STEP INITIATE FF reset the positive signal on lead 3211 enables the input of modulo-4 counter 3212. Succeeding CPB* clock pulses are inverted by NOR 3224 and applied to the clocking inputs of both stages of the counter 3212 to repeatedly cycle the counter through its four states.

When the STEP INITIATE FF is reset, the signal SIN* is terminated. However, the stepper clutch remains energized. The signal CLCT from the CLOCK FF 3210 is applied to FIG. 33 where it is inverted at 3365 and passes through amplifier 3300 to energize the stepper clutch coil 3301.

Four NAND gates 3225 through 3228 receive output signals from the two stages of the counter 3212 and decode the signals to provide four sets of signals of different phase. These signals are applied through driver amplifiers 3229 through 3232 to drive the stepper motor and advance the duplicate ticket. This stepper motor corresponds to stepper motor MS shown in FIG. 5.

When the modulo 16 counter 3222 reaches a full count it is an indication that the ticket is in position for printing the first line of brush marks. All output leads from the counter to NAND 3234 become positive. The NAND gate is further conditioned by the positive output signal from the INPUT SLEW FF 3209. The NAND gate produces a negative output signal that is inverted at 3235 to become the signal 15DT. This signal is applied to a MARK SENSE ENABLE FF 3100 to set the FF upon occurrence of the next CPB clock pulse. This CPB clock pulse is the fourteenth clock pulse applied to modulo-4 counter 3212. The MARK SENSE ENABLE FF produces a negative output signal MSEN* which is applied to the lead 3236 to set the INPUT SLEW FF 3209. The NOR circuit 3218 is receiving a positive signal from the PAPER EJECT-1 one-shot multivibrator 3237 at this time so when the INPUT SLEW FF is set NOR 3218 conditions the clock pulse generator to produce clock pulses at the slow rate.

The signal MSEN* on lead 3236 is also applied to the last stage of counter 3222 to set the last stage of this counter. The signal CTRD* is derived from this last stage and when the stage is set the signal CTRD* blocks one input of NAND 3102.

At the time the MARK SENSE ENABLE FF 3100 was set, it conditioned the BMP FRAME MARK FF 3104. It also conditioned one input of four NAND gates 3105 through 3108. The four-phase output signals derived from counter 3212 are inverted and applied to NAND gates 3105 through 3108 and the outputs from these NAND gates are applied through driver amplifiers 3137 through 3140 to drive the brush mark print cylinder stepper motor 3103. The motor is stepped the distance from one print line to the next each time a line of brush marks is printed.

Output gates 3123 through 3126 may be conditioned to produce negative output signals and these signals are displaced in phase from the output signals from gates 3105 through 3108 and act to electronically brake the stepper motor during the latter portion of each phase signal from NANDS 3105 through 3108. The output signals from gates 3105 through 3108 are applied directly to the reset enabling inputs of four flip-flops 3141 through 3144, and are applied through inverters 3145 through 3148 to the set enabling inputs of the four flip-flops. When any of the flip-flops is set, its output conditions one input of one of the NAND gates 3123 thorugh 3126. Each of these gates is further conditioned by a positive output signal from the RETRO CLOCK one-shot and the flip-flops are clocked by CPB pulses from RETRO CLOCK 3119 so if the RETRO CLOCK one-shot produces a positive output signal NAND 3123 produces an output during the latter half of the phase 4 pulse from NAND 3108. NAND gates 3124, 3125 and 3126 produce negative output signals during the latter portion of the succeeding three phases, respectively. These pulses occur for each brush mark printing line and serve to brake the stepper motor 3103 during the latter portion of each line-by-line movement of the brush mark print cylinder by the motor.

At the end of the next following CPB pulse after FF 3100 is set, FF 3104 is set. The negative output of the FF is inverted by NOR 3109 to become the positive signal BMPFM. This signal is applied to FIG. 25D to condition FF 2560 so that upon termination of the next following A pulse the FF is set. It produces a positive output signal to condition one input of NAND 2561 at the input of the SPBM one-shot multivibrator 2562. The signal VAC PRES* is inverted by NOR 2563 and conditions a second input of NAND 2561.

At the time the BMP FRAME MARK FF 3104 was set it produced a positive output signal on lead 3110 to enable one input of a NAND gate 3111, and further produced a positive level on a lead 3113 to enable the set input of the BMP STROBE FF 3114. The next following negative going CPB* pulse passes thorugh NOR 3115 and NAND 3111 to trigger the RETRO DELAY one-shot multivibrator 3116. After a predetermined delay, the negative-going output signal from the multivibrator passes through NOR 3117 and NAND 3118 to trigger the RETRO CLOCK one-shot multivibrator 3119. The negative-going output signal from RETRO CLOCK 3119 passes through NOR 3120 and NAND 3121 to trigger the BMP STROBE' DELAY one-shot 3122. The negative output from the retro clock also blocks the four NAND gates 3123 through 3126.

After a delay of 5 milliseconds the negative-going output from the BMP STROBE DELAY one-shot 3122 triggers the BMP STROBE FF 3114 so that the output signal BMPLS from NOR 3127 goes positive. The signal BMPLS is applied to NAND 2561 in FIG. 25D, and since the other inputs to this gate are now conditioned, the SPBM one-shot 2562 is triggered to change state for an interval of 8 milliseconds. The output lead becomes positive and the signal SPBMOS is applied to eight NAND gates 2397 in FIG. 23A.

The signal SPCTC is still positive because the SPCTC FF 2534 in FIG. 25D is still set. Therefore, when the signal SPBMOS conditions NAND gates 2397 (FIG. 23a) the mark-indicating signals in the rightmost positions of the eight shift registers in the scan memory are gated through eight NAND gates 2398, inverters 2356, NOR gates 2313A and 2313B, and NAND gates 2397 to drive selected ones of the eight brush mark hammer driver amplifiers 2399.

In FIG. 25D, the first A clock pulse occuring after lead 2564 goes positive sets the SPBMC FF 2535 and the signal SPBMC* goes negative. The first A clock pulse occurring after the end of the 8 millisecond interval resets the SPBMC FF because the lead 2565 is positive. At this time the positive going signal SPBMC* is applied to FIG. 25C where it passes through NOR 2545 to become the signals SPRC CLK and S CLK. The signal SPRC CLK is applied to the 10 stage ring counter 2351 to advance the counter to the condition whereby it produces the output signal SPRC-1. The signal S CLK is applied to NAND 2357 in FIG. 23A and blocks NAND 2357 which is otherwise conditioned by the positive signal SPCTC. The positive output signal from NAND 2357 is applied to all eight NOR gates 2358. The NOR gates produce output signals that pass through inverter 2359 to shift all eight of the ten-stage shift registers in the scan memory 2346. Each register is shifted individually through NOR gates 2358 which also supplied the shift clocks during counts 8 through 15 of the SPTC counter.

It should be noted that the 10 stage ring counter 2351 is used during the operation only to count 10 cycles. Although output signals from the counter are applied to the ticket scan photocells, the NAND gates 2355 are all blocked by the SPCTC* signal so that the outputs from the ticket scan photocells 2341 cannot be applied to the total spots counter 2340 or to the scan memory 2346.

The next CPB* clock pulse triggers the retro delay one-shot 3116 to which in addition to setting up the next retro control to NAND gate 3123 begins operations for energizing the brush mark hammer drivers 2399 to print the second row of brush marks. The output of the retro delay one-shot 3116 triggers the retro clock 3119 and the output of 3119 triggers the BMP strobe delay one-shot 3122 to set the BMP strobe FF 3114. The signal BMPLS derived from the output of FF 3114 is applied to FIG. 25D to trigger the SPBM one-shot 2562. The one-shot produces the signal SPBMOS which conditions gates 2397 to gate signals representing the second row of brush marks to the brush mark amplifier 2399. The SPBM one-shot also sets and resets the SPBMC FF 2535 in FIG. 25D to produce the signal SPBMC* which is inverted by NOR 2545 in FIG. 25C to produce the signals SPRC CLK and S CLK. As before, the signal SPRC CLK advances the ten stage ring counter 2351 at the same time the signal S CLK passes through NAND 2357 to condition NORs 2358. NOR gates 2358 then shift the registers in the scan memory 2346.

Since there are signals representing 10 rows of brush marks stored in the scan memory 2346, it is necessary to take a total of 10 cycles like the two just described. At the beginning of the 10th cycle the 10 stage ring counter 2351 is advanced so that it produces the SPRC-9 signal. This signal is applied to FIG. 25D where it conditions one input of NAND 2566. Near the end of the cycle, during the 8 millisecond interval that the SPBM one-shot 2562 is triggered, it conditions the input of the SPBMC FF 2535 so that this FF is set. The output of this FF is also applied to NAND 2566. After the end of the 8 millisecond interval the one-shot 2562 returns to its initial condition and applies a third positive input to NAND 2566. The output of NAND 2566 is applied through NOR 2567 and NAND 2568 to enable the BMCPT FF 2533. The output of NOR 2567 is the signal BMFSH which is applied to FIG. 25A to condition the reset input of the SPSG-2 FF. Therefore, the first A clock pulse occurring after the SPBM one-shot 2562 returns to its normal state resets the SPBMC FF 2535 and the SPSG-2 FF 2532. This same clock pulse sets the BMCPT FF 2533.

In FIG. 25C, the signal BMCPT passes through NAND 2580 and inverter 2581 to condition NAND 2544. The output of NAND 2580 is also applied to NOR 2542 to become the signal SPRC set. This enables an input to the first stage of the ring counter 2351. When the next A clock pulse goes negative, the NAND 2544 will go positive causing a negative going SPRC CLK to occur at the output of NOR 2545 this signal clears the 10th stage of the counter 2351 and sets the first stage.

As the BMCPT FF is set, the signal BMFSH* derived from the output of NAND 2566, is applied to FIG. 26 to disable the character position counter 2621 and the group counter 2620, and generate the reset signal PBMC.

In FIG. 25D the output of the BMCPT FF conditions the reset inputs of FF 2560 and FF 2534 so that these FFs are reset at the end of the fall of the next A clock pulse. the signal BMCPT is applied to FIG. 31 where it is inverted by inverter 3130 before being applied to the diode gated reset inputs of the MARK SENSE ENABLE FF 3100 and the BMP FRAME MARK FF3104. Both flip-flops are immediately reset. The resulting output from FF 3100 blocks the gates 3105 through 3108. The output of FF 3104 disables the BMP STROBE FF 3114 and NAND 3111 so that no further brush mark print cycles or retro cycles may be initiated.

The output of the BMCPT FF 2533 in FIG. 25D conditions the SPCTC FF 2534 so that this flip-flop is reset on the first A clock pulse following completion of the 10th brush mark print cycle. One output from the FF blocks gates 2398 on the output of the scan memory and another output from the FF conditions NAND gates 2355 so that data from the ticket scan photocells may again be entered into the scan memory and counted at the total spots counter. As the signal SPCTC goes negative it is applied to the keyboard 2362 to terminate the signal TRANS*. Termination of the signal TRANS* again enables one input of AND 2510 in FIG. 25A. The TRANS* signal is also applied to FIG. 25A where it resets SPTR FF 2552. The output of FF 2552 goes negative to remove the negative clock pulse input to the START FF of FIG. 26.

The signal BMCPT in FIG. 25D signifies a completion of the brush mark printing operation and it is used to initiate two functions simultaneously. One operation ejects the marked duplicate ticket upwardly through the slot 32 (FIG. 1) so that after inspection of the ticket, the window operator may present it to the customer. The second operation involves the transfer of the 28 characters of information in data register 2367 at the window to the data register 2310 at the game control station. Considering first the data transfer operation, the signal BMCPT is applied to FIG. 30 where it is inverted by inverter 3002 so as to trigger a DR DATA READY FF 3004. The output of FF 3004 is the positive signal WRDY-1. This signal is applied to the control circuits 2324 of the game control station 2300. These control circuits are shown in FIG. 34 and include a scan counter 3402 and a decoder 3404. The scan counter has a capacity equal to the number of window units that may be connected to the system. For example, if the system is to provide for 16 window units then the scan counter must be a modulo- 16 counter. The counter receives B clock pulses and continuously recycles as long as the lead 3406 is positive. The count in the counter is decoded by decoder 3404 to energize one of NAND gates 3408. The NAND gates are energized one at a time in sequence and this scanning operation takes place until one of the data units signals the game control station that it has a line of data ready for transfer. The signal WRDY-1 produced in FIG. 30 is applied to one input of NAND 3408-1. The window unit waits until the scan counter has been cycled around to condition the gate 3408-1. At this time NAND 3408-1 produces an output signal that passes through NAND 3410 and inverter 3412 to become a negative signal on lead 3406. This signal is applied to the clock pulse enabling input of the scan counter so when the voltage level becomes negative the scan counter is stopped because it can no longer respond to B clock pulses.

The signal on lead 3406 is inverted by inverter 3414 to condition the set inputs of a SCAN CONTROL FF 3416 and a DATA TRANSFER FF 3418. At the next following A clock pulse both FF's are set. The negative output from the SCAN CONTROL FF is applied by way of lead 3420 to the transfer input of scan counter 3402 to completely disable the counter. The output of DATA TRANSFER FF 3418 passes through NOR 3422 to enable a modulo-32 counter 3424. This enables counter 3424 so that it is incremented by each following A clock pulse. The output of FF 3418 is applied through NOR 3426 to one input of NAND 3428. This conditions NAND 3428 so that each of the first 28 B clock pulses occurring after the FF 3418 is set causes a SHIFT DR signal to shift data in the game control station data register 2310. At this point it may be noted that data register 2310 is a 28 position register whereas counter 3424 is a modulo-32 counter. Therefore, the output of counter 3424 is decoded by decoder 3430 to produce 32 distinct output signals. The last four signals, representing counts of 28, 29, 30 and 31 in the counter, pass through NOR 3432 and inverter 3434 to disable NAND 3428 during the last four counts of the counter. Thus, for each cycle of the counter 3424 only 28 shift pulses appear at the output of NAND 3428.

The output of NOR 3426 is applied to one input of a plurality of NAN gates 3436. There is one NAND gate 3436 for each window unit that may be connected to the game control station. Each NAND 3436 receives an inverted output signal from count decoder 3404 when scan counter 3402 scans the corresponding transfer request gate 3408.

At the time the signal WRDY-1 is gated through NAND 3408-1 to stop the scan counter and set FFs 3416 and 3418, the output of the counter enables one input of NAND 3436-1. Therefore when the FF 3418 is set NAND 3436-1 produces the signal DRGCDREQ-1. This signal is transmitted back to the window unit where it performs two functions. In FIG. 23B, enables four NAND gates 2315 so that data shifted out of the window data register 2367 may pass into the game control station data register 2310. In FIG. 30, the signal DRGCDREQ-1 conditions one input of NAND 3008 and upon occurrence of a B clock pulse the DR DATA READY FF 3004 is reset. This terminates the signal WRDY-1 that is applied to gate 3408-1 in the game control circuits but the scan counter cannot resume scanning at this time because the scan control FF 3416 is still set.

As the FF 3004 is reset its negative going output sets FF 3006. The output signal DR-GSC* from FF 3006 is applied to FIG. 26 where it passes through NOR 2613 to condition one input of NAND 2614. Since the character position decoder is producing the signal DR01 at this time, NAND 2614 produces an output signal to set the DR RUN FF 2640. The positive signal on lead 2651 passes through NAND 2650 to set the DR CLOCK ENABLE FF 2619. This conditions NAND 2609 so that it produces an output signal that passes through NOR 2610 to become the signal DRGEN. This signal is applied to FIG. 23B where it conditions NAND gates 2368 and 2364. The NAND gates 2364 are further conditioned at this time by the signal DRLDR*. Therefore the data register 2367 is conditioned to recirculate the data contained therein and does so for the next 28 A clock pulse times. As the data is shifted out of the right end of the register it is applied to NAND gates 2315 so that it is entered into the data register 2310 at the game control station. It will be remembered that at this time the data register at the game control station is being shifted by B clock pulses. Therefore the data at the window data register is shifted at A time and is sampled by the data register at the game control station at B time.

When the DR RUN FF 2640 is set it applies a signal to NAND 2611 and since the further inputs of this gate are enabled it produces an output signal that passes through NOR 2612 to enable the character position counter 2621 and the group counter 2620. Therefore, at the time the data is being recirculated and transferred to the game control station these counters keep track of the position of the data.

After 28 shifts all of the data from the window data register 2367 has been entered into the game control station data register 2310. At this time the decoder 3430 at the game control station produces the signal 28 which is applied over lead 3440 to reset the DATA TRANSFER FF 3418 and the SCAN CONTROL FF 3416. When FF 3416 is reset its output enables counter 3402 so that the counter again begins scanning the transfer request gates 3408. The output from the FF 3418 acts through NOR 3426 to block NAND gates 3428 and 3436. At this time the signal DRGCDREQ-1 goes negative and blocks the NAND gates 2315 which connect the output of the data register at the window to the input of the data register at the game control station. The negative signal DRGCDREQ-1 resets the DR-GCS FF 3006 to terminate the signal DR-GCS*.

At the window unit, the character position counter and the group counter continue to respond to A clock pulses until they reach the end of their cycles. At the time the character position counter 2621 advances so that the signal DRCC terminates and the signal DR01 begins, the signal DRCC is inverted at 2605 to reset the DR RUN FF 2640. The output from the DR RUN FF disables the gate 2611 to disable the clock pulse input to the character position counter 2621 and the group counter 2620. At the end of each of the signals DR29, DRAA, DRBB, and DRCC produced by the character position decoder 2622, NOR 2638 produces an output signal to reset the DR CLOCK ENABLE FF so that gates 2618 and 2609 are both disabled and NOR gate 2610 cannot produce the signal DRGEN. In FIG. 23, this blocks NAND gates 2368 so that clock pulses cannot be applied to the shift input of the data register 2367.

At this time the transfer of the data from the window to the game control station is complete. Control circuits forming no part of the present invention but obvious to those skilled in the art control the subsequent transfer of the data from the gate control station to another data register in the accounting station 2314. From here the data is fed to the line printer 2320 at the game control station, and into the data processor 2316 for processing.

It will be remembered that at the time operations were initiated to transfer data to the game control station, the signal BMCPT initiated a ticket feed operation to feed the completely marked duplicate ticket out of the machine to the window operator. The signal BMCPT is applied to a PAPER EJECT-1 one-shot 3237. For 550 milliseconds the one-shot 3237 produces a negative output signal on lead 3238 and this signal passes through NOR 3218 to condition clock pulse generator 3214 to produce clock pulses at the fast rate. The clock pulses CPB* are applied to the modulo 4 counter 3212 through NOR 3224. The modulo 4 counter distributes the four phase pulses through gates 3225 through 3228 as previously described to drive the stepper motor 3223 at the high stepping rate. During this interval, the stepper clutch 3301 is still energized by the inverted output signal from the set side of the CLOCK FF 3210.

The negative output PET-1* from one-shot 3237 resets the MARK SENSE ENABLE FF 3100 and the BMP FRAME MARK FF 3104. These FF's were also reset by the BMCPT signal at the conclusion of the brush mark printing operation.

At the end of the 550 millisecond interval the negative-going signal on lead 3239 is inverted by NOR 3240 and conditions NAND 3241 to trigger the PAPER EJECT-2 one-shot 3242. For 250 milliseconds after it is triggered the one-shot 3242 produces a positive signal on lead 3243 and this signal is applied to a NAND gate 3244. When the modulo-4 counter 3212 is counted to phase 4 NAND 3244 produces a negative output signal to clear the upper drive. This signal resets modulo-16 counter 3222, the INPUT SLEW FF 3209, and the CLOCK FF 3210.

When the clock FF 3210 is reset it disables the clock pulse generator 3214 so that further clock pulses cannot be produced to drive the stepping motor 3223. This stops the ticket feed because the ticket has been ejected onto the counter top. In FIG. 33, the signal CLCT goes negative and the stepper clutch 3301 for the ticket feed drive is released.

At the same time, the signal on lead 3254 goes positive and this signal acts through NOR 3245 to block NAND 3246. After 150 milliseconds the EJECT COMPLETE one-shot 3247 changes state and the signal EJCMP* goes positive. This signal is applied to NOR 3370 which also receives a positive signal from NAND 3303 if the paper advance switch 3371 is closed. The output of NOR 3370 is inverted by NOR 3304 and applied to NAND 3305 to trigger the SPOT INHIBIT one-shot 3306.

When the SPOT INHIBIT one-shot is triggered it produces a negative signal of 55 milliseconds duration on lead 3307. This signal blocks NAND gate 3308 at the input of the SPOT CLOCK one-shot 3309. It also triggers the BRAKE-CLUTCH FF 3302 so that the output leads 3310 and 3311 go negative and positive respectively. The positive signal on lead 3311 acts through driver amplifier 3312 to deenergize the solenoid of the lower brake 3313. The negative signal on lead 3310 acts through driver amplifier 3314 to energize the inker solenoid 3315. The signal on lead 3310 also passes through NOR 3316 and NAND 3317 to become the signal UDI. This signal is applied to FIG. 32 where it resets the CLOCK FF, the INPUT SLEW FF, and the counter 3222.

The signal on lead 3310 is also applied to driver amplifier 3318 to energize the solenoid 3319 of the lower clutch, and the ribbon relay 3320. The ribbon relay has contacts 3321 which close when the relay is energized thereby completing a circuit to apply AC power to the ribbon motor 3322. This motor drives the ribbon at the station where data is printed on the duplicate ticket.

Energization of the lower clutch solenoid 3319 applies driver power to the feed mechanism to advance the strip of tickets past the cutter knife.

During the time the BRAKE-CLUTCH FF is set the signal on lead 3310 is inverted by inverter 3323 but the point 3324 is negative because the SPOT INHIBIT one-shot 3306 is applying a positive signal to inverter 3325. At the end of 55 milliseconds the one-shot returns to its initial state and the point 3324 rises to a positive value to enable the input to the KNIFE FF 3327, At the same time, the signal on lead 3307 becomes positive to condition NAND 3308.

As the strip of tickets is fed into the machine a spot sensor circuit 3326 senses a spot which is imprinted on each ticket. The spot sensor 3326 includes the photocell 115 shown in FIG. 2. Feeding of the paper continues until a spot is sensed. When the spot is sensed the one-shot 3309 produces a positive output signal of 65 milliseconds duration. At the end of this time the output of the one-shot 3309 goes negative and triggers the KNIFE FF 3327. Several things take place in quick succession when the KNIFE FF is set. The negative signal on lead 3328 is applied through NOR 3316 and NAND 3317 to FIG. 32 to reset the CLOCK FF, the INPUT SLEW FF and the counter 3222.

The output of the knife FF is applied by way of leads 3332 and 3333 to the reset input of the BRAKE-CLUTCH FF 3302. The outputs from FF 3302 energize the lower brake solenoid 3313 and release the lower clutch coil to stop feeding of the strip of tickets. The signal on lead 3310 also releases the inker solenoids 3315.

The output of the knife FF also acts through driver amplifier 3329 to energize a knife clutch solenoid 3330. When energized this clutch causes a cycle of mechanical operations to take place during which the knife blade 196 (FIG. 2) severs one ticket from the end of the strip of tickets fed into the machine. During this cycle of operation a cam 167 operates a contact 171. These elements are mechanically shown in FIG. 5 and are electrically illustrated in the left portion of FIG. 33. When the contacts 171 are transferred by the cam 167 they set and then subsequently reset a KNIFE SWITCH FF 3334, the reset coming at the end of the knife cycle. The FF produces a negative output signal on lead 3335 to reset the KNIFE FF.

Figure 2:
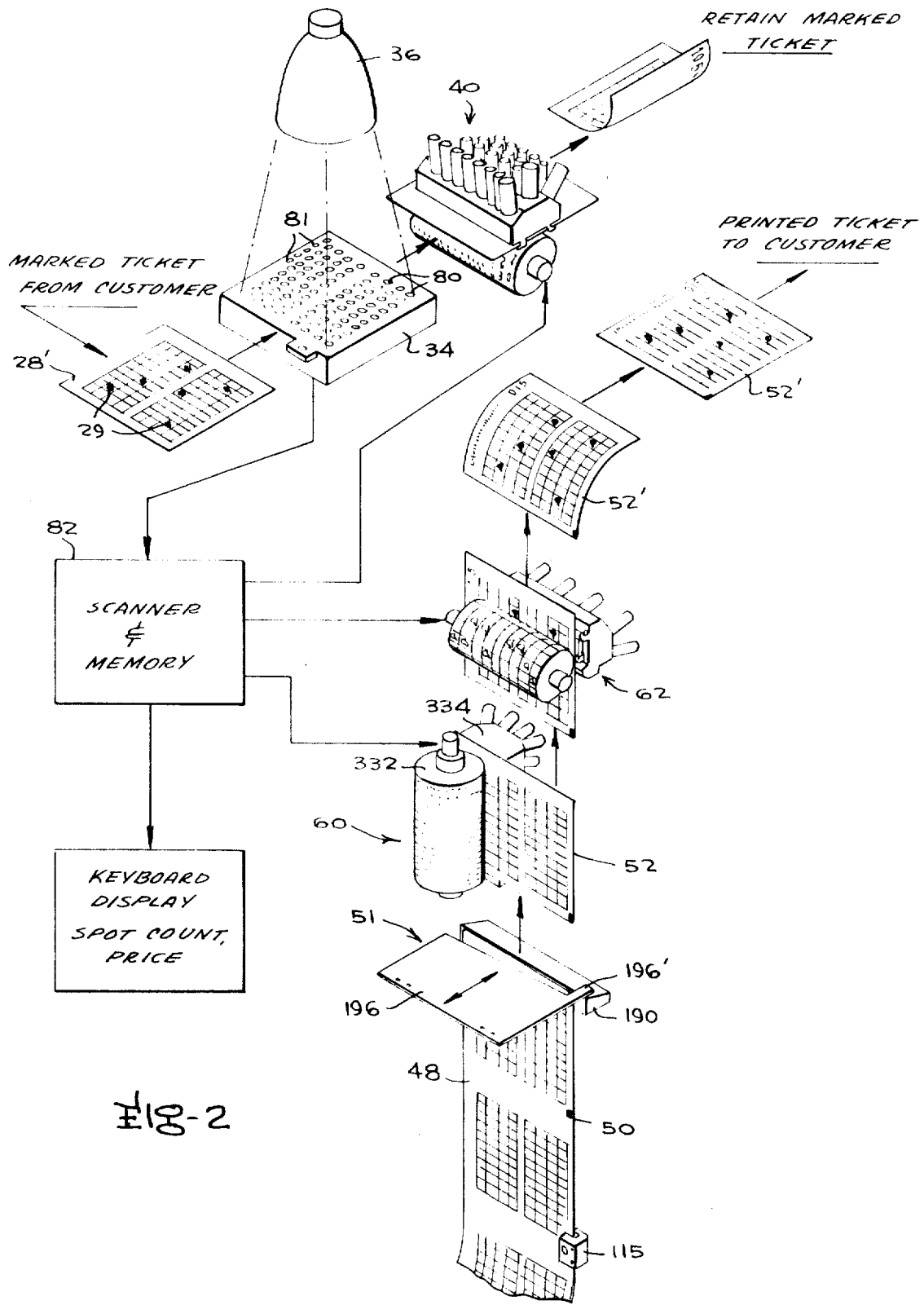
FIG. 2 is a diagrammatic flow diagram illustrating various components of the preferred embodiment and functions of the components.

At this point it should be noted that the output of the KNIFE FF is applied through a 15 millisecond delay 3336 and the driver amplifier 3300 to the stepper clutch 3301. Therefore, from a period of about 15 milliseconds after the KNIFE FF is set until about 15 milliseconds after it is reset the stepper clutch 3301 is energized. The positive going signal KNF* is applied through NOR 3224 to increment the modulo-4 counter 3212. This steps stepper motor 3223 and the motor moves the ticket feed mechanism so that the severed ticket is moved one step to printing position at printing station 60 (FIG. 2).

When the knife switch 171 resets the KNIFE SWITCH FF 3334, the resulting positive output signal conditions NAND 3350 to trigger the CARRY OVER DELAY one-shot 3354. After a delay of 100 milliseconds, one-shot 3354 produces a positive output signal to trigger the WICK one-shot 3356. For a period of 0.7 second the output of the WICK one-shot acts through driver amplifier 3357 to energize the inker motor relay 3358. The relay contacts 3360 close to apply a driving voltage to the inker motor 3362, thereby driving the inking roller wick for a period of 0.7 seconds.

The output of the KNIFE SWITCH FF 3334 is normally negative and this signal is applied to NOR 3350. This prevents triggering one-shot 3354 during the next ticket issuing operation when the signal CLCT goes negative at the end of the ticket eject operation.

The output of the WICK one-shot 3356 conditions a NAND 3363. Since the CLOCK FF 3210 is reset, the signal CLCT is negative. This signal is inverted at 3365 and applied to the second input of NAND 3363. The NAND gate produces an output signal which acts through driver amplifier 3300 to keep the stepper clutch 3301 energized until after the stepper motor has taken the step in response to the KNF* signal.

The above described operations complete the cycle of operations for ejecting the marked and imprinted duplicate ticket through the slot in the counter top, and severing a new duplicate ticket from the input feed roll and placing the severed ticket in position at the printing station 60 (FIG. 1). The operator inspects the marked duplicate ticket and, if it is in order, gives it to the customer. The original ticket marked by the customer is still in position over the photocells which scanned it. The operator is now ready to slide this ticket into the back print unit 40 of FIG. 2 so that the data that was imprinted on the front of the duplicate ticket may be imprinted on the back of the original ticket.

A solenoid-operated back gate normally blocks entrance into the back printer unit and this gate is used to align the tickets over the photocells. At the time the window unit receives the negative-going signal DRGCDREQ-1 indicating that the game control station has received the data from the window data register, it resets FF 3006 in FIG. 30. The negative-going output signal from this FF sets an OPEN GATE FF 3012. The negative output signal from FF 3012 passes through NOR 3014 and NAND 3016 to become the signal BKGO. This signal is applied to the game control station 2300 where it lights the indicator 2322.

The positive output signal from NOR 3014 passes through NAND 3018 and acts through driver amplifier 3020 to energize the hammer enable relay 3000. The contacts of this relay transfer and a positive voltage is applied through both sets of normally open contacts to generate the signals BKPHEN and OPBG. The signal BKPHEN is applied to the driver amplifiers 2395 of FIG. 23A and conditions these drivers to drive the back printer solenoids rather than the front printer solenoids.

The signal OPBG is applied to FIG. 27 where it energizes the back gate solenoid 2708. This solenoid operates the back gate and moves it out of position so that the operator may insert the original ticket through the slot 42 (FIG. 1) and into the back printer unit.

The signal OPBG is also applied to the BKP ENABLE FF 2710. This FF comprises a pair of cross coupled NAND circuits and since the signal OPBG is applied directly to one NAND and through an inverter 2730 to another NAND, the FF output 2712 is always of the same polarity as the signal OPBG.

The output signal from the FF 2710 is inverted at 2714 and acts through driver amplifier 2701 to energize the vacuum off relay 2702. The contacts 2705 associated with this relay open and the signal VAC ON* becomes positive. This signal is applied to FIG. 25A where it sets the VACUUM PRESENT FF 2512. The output leads 2514 and 2520 go negative while the signal VACPRES* goes positive. The signal on lead 2520 passes through NOR 2528 to produce the clear signals SPCLR and SPCLR*. The signal VACPRES* is applied to FIG. 25D where it passes through NOR 2563 to block the input of the SPBM one-shot 2562. This prevents the apparatus from going through a brush mark printing operation.

In FIG. 27, the output of the FF 2710 is applied over lead 2714 to condition one input of NAND 2716. The output of FF 2712 also passes through NOR 2718 and inverter 2720 to reset the TICKET HALT FF 2722. The positive output 2724 from this FF conditions the second input of NAND 2716 and the output of the NAND acts through driver 2726 to energize the paper feed relay 2732. The contacts 2734 and 2736 close to apply voltage to the motor 2738 to drive the ticket feed mechanism and feed the ticket into the back printer.

As the ticket approaches printing position a photocell sensor 2740 senses the presence of the ticket and produces a negative output signal that passes through NOR 2742 to NAND 2744. It may be assumed at this time that the other input of NAND 2744 is positive so the output of the NAND triggers the PRINT POSITION delay one-shot 2746.

The output of the ticket sensor 2740 is applied over lead 2748 and through an inverter 2750 to a NAND gate 2752 and a NOR 2754. It may be assumed at this time that the signal BKPY is negative so NAND 2752 is blocked.

During the 30 millisecond delay interval of one-shot 2746 the output lead 2756 is positive and the lead 2758 is negative. Therefore, the output of NAND 2760 is positive. At the end of the delay interval the lead 2758 becomes positive and the lead 2756 becomes negative so NAND 2760 is conditioned to trigger the TICKET HALT FF 2722. As the output lead 2724 of the flip-flop goes negative the paper feed relay is released so that the paper feed motor may stop. The negative signal on lead 2724 acts through driver amplifier 2762 to energize the brake relay 2764. The contacts 2766 associated with this relay close and the voltage is applied to the brake solenoid 2768 to apply a braking force to the paper feed mechanism. The alternate output of the TICKET HALT FF is delayed for approximately 100 microseconds before being applied over lead 2770 to a NAND gate 2772 and a NAND gate 2773. The output of NAND 2772 triggers the RUN RIBBON one-shot 2774 and the positive output from this one-shot is inverted at 2776 to energize the run ribbon relay 2778. When the relay is energized its contacts 2779 close and voltage is applied to the ribbon motor 2780 to advance the inked ribbon associated with the back print unit.

It is necessary to delay the printing operation until after the ribbon is advanced. Therefore, the negative output of the TICKET HALF FF 2722 is applied over lead 2781 to a NOR circuit 2782 and the output of this NOR is applied to NAND 2783 to trigger the PRINT DELAY one-shot 2784. The output signal from the PRINT DELAY one-shot 2784 blocks NAND 2773 until shortly after the one-shot 2774 releases the run ribbon relay 2778. After the run ribbon relay is released the output of the PRINT DELAY one-shot 2784 goes positive to condition an input of NAND 2773.

The printing drum of the back print unit includes a timing disc exactly like the timing disc shown in FIG. 16. It rotates at the same speed as the printing drum for the back printer station and as it rotates photocell sensors sense the frame mark 352 and the character position marks 350.

When the outputs from the TICKET HALT FF 2722 and the PRINT DELAY one-shot 2784 condition two inputs of NAND 2773, no further action takes place until the frame mark of the timing disc is sensed. At this time the frame mark sensor 2785 produces an output signal to condition the third input of NAND 2773 and the output of the NAND is inverted at 2786 to become the signal DRBKPFM. This signal is applied to FIG. 29 where it conditions NAND 2950. The signals DROG from FIG. 30 and DR RUN* from FIG. 26 are both positive at this time so NAND 2950 produces a negative output signal that is inverted at 2952 to condition the BACK PRINT FF 2954. The next following B pulse causes the FF to be set. The FF 2954 applies a positive signal over lead 2956 to one input of NAND gates 2930, 2958, and 2960. NAND gate 2960 also receives the signal DRBKPFM so upon occurrence of the frame mark NAND 2960 produces the output-signal BKLDST. At the end of the frame mark the output of NAND 2960 goes positive and this positive going signal is applied to FIG. 26 where it is inverted by NOR 2645 to set the LOAD PRINT REGISTER FF 2608. From this point on the operation of the back print unit is the same as that previously described for the front print unit. That is, the circuits of FIGS. 26 and 29 control the data register so that it is recirculated 14 times. On the first recirculation each character is fed to the comparators 2390 in FIG. 23A and compared with a binary coded decimal zero representation from the print coincidence counter 2391. The outputs from the comparators then set the print latches and the print latches energize hammer driver amplifiers 2395 at 0 print times. The signal DRBKPA/B derived from the back printer character strobe sensor 2787 controls the PRINT SYNC-1 and PRINT SYNC-2 FF 2910 and 2911 to determine the print times. Since the hammer driver amplifiers 2395 are receiving the signal BKPHEN from FIG. 30 they drive the back printer solenoids rather than the front printer solenoids.

The data register is recirculated 13 more times and on each cycle the print coincidence counter 2391 is incremented by one. After 14 recirculation cycles all of the characters of the data have been printed and the print coincidence counter 2391 produces the signal DRPC-14. This signal is applied to FIG. 29 where it triggers the PRINT CONCLUDE one-shot 2927. The output of the one-shot conditions one input of NAND 2930, and since the other input of this NAND is still being conditioned by the output from the BACK PRINT FF, NAND 2930 produces a negative output signal.

The negative output of NAND 2930 is the signal DR CLR and this signal is applied to FIG. 23B where it clears the data register 2367. The output of NAND 2930 is also inverted by inverter 2962 to clear the BACK PRINT FF 2954. The output of NAND 2930 is inverted by NOR 2964 to become the signal BKPCON. This signal is applied to FIG. 27 where it is inverted by inverter 2788 before being applied to the END PRINT FF 2790. This flip-flop comprises a pair of NAND gates having the output of one NAND connected to an input of the other NAND.

The output lead 2792 of the FF goes negative and the signal on this lead passes through NOR 2718 and inverter 2720 to reset the TICKET HALT FF 2722. The output lead 2724 from this FF becomes positive and NAND gate 2716 is conditioned to produce an output signal that energizes the paper feed relay 2732. The contacts 2734 and 2736 associated with this relay are closed to apply voltage to the ticket feed drive motor 2738. This feeds the ticket into the receiving bin 44 (FIG. 1). As output lead 2724 goes positive it disables relay driver 2762 and the brake relay 2764 is denergized. As contacts 2766 open the brake 2768 is released to allow the paper drive mechanism to operate.

At the time the output of NAND 2930 went negative, it was applied through NOR 2966 to NAND 2968 to trigger the END one-shot multivibrator 2970. For an interval of ½ second one-shot 2970 produces a negative output signal DREND* that is applied to FIG. 30 where it passes through NOR 3030 and inverter 3032 to reset the OPEN GATE FF 3012. During this interval the signal DREND* also passes through NOR 3014 and NAND 3016 to keep the indicator at the game control station energized.

At the end of the ½ second interval the signal DREND* returns to the positive level and at this time NAND 3014 is further conditioned by the output from the OPEN GATE FF so it produces a negative output signal. This signal acts through NAND 3016 to deenergize the back gate open indicator at the game control station.

The output of NOR 3014 also acts through NAND 3018 and driver amplifier 3020 to release the hammer enable relay 3000.

At the time the OPEN GATE FF 3012 is reset, the signal DROG goes negative and in FIG. 29 it blocks NAND 2950. This prevents the BACK PRINT FF from being set when the next frame mark on the back printer timing disc is sensed.

When the hammer enable relay 3000 is released the contacts 3036 open and remove the positive voltage V from the lead OPBG. In FIG. 27, this releases the back gate solenoid 2708 so that the back gate is moved back into position to block further tickets from being inserted into the back printer. The signal OPBG resets the BKP ENABLE FF 2710 and the output from this FF resets the END PRINT FF 2790. This completes an entire operation for one ticket.

The circuits shown in the drawings are capable of carrying out operations other than the standard transaction just described. For example, circuits are included for returning a ticket from the back printer unit out through the slot 42 (FIG. 1) rather than feeding it through the back printer unit to the bin 44. This operation would take place on a so-called PAY transaction. The indication of the pay transaction is derived from the transaction keys 2362 and is applied to FIG. 30 where it passes through inverter 3040 to NAND 3042. At the time the OPEN GATE FF 3012 is set, NAND 3042 is conditioned to produce an output signal that is inverted at 3044 and applied to FIG. 27. In FIG. 27 the signal is inverted at 2798 to block NAND 2744. It is also applied to NANDs 2791 and 2752. The output of NAND 2752 sets the TICKET HALT FF 2722 immediately when the ticket sensor 2740 senses the presence of a ticket. This eliminates the 30 millisecond delay in enabling the brake coil 2768. The output of NAND 2791 acts through driver amplifier 2793 to energize the reverse relay 2794. Therefore, after the data has been imprinted on the back of the ticket, normally open contacts 2795 in conjunction with the normally open contacts 2734 of the paper feed relay 2732 apply a reverse drive voltage to the motor 2738 to drive the ticket feed apparatus in the reverse direction and eject the ticket onto the counter through the slot 42.

In some situations it is desirable to be able to inhibit the output of the total spots counter so that the total will not be printed on a duplicate ticket. In this case a keyboard buffer transaction decoder 2590 (FIG. 25E) produces the output signal SPIH* which is applied to the four NAND gates 2371 (FIG. 23) to prevent any count in the total spots counter from reaching the data register through the data register multiplexer. The signal SPIH* is also applied through the inverter 2596 to a NAND 2595 so that when a transaction occurs the total spots counter may be reset.

In FIG. 25E the signal SPIH* is negative and blocks both NAND 2591 and NAND 2593 so that the signals SPH* and SPL* are both negative. These signals are applied to FIG. 23A where they block the four NAND gates 2313a and the four NAND gates 2313b to prevent printing of all spots on the duplicate ticket.

In some instances it is desirable to prevent the printing of brush marks on either the upper half or the lower half of the duplicate ticket. In this case the circuits of FIG. 25E will selectively produce either the signal SPH* or SPL* to selectively block either the four NAND gates 2313a or the four NAND gates 2313b.

While a preferred embodiment of the invention has been described in specific detail, it should be understood that various substitutions and modifications may be made therein without departing from the spirit and scope of the invention as defined by the appended claims. Furthermore, while the invention has been described with respect to the specific application for playing the game Keno, other applications of the invention for ticket printing, and issuing under control of a remote supervisory control station will be evident.

We claim:

1. A keno transaction control system including a plurality of transaction terminals at which a customer presents a customer marked keno ticket having one or more marked spots, each of said transaction terminals including a customer marked ticket scanning means for scanning a customer marked ticket and providing spot signals indicative of the marked spots on said customer marked ticket, selective duplicate spot printing means including a spot print cylinder having spot printing elements on its surface each comprising a brush mark printing element for printing a replica of a brush mark, said spot print cylinder being connected to said scanning means and being responsive to said spot signals from said scanning means for printing spots on a duplicate receipt ticket with a replica of a brush mark in the same spots of the duplicate ticket as the marked spots on the customer marked ticket, a manual keyboard for providing keyboard output signals indicative of entries in the keyboard by an operator, said entries including the amount of a transaction and the type of transaction and selective printing means for imprinting the transaction amount and the type of transaction on said duplicate ticket in accordance with entries in said keyboard and data storage means connected to the keyboard at each transaction terminal for recording all transactions of each transaction terminal wherein said transport means includes an intermediate transport means comprising two pairs of belts having inwardly facing flights between which a duplicate ticket blank is received at an infeed end and conveyed to an inlet end of an output duplicate ticket transport which includes two pairs of belts having inwardly facing flights engaging the duplicate tickets for movement to and through the spot printing means and an intermediate transport drive stepper motor means drivingly connected to said intermediate transport means and said output transport means for simultaneously providing increments of movement in a feeding direction to the belts of said intermediate transport means and said output transport means.

2. The invention of claim 1 wherein said spot printing means additionally includes a spot print hammer assembly having a plurality of selectively actuable solenoid powered spot print hammers positioned adjacent said spot print cylinder for selectively moving selected spots of a duplicate ticket supported by said output transport into printing engagement with one of said brush mark printing elements on said spot print cylinder.

3. The invention of claim 2 wherein said brush mark printing elements are arranged on the surface of said spot print cylinder in axially parallel rows parallel to the axis of said spot print cylinder and additionally including a spot print cylinder driving stepper motor drivingly connected to said spot print cylinder for indexing successive adjacent axially parallel rows of printing elements into a spot printing enabling position in which each printing element of a row of printing elements is in facing relationship to one of said hammers with a blank duplicate receipt ticket facing said printing element and interposed between said hammer and printing element.

4. The invention of claim 3 additionally including selectively operable strip feeding means for feeding the forward end of a strip of blank duplicate receipt tickets into the infeed end of said intermediate transport means, selectively operable ticket severing means interposed between said strip feeding means and the inlet of said intermediate feed means for severing the forwardmost ticket on the strip from the strip.

5. The invention of claim 4 wherein the selective printing means for printing the transaction amount and the type of transaction comprises a continuously rotating print cylinder having a plurality of axially spaced rings of indicia along its outer surface and positioned adjacent the intermediate feed means, a hammer assembly facing said print cylinder and including a plurality of selectively operable solenoid actuated hammer members respectively aligned with rings of indicia on the continuously rotating print cylinder.

6. The invention of claim 5 additionally including selectively actuable drive means connected to said strip feeding means for continuously driving said strip feeding means in a feeding direction of movement when actuated and one-way drive means drivingly connecting said intermediate transport means and said strip feeding means for simultaneously driving said intermediate feeding means and said strip feeding means upon actuation of said selectively actuable drive means and for preventing increments of movement of said belts of the intermediate transport means caused by actuation of said stepper motor from being conveyed to said strip feed means.

7. The invention of claim 6 additionally including control means for sequentially actuating the selectively actuable drive means to cause said strip feed means to feed the forwardmost ticket blank on the strip forwardly into the intermediate transport means, actuating said ticket severing means to sever the forwardmost ticket blank from the strip, actuating said intermediate transport drive stepper motor means to actuate the intermediate feed means to move and position the severed ticket blank in printing enabling position adjacent said continuously rotating print cylinder, actuating one or more selected ones of the hammers associated with the continuously rotating print cylinder to imprint the ticket blank, actuating the intermediate transport drive stepper motor to convey the ticket blank to a stationary position adjacent the spot print cylinder in which the forwardmost column of number spots on the ticket is in a spot printing enabling position aligned with the spot print hammer assembly, actuating any spot print hammer members aligned with number spots on the ticket blank corresponding to any number spots marked by the customer on the customer marked ticket, alternately indexing following successive columns of number spots into the spot printing enabling position by actuation of the intermediate transport drive stepper motor and actuating the spot print hammers aligned with number spots corresponding to any number spots marked by the customer on the customer marked ticket, actuating the intermediate transport drive stepper motor after all columns of number spots have been indexed to the spot printing enabling position and all spots on the ticket corresponding to spots marked by the bettor have been imprinted to complete a duplicate receipt ticket to discharge the duplicate receipt ticket via the output transport.

8. In a ticket issuing and accounting control system, the combination comprising:
   a plurality of ticket issuing stations each having a number and including means for sensing marks on a customer-marked ticket;
   mark storage means for simultaneously storing for an interval of time an indication of every mark sensed;
   counter means responsive to said storage means for producing an indication of the total count of marks sensed;
   record present sensing means for sensing the presence of an operator identification record at a desired position in each ticket issuing station;
   record sensing means for sensing coded data on said operator identification record;
   a data storage register;
   means responsive to said record present sensing means for enabling said data storage register to store said sensed coded data and said total count; and
   means for generating and entering into said data register an indication of the number assigned to the ticket issuing station.

9. The combination as claimed in claim 8 and further comprising:
   means for generating a ticket number and storing it in said data register; and,
   means including keyboard means for entering into said data register a transaction price.

10. The combination as claimed in claim 9 and further comprising:
    a supervisory station; and,
    means for transferring all data in said data register to said supervisory station.

11. The combination as claimed in claim 10 wherein said supervisory station includes time code data generating means, said combination further comprising:
    means for continuously and repetitively transferring said time code data to said data register; and
    means for entering said time code data into said data register prior to the time data in said register is transferred to said supervisory station.

12. The combination as claimed in claim 11 and including means responsive to said data register for imprinting said data on a duplicate ticket.

13. The combination as claimed in claim 12 and including means responsive to said mark storage means for imprinting on said duplicate ticket a mark corresponding to each mark sensed.

14. A ticket issuing and accounting station comprising a plurality of ticket issuing stations each connected to a single supervisory station;
   said supervisory station including means for selectively disabling the operation of any of said ticket issuing stations;
   said supervisory station including means for continuously generating and applying data to said ticket issuing stations;

keyboard means at each ticket issuing station for generating price data;

mark sensing and storage means at each ticket issuing station for sensing a customer marked ticket to generate data relating to marks on said ticket;

means at each ticket issuing station for imprinting on a duplicate ticket all data generated at said ticket issuing station and the data generated at said supervisory station; and means for transferring to said supervisory station all data imprinted on each ticket at each ticket issuing station.

15. A ticket issuing and accounting station comprising a plurality of ticket issuing stations each connected to a single supervisory station;

said supervisory station including means for continuously generating and applying data to said ticket issuing stations;

keyboard means at each ticket issuing station for generating price data;

mark sensing and storage means at each ticket issuing station for sensing a customer-marked ticket to generate data relating to marks on said ticket;

means at each ticket-issuing station for imprinting on a duplicate ticket all data generated at said ticket issuing station and the data generated at said supervisory station;

means for transferring to said supervisory station all data imprinted on each ticket at each ticket issuing station; and wherein said supervisory control station includes scanning means for enabling only one ticket-issuing station at a time to transfer data to the supervisory control station.

16. A ticket issuing and accounting station comprising a plurality of ticket issuing stations each connected to a single supervisory station;

said supervisory station including means for selectively disabling the operation of any of said ticket issuing stations;

said supervisory station including means for continuously generating and applying data to said ticket issuing station;

keyboard means at each ticket issuing station for generating price data;

mark sensing and storage means at each ticket issuing station for sensing a customer-marked ticket to generate data relating to marks on said ticket;

means at each ticket issuing station for imprinting on a duplicate ticket all data generated at said ticket issuing station and the data generated at said supervisory station;

means for transferring to said supervisory station all data imprinted on each ticket at each ticket issuing station; and wherein the data relating to marks sensed by said sensing means comprises a count of the number of marks sensed, each ticket issuing station including a shift register memory having a storage position for each possible mark position, and a counter responsive to said shift register memory for counting the number of marks.

17. The combination as claimed in claim 16 and further comprising means responsive to said shift register means for imprinting on the duplicate ticket a mark corresponding to each mark sensed by said sensing means.

18. The combination as claimed in claim 16 and including display means at each ticket-issuing station for visually displaying said price data and said mark count data.

19. A ticket issuing and accounting station comprising a plurality of ticket issuing stations each connected to a single supervisory station;

said supervisory station including means for selectively disabling the operation of any of said ticket issuing stations;

said supervisory station including means for continuously generating and applying data to said ticket issuing stations;

keyboard means at each ticket issuing station for generating price data;

mark sensing and storage means at each ticket issuing station for sensing a customer-marked ticket to generate data relating to marks on said ticket;

means at each ticket issuing station for imprinting on a duplicate ticket all data generated at said ticket issuing station and the data generated at said supervisory station;

means for transferring to said supervisory station all data imprinted on each ticket at each ticket issuing station; and a ticket number counter at each ticket issuing station for serially numbering the duplicate tickets, all of said ticket number counters being responsive to a means located at said supervisory control station to reset to a predetermined count.

20. A ticket issuing and accounting station comprising a plurality of ticket issuing stations each connected to a single supervisory station;

said supervisory station including means for selectively disabling the operation of any of said ticket issuing stations;

said supervisory station including means for continuously generating and applying data to said ticket issuing stations;

keyboard means at each ticket issuing station for generating price data;

mark sensing and storage means at each ticket issuing station for sensing a customer-marked ticket to generate data relating to marks on said ticket;

means at each ticket issuing station for imprinting on a duplicate ticket all data generated at said ticket issuing station and the data generated at said supervisory station;

means for transferring to said supervisory station all data imprinted on each ticket at each ticket issuing station;

wherein said data imprinting means includes a recirculating shift register for receiving all of said generated data;

a print coincidence counter;

means incrementing said print coincidence counter each time said data in said recirculating shift register is recirculated;

N comparison means for comparing output signals from N stages of said data register with the output of said coincidence counter;

print hammer drive means; and means responsive to said comparison means for energizing said print hammer drive means after each recirculation of data in said shift register.

21. The combination as claimed in claim 20 wherein said means for energizing said print hammers comprises:

N groups of print latches each connected to all of said comparison means; and means for enabling one group of said print latches each Nth time said shift register shifts one position.

* * * * *